US006525889B1

(12) United States Patent  
Collins, Jr. et al.

(10) Patent No.: US 6,525,889 B1
(45) Date of Patent: Feb. 25, 2003

(54) DEVICE AND METHOD FOR PRODUCING OPTICALLY-CONTROLLED INCREMENTAL TIME DELAYS

(75) Inventors: Stuart A. Collins, Jr., Worthington, OH (US); Betty Lise Anderson, Gahanna, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/688,478

(22) Filed: Oct. 16, 2000

Related U.S. Application Data

(63) Continuation-in-part of application No. 09/645,136, filed on Aug. 24, 2000, now Pat. No. 6,388,815.
(60) Provisional application No. 60/150,889, filed on Aug. 26, 1999.

(51) Int. Cl.[7] .......................... G02B 5/04; G02B 26/00; G02B 26/08
(52) U.S. Cl. ................. 359/836; 359/831; 359/237; 359/298; 359/290; 359/291
(58) Field of Search ............................... 359/292, 298, 359/237, 831, 836, 245, 290, 291, 631, 633; 349/5, 65; 342/375

(56) References Cited

U.S. PATENT DOCUMENTS

| 4,225,938 | A |   | 9/1980  | Turpin ........................ 708/816 |
| 4,474,434 | A |   | 10/1984 | Carlsen et al. ............... 359/320 |
| 4,474,435 | A |   | 10/1984 | Carlsen et al. ............... 359/320 |
| 5,117,239 | A | * | 5/1992  | Riza ............................ 342/375 |
| 5,319,477 | A | * | 6/1994  | DeJule et al. ................. 349/65 |
| 5,463,497 | A |   | 10/1995 | Muraki et al. ................ 359/619 |
| 5,465,175 | A |   | 11/1995 | Woodgate et al. ........... 359/619 |
| 5,512,907 | A |   | 4/1996  | Riza ............................ 342/375 |
| 5,726,752 | A | * | 3/1998  | Uno et al. .................... 356/246 |
| 5,936,759 | A |   | 8/1999  | Buttner ........................ 359/291 |
| 6,040,880 | A | * | 3/2000  | Tsuboi et al. ................. 349/5 |
| 6,064,506 | A |   | 5/2000  | Koops ......................... 359/237 |
| 6,266,176 | B1| * | 7/2001  | Anderson et al. ........... 359/245 |
| 6,388,815 | B1| * | 5/2002  | Collins, Jr. et al. ......... 359/633 |

OTHER PUBLICATIONS

Collins, Jr et al., Optical True Time Delay for Phased Array Antennas Based on the White Cell, GOMA, Monterey, California, 4 pp. (Mar., 1999).

(List continued on next page.)

Primary Examiner—Hung Xuan Dang
Assistant Examiner—Gary O'Neill
(74) Attorney, Agent, or Firm—Standley & Gilcrest LLP

(57) ABSTRACT

The present invention includes time delay devices and time delay systems. The invention also includes machines and instruments using those aspects of the invention. The invention may also be used to upgrade, repair, or retrofit existing machines or instruments, using methods and components known in the art. The present invention comprises a true time device that falls into the free-space category but uses a multiple-pass optical cell with refocusing mirrors that has the advantage of avoiding beam-spreading problems. This approach differs from previous free-space approaches in that it uses only one optical switch or spatial light modulator instead of one or more switches for each bit. In one approach, a microwave signal for each antenna element may be modulated onto an optical beam. After the individual optical beams are delayed by the desired amount of time through the system, the signals may then be down-converted to microwave signals for further processing. This process may be used in either the transmit or the receive mode of a phased array radar.

28 Claims, 34 Drawing Sheets

OTHER PUBLICATIONS

Anderson et al., Design Advances in Free–Space Optical True–Time Delay Device, PSAA–8, Monterey, California, 4 pp. (Jan., 1998).

Anderson et al., Binary–Counting True Time Delay Generator Using a White Cell Design and Deformable Mirror Devices, LEOS, Orlando, Florida, 2 pp. (Dec. 1998).

Anderson et al., Highly Parallel Optical Device to Produce True Time Delays for Phased Array Antennas, Allerton, 14 pp. (Sep., 1998).

Anderson et al., Optically Produced True–Time Delays for Phased Antenna Arrays, Applied Optics, vol. 36, No. 32, pp. 8493–8503 (Nov., 1997).

Collins et al., Optics for Numerical Calculation, Proceedings of ICO–11 Conference, Madrid, Spain (1978).

Collins, Numerical Optical Data Processor, SPIE vol. 128, Effective Utilization of Optics in Radar Systems, pp. 313–319 (1977).

Collins et al., Numerical Optical Data Processing, Proceedings of the 1978 International Optical Computing Conference, London, England, pp. 194–197 (Sep., 1978).

Yen et al., Operation of a Numerical Optical Data Processor, International Optical Computing Conference, SPIE Proceedings, vol. 232, 8 pp. (1980).

* cited by examiner

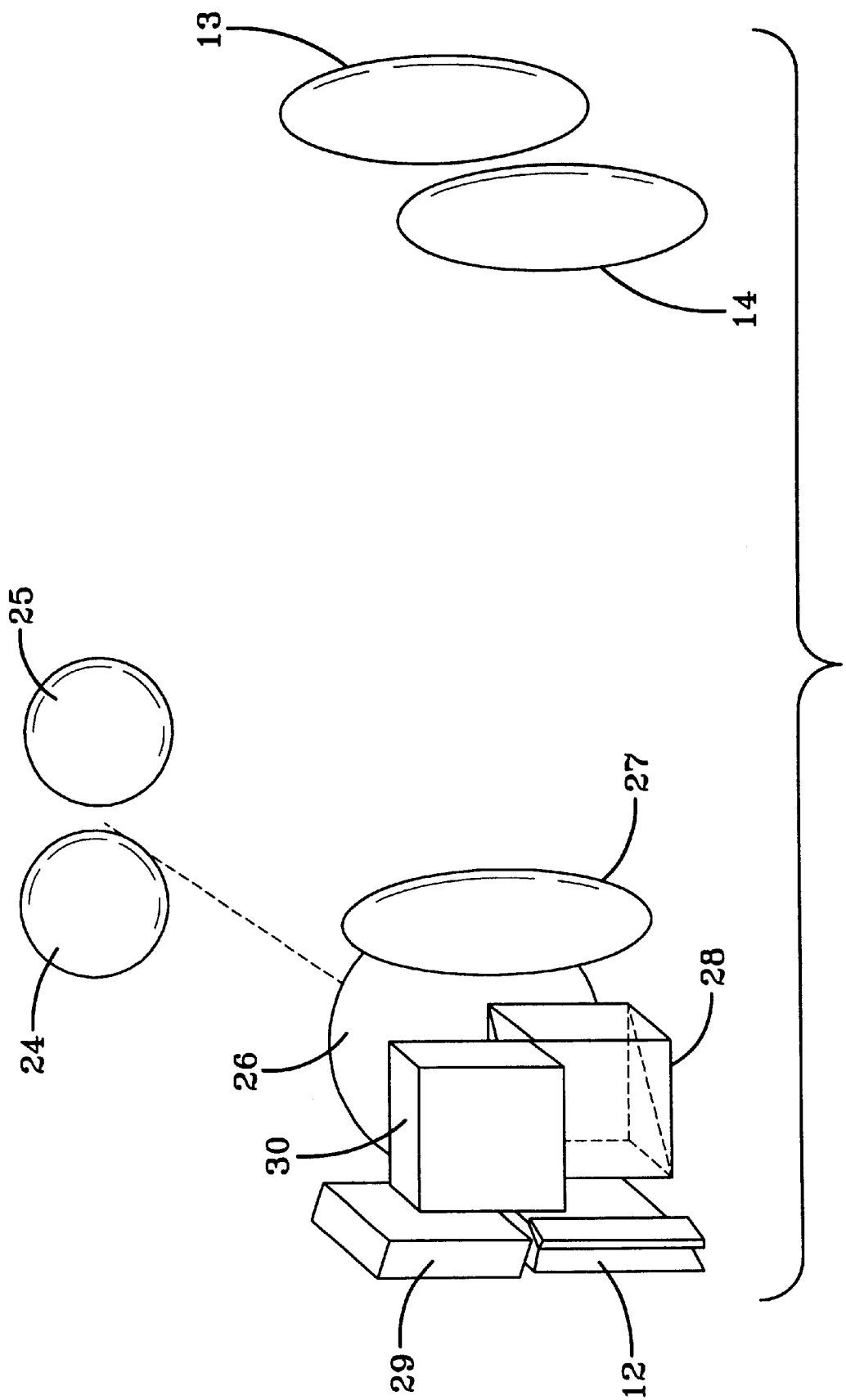

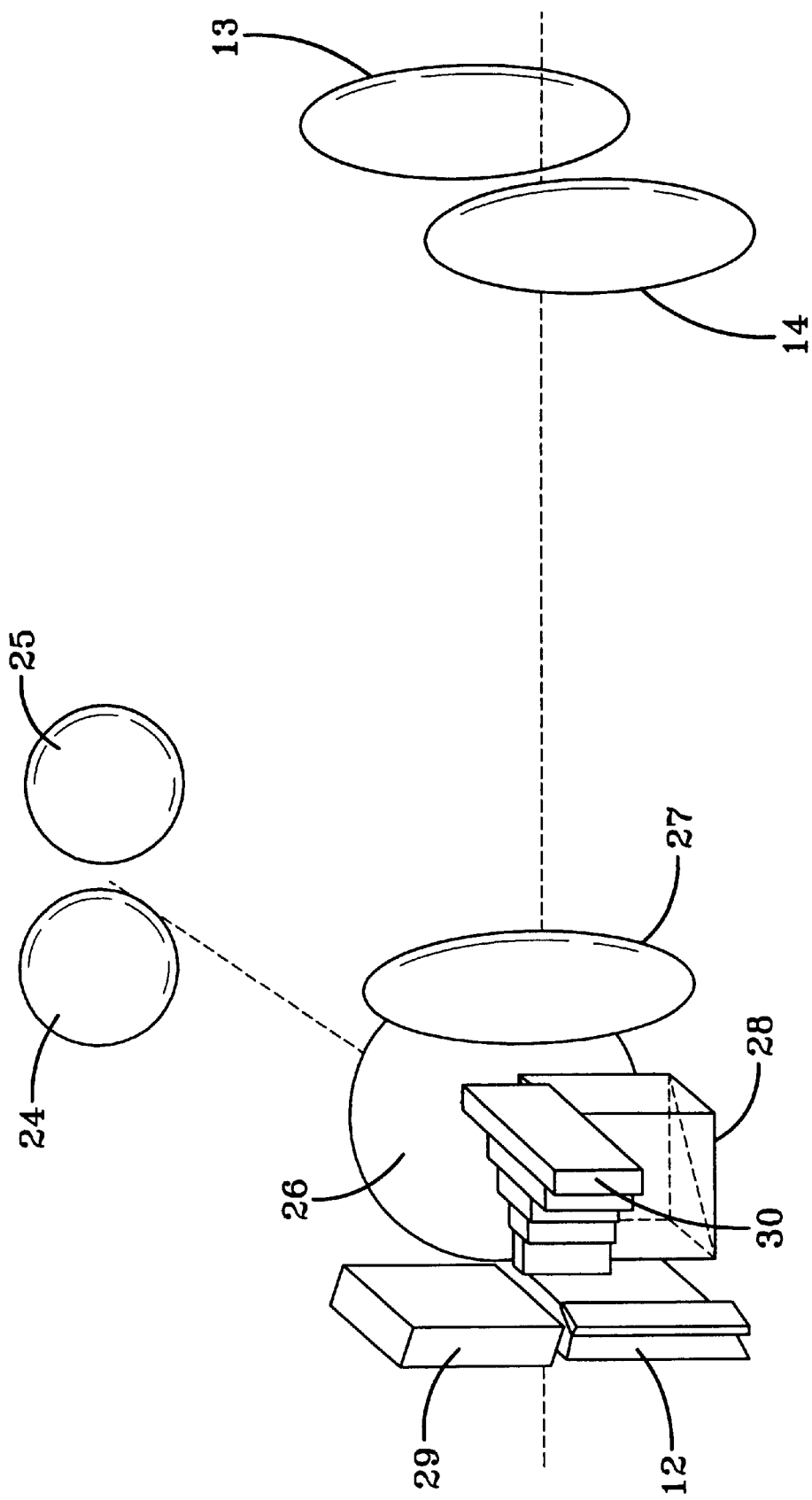

DEVICE AND METHOD FOR PRODUCING OPTICALLY-CONTROLLED INCREMENTAL TIME DELAYS This application is a continuation-in-part application of application Ser. No. 09/645,136 filed Aug. 24, 2000 now U.S. Pat. No. 6,388,815 claiming the benefit of Provisional Application Ser. No. 60/150,889 filed Aug. 26, 1999.

TECHNICAL FIELD OF THE INVENTION

The present invention is in the field of time delay devices, such as those that may be used for the control of phased-array radars, communication systems, or correlators.

BACKGROUND OF THE INVENTION

This invention relates to apparatus for producing true-time delay devices, such as those useful in the control of phased array radars. It is desirable to use a system that produces signals to control the timing of the emission of each of a plurality of electromagnetic radiation beams, delaying each of them in time by some time increment. The delay in each signal should be capable of being controlled independently of the other signals.

Phased array radars have the advantage that the radar beams can be steered electronically by changing the phase or timing of the signal radiated by the individual elements of the array. Often, this is accomplished by controlling the phase of the signals applied to the array elements. This procedure introduces undesirable squint if very short pulses or broad bandwidths are required. True time delay offers a scheme for controlling the elements without squint even with broadband signals.

Electronically implementing the true time delays is generally impractical because of the need for many long lengths of strip line, waveguides, or coaxial cable, which are expensive, bulky, and temperature sensitive. Because long paths are comparatively easy to obtain optically, photonic systems present a means of obtaining the beam agility of array systems combined with wide bandwidth. Approaches to true time delay tend to fall into two categories: those using fibers and those using long free-space paths. Some fiber approaches use multiple optical switches or broadcast the light over all possible paths at once. Wavelength-division-multiplexing schemes have recently been developed by use of fiber Bragg gratings. Free-space systems have also used multiple optical switches for switching the beams between sequential optical paths. These optical switches are usually liquid-crystal based.

It is therefore an object of the current invention to create a device for optically generating true time delays that is inexpensive, is compact in design, and is sufficiently temperature insensitive.

Although described with respect to the field of phased-array radars, it will be appreciated that advantages similar to those obtained in optically producing true-time delays, as well as other advantages, may be obtained in other applications of the present invention requiring timing functions. These advantages may become apparent to one of ordinary skill in the art in light of the present disclosure or through practice of the invention.

SUMMARY OF THE INVENTION

The present invention includes time delay devices and time delay systems. The invention also includes machines and instruments using those aspects of the invention. The invention may also be used to upgrade, repair, or retrofit existing machines or instruments, using methods and components known in the art.

The present invention includes a true time device that falls into the free-space category but uses a multiple-pass optical cell with refocusing mirrors that has the advantage of avoiding beam-spreading problems. This approach differs from previous free-space approaches in that it uses only one optical switch or spatial light modulator instead of one or more switches for each bit. In this approach, the microwave signal for each antenna element may be modulated onto an optical beam. After the individual optical beams are delayed by the desired amount of time, the signals may then be down-converted to microwave signals for further processing. This process may be used in either the transmit or the receive mode of the phased array radar.

An apparatus of the present invention for optically generating time delays in signals uses an input light source to generate at least one individual light beam from at least one direction. An input mirror reflects the light beam(s) to a plurality of optical elements configured so as to define a plurality of possible light paths for each light beam. Here, the optical elements comprise two delay engines. Preferably, at least one refocusing optical element may be used used to restrict the divergence of a light beam diverted through a light path. A path selector, such as a three-state spatial light modulator then selects a path from among these light paths for each pass of a light beam through the optical elements. An output mirror then reflects each light beam emerging from the optical elements to at least one receiving device. The receiving device receives a light beam reflected by the output mirror and extracts the delayed signal from the light beam.

The present invention also includes an apparatus for optically generating time delays in signals utilizing a roof prism. An input light source generates at least one individual light beam from at least one direction. An input mirror reflects the light beam(s) to a flat mirror. The hypotenuse face of the roof prism separated a distance from, and tilted with respect to, the flat mirror such that a light beam reflected by the flat mirror will be reflected back to a different point on the flat mirror via the internal reflections of the roof prism. Preferably, at least one refocusing optical element is positioned in the light path of a beam between the flat mirror and the roof prism to restrict the divergence of the light beam(s). An output mirror reflects each light beam emerging from the flat mirror that is not reflected back to the roof prism. At least one receiving device receives the light beam(s) reflected by the output mirror and extracts the delayed signal from the light beam(s).

The present invention also includes another roof prism-containing apparatus for optically generating time delays in signals. An input light source generates at least one individual light beam from at least one direction. An input mirror reflects the individual light beam(s) to a spatial light modulator. The spatial light modulator then reflects a light beam to a roof prism, the hypotenuse face of the roof prism being separated a distance from, and tilted with respect to, the spatial light modulator such that a light beam reflected by the spatial light modulator will be reflected back to a different point on the spatial light modulator via internal reflection in the roof prism. At least one refocusing optical element is used to restrict the divergence of the light beam(s). An output mirror reflects each beam emerging from the spatial light modulator that is not reflected back to the roof prism. At least one receiving device extracts the delayed signal from the light beam(s) reflected by the output mirror and determines the delay in the beam(s).

BRIEF DESCRIPTION OF THE DRAWINGS

FIG. 5 is a perspective view of the dual arm cell with an auxiliary mirror in accordance with one embodiment of the present invention.

FIG. 5a is another perspective view of the dual arm cell with a set of glass blocks in accordance with one embodiment of the present invention.

DETAILED DESCRIPTION OF THE PREFERRED EMBODIMENT(S)

In accordance with the foregoing summary, the following presents a detailed description of the preferred embodiment of the invention that is currently considered to be the best mode.

Figure 1:
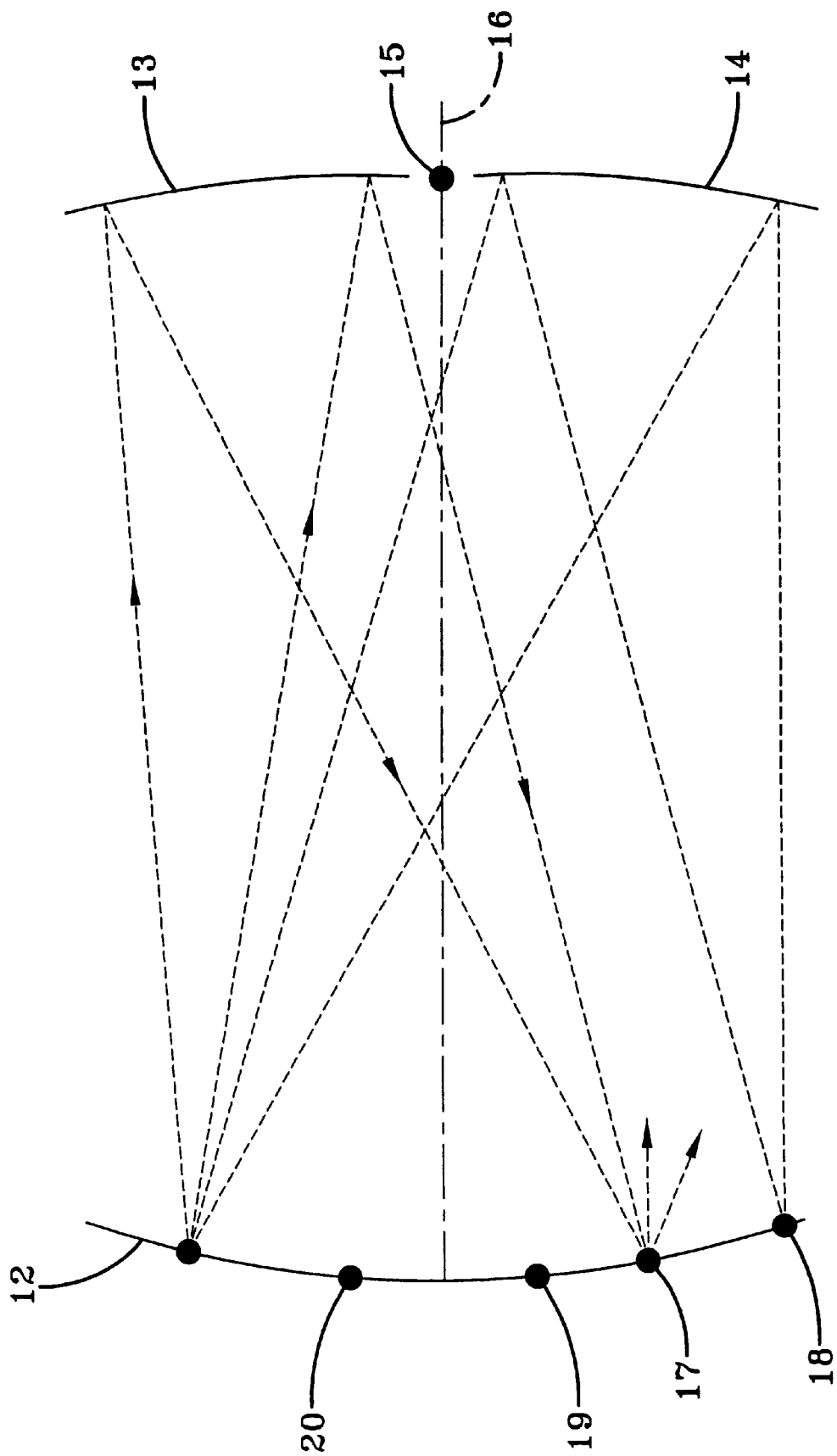
FIG. 1 is a top view of a standard White cell on which the one embodiment of present invention is based.

The present invention is based on the traditional White cell. FIG. 1 is a diagram of the path of a light beam passing through a White cell. The cell comprises three identical spherical mirrors, all of the same radius of curvature. The first mirror 12 is separated from the second 13 and third 14 mirrors by a distance equal to their radii of curvature. The center of curvature 15 of the first mirror lies on the centerline or optical axis 16 and falls between the second and third mirrors. The second and third mirrors are aligned so that the center of curvature 20 of the second mirror 13 and the center of curvature 19 of the third mirror 14 land on the first mirror, for example an equal distance from the optical axis. Light from the second mirror is imaged onto the third mirror, and vice versa. Light is input onto a spot 18 in the plane of but off the edge of the first mirror; the light beam is prepared so that it expands as it goes to the third mirror. The third mirror refocuses the beam to a point on the first mirror. The beam is then reflected to and expanded at the second mirror. The second mirror refocuses the light beam to a new spot 17 on the first mirror. At this point, the light may either exit the cell if the spot is off the edge of the first mirror, or continue to traverse the cell. The beam may traverse the cell a predetermined number of times, depending on the locations of the centers of curvature of the second and third mirrors.

Figure 2:
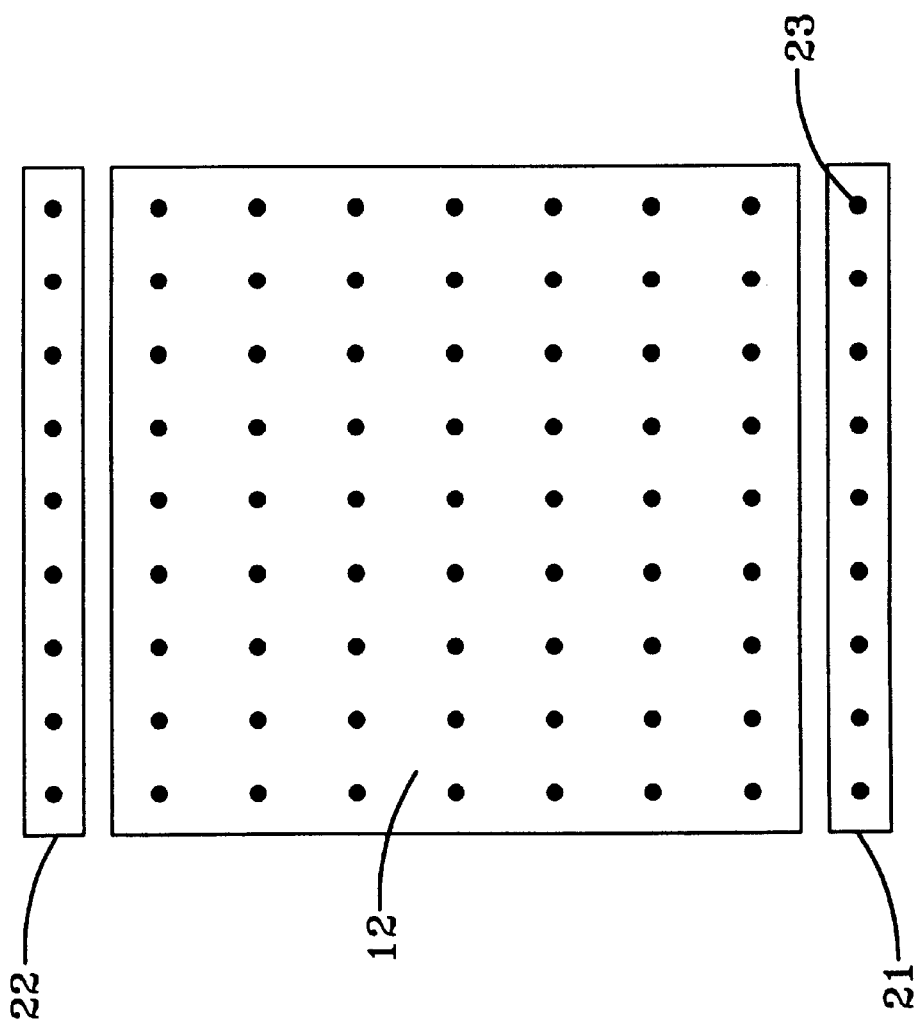
FIG. 2 is a front elevational view of the spatial light modulator, along with the input and output mirrors in accordance with one embodiment of the present invention.

The angle of the input beam may be controlled by an input turning mirror 21, as shown in FIG. 2. The angle of the output beam may be controlled similarly by an output turning mirror 22. Each bounce of a light beam is shown by a spot 23 on the turning mirrors or the first mirror 12. Multiple light beams are shown. A spatial light modulator or other appropriate device may alternatively replace the first mirror. A beam of light may be reflected off the input turning mirror into the White cell, and may traverse the cell until the beam is directed to the output turning mirror, at which point it may exit the cell.

Figure 3:
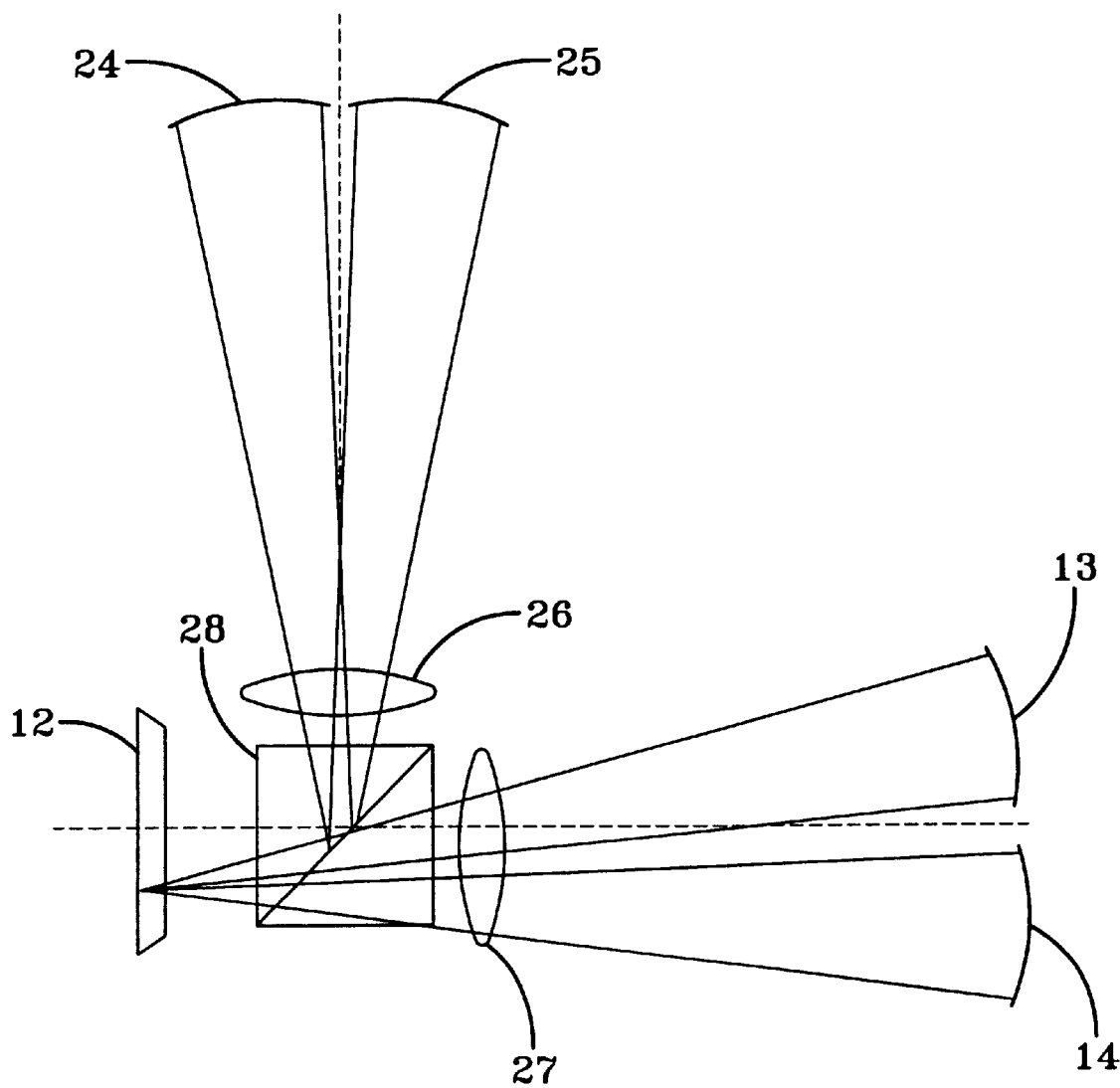
FIG. 3 is a top view of the dual-arm cell with a beam splitter in accordance with one embodiment of the present invention.

FIG. 3 shows a first modification to the White cell to adapt it to variable time delay applications. A first optional modification is to change the first mirror 12 from a curved mirror to a flat one and to add a lens 27 of focal length such that the lens-mirror combination is optically equivalent to the mirror it replaces. Next, the flat mirror may be replaced with a spatial light modulator. This particular spatial light modulator may be configured to rotate in the direction of polarization of the reflected beam by ninety degrees at any particular pixel that is activated. A polarizing beam splitter 28 may be added, and the distances to the second 13 and third 14 mirrors may be adjusted to maintain imaging. The input light may be polarized in the plane of the figure. The beam splitter may reflect light polarized in the plane perpendicular to the figure but transmit light polarized parallel to the plane of the figure.

An improved photonic device may be implemented by next adding a fourth 24 and fifth 25 mirror, where these mirrors are identical but have a focal length different than that of the second and third mirrors. Dual cells joined at the beam splitter are formed. Because the single lens 27 can no longer satisfy the focusing conditions for both cells, a lens 26 of different focal length may be added to the other output side of the beam splitter. The focal lengths of the lenses are chosen to compensate for the new mirror locations.

Figure 4:
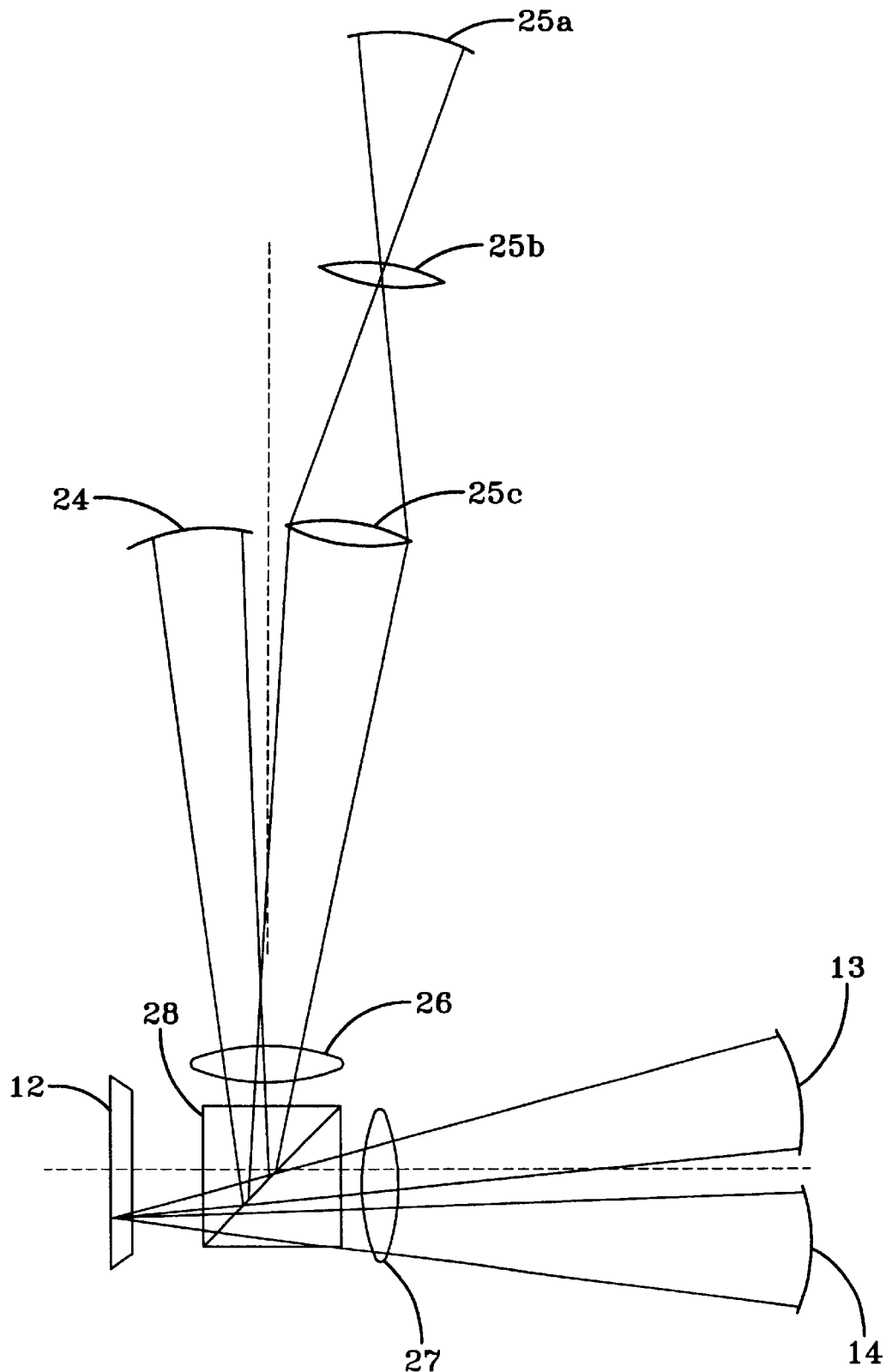
FIG. 4 is a top view of a quadratic cell, where the distances from the spatial light modulator to the White cell mirrors vary, in accordance with one embodiment of the present invention.

A further improved photonic device may be obtained if the distances to the fourth and fifth mirrors from the beam splitter are different, as shown in FIG. 4. In this variation, the radii of curvature of the fourth and fifth mirrors will be different. An additional lens or lenses may be added between lens 26 and mirror 25a to maintain imaging.

To increase the number of potential time delays, the design of the dual-armed unit of FIG. 3 may be further modified, as shown in FIG. 5. First, auxiliary mirror 29 may be added in the plane of the spatial light modulator 12. A second auxiliary mirror 29a may be placed in the image plane of the spatial light modulator. Then, a time delay mechanism such as a set of glass blocks 30 may be substituted for this second auxiliary mirror, as shown in FIG. 5a. The blocks are reflective on the sides furthest from the lens 26. Alternatively, the glass blocks could be replaced by optical fibers or an array of fibers. The optical axis is between the spatial light modulator and the auxiliary mirror. The first lens 27 has been made larger to cover them. The thicknesses of the glass blocks may be chosen so that the additional time required for the beams to go through successive blocks increases by a factor of two times the initial thickness. The operation is comparable to that of the dual cell with the plane of the spatial light modulator enlarged and additional time delays due to the addition of the glass blocks or equivalent transparent materials.

Figure 6:
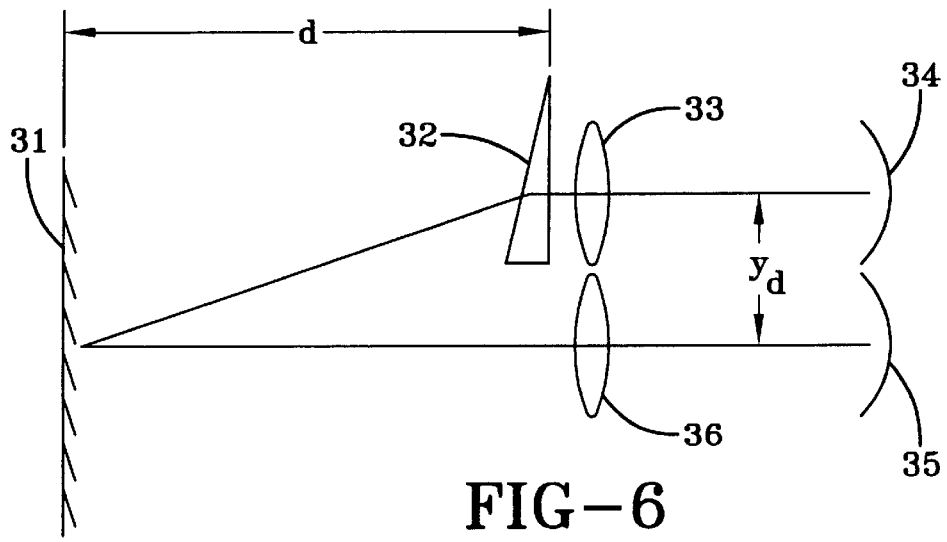
FIG. 6 is a diagram of a White cell using a deformable mirror device spatial light modulator and an appropriate prism in accordance with one embodiment of the present invention.
Figure 7:
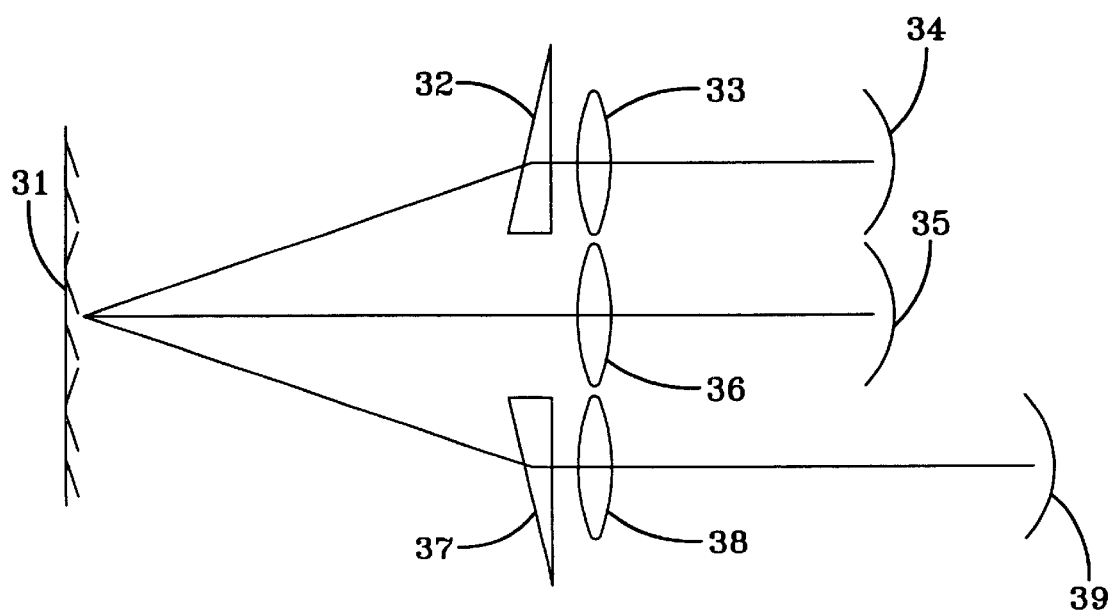
FIG. 7 is a diagram of a multiple arm version of the deformable mirror device configuration in accordance with one embodiment of the present invention.

If a deformable mirror device spatial light modulator 31 is used, a simple White cell can be constructed as shown in FIG. 6. A prism 32 may be used to direct the light beam through a focusing lens 33 onto the appropriate mirror 34 off the optical axis. FIG. 7 also shows that another prism 37 may be introduced to direct light from the deformable mirror device spatial light modulator 31 through a refocusing lens 38 onto the other off-axis mirror 39 in the dual-arm configuration.

Figure 8:
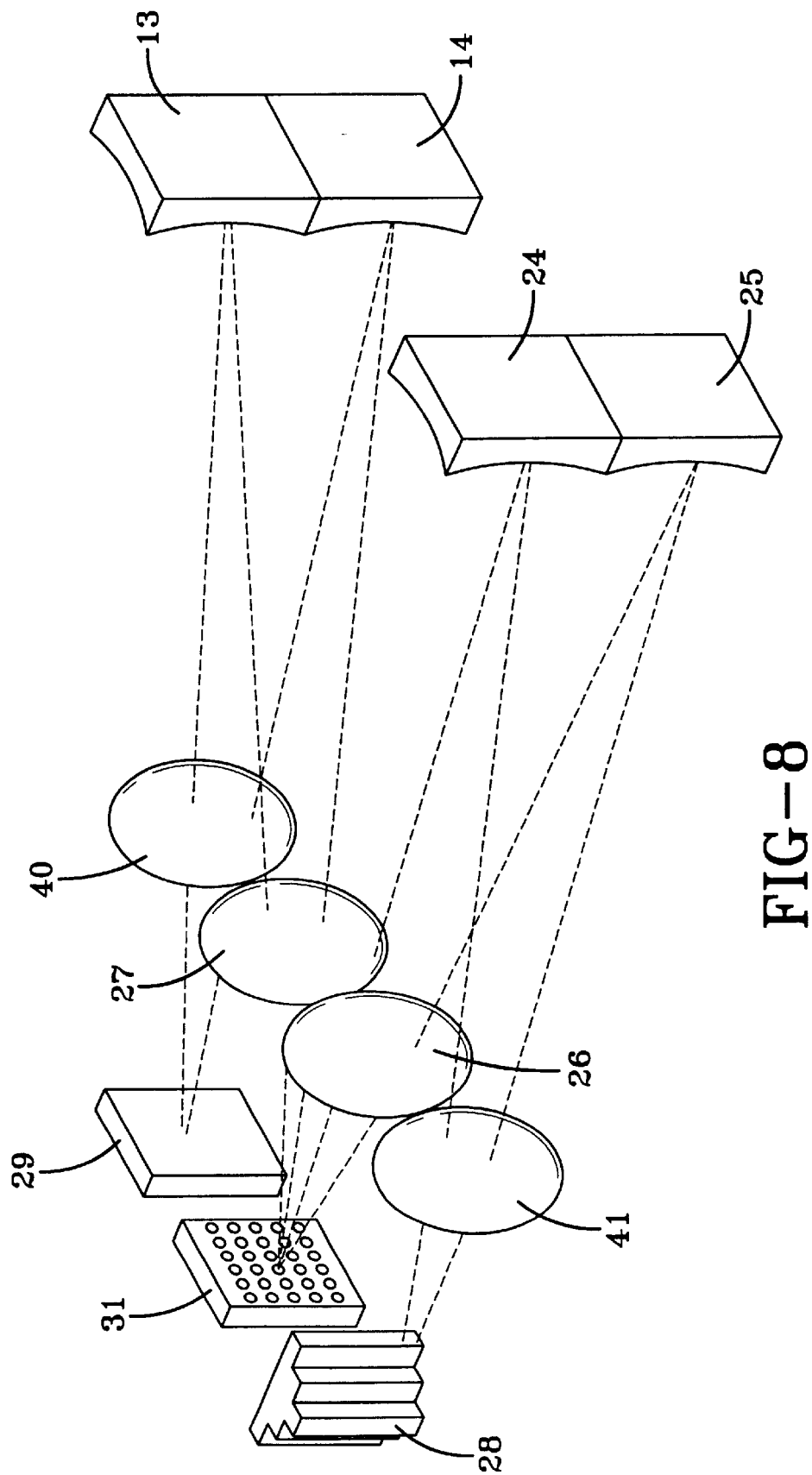
FIG. 8 is a perspective view of an alternative cell configuration in accordance with one embodiment of the present invention.

Another possible configuration of the dual arm cell is shown in FIG. 8. Here, the second and third mirrors of the first arm of the original device are replaced by the second 35 and third 39 mirrors of the new configuration. The fourth and fifth mirrors that comprised the second arm of the original device are then replaced by the second mirror 35 again, along with the first mirror 34 of the new configuration. Light beams thus may bounce from the second or third mirrors to the first or second mirrors, then back to the second or third mirrors, mimicking the operation of the original dual-arm cell described above. An additional lens 40 may be used to image the spatial light modulator onto an auxiliary mirror 29, and a lens 41 may be used to image the spatial light modulator onto a delay mechanism such as glass blocks 30.

A prism such as 32 and its adjacent lens such as 33 may be replaced with a single lens that is appropriately tilted or decentered or both.

Figure 9:
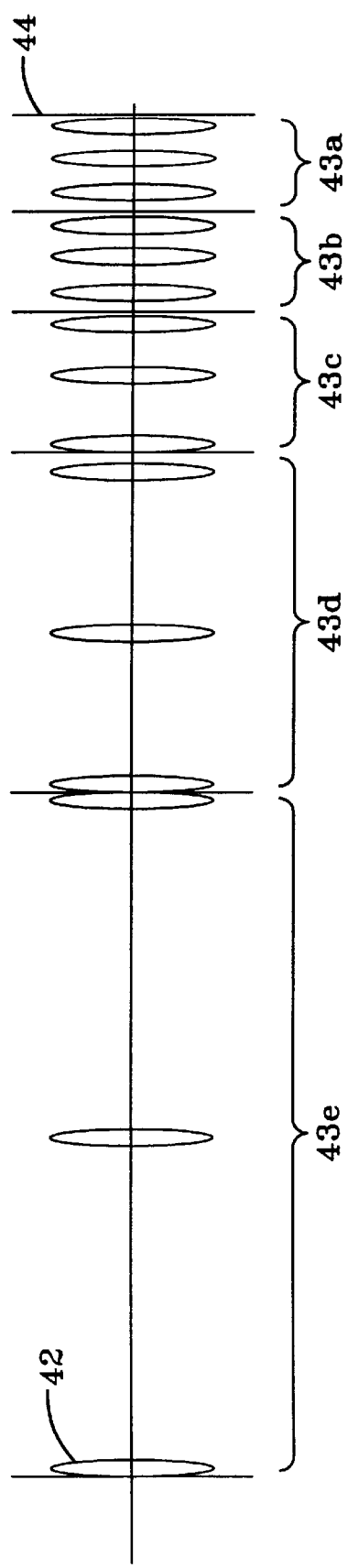
FIG. 9 is a side elevational view of a system of lens groups in accordance with one embodiment of the present invention.
Figure 10:
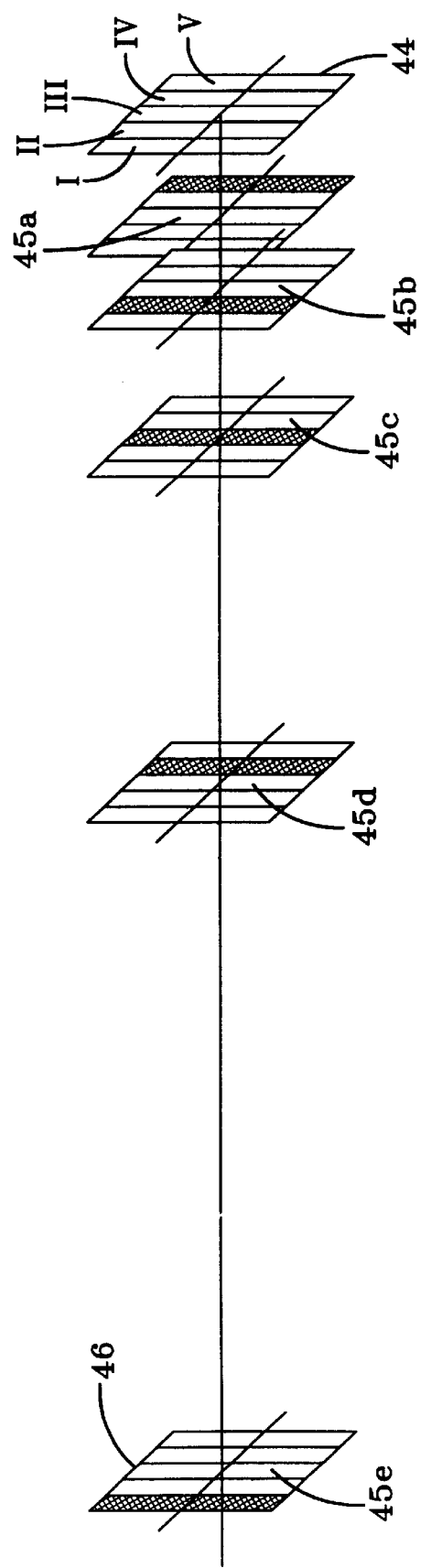
FIG. 10 is another side elevational view of the image planes in the optical transmission line in accordance with one embodiment of the present invention.

In order to obtain longer time delays, it is possible to introduce a lens waveguide in place of the glass blocks. FIG. 9 shows such a lens waveguide. Three lenses 42 form a lens group 43. The lens groups may then be placed along a common optical axis to form an optical transmission line or lens waveguide. The light comes into the optical transmission line from the right. The input plane 44 is coincident with an auxiliary mirror plane. At the left of each lens group is an additional plane conjugate to the auxiliary mirror plane. A transparent material may be placed at these conjugate planes, as shown in FIG. 10. Each sheet of transparent material 45 may have a reflective strip 46 on a portion of its surface. This permits light beams incident on different areas of the waveguide to propagate through different lengths of the optical transmission line.

Materials and Methods

Imaging Conditions. An analytical description of one arm of the White cell is presented. The configuration to be described is shown in FIG. 3. At the right of the figure, a White cell spherical mirror B 14 is shown below the axis and a White cell mirror C 13 above the axis. The center of curvature of White cell mirror B is a distance $\delta_1$ above the optical axis. The center of curvature of Mirror C is a distance $\delta_2$ below the optical axis. To the left of the White cell mirrors is lens fI 27 with focal length $f_1$. Adjacent to it is the polarizing beamsplitter 28 represented by a cube of glass of side d, and next to that is a flat mirror perpendicular to the optical axis representing the SLM. To present the analytical description of the imaging requirements, optical ray matrices are used. These matrices operate on a column vector $$\begin{pmatrix} y \\ np_y \\ 1 \end{pmatrix}$$

where y, n, and $p_y$ refer to the projection of a ray on the y-z plane. The vector element y represents the displacement of the ray from the optical (z) axis at some value of z. The element $p_y$ represents the slope of the ray at that point and n is the refractive index in the region. The third matrix element "1" is used in representing a tilted spherical mirror as will be shown later. A similar analysis could be used with y replaced by x and $p_y$ replaced by $p_x$ for the projection of the ray on the x-z plane. 3×3 ray matrices are used because they will be useful in representing the tilted spherical mirrors. Three ray matrices are used. The first is the matrix T(d, n), representing a translation through a material of refractive index n by a distance d in the axial direction.

$$T(d, n) = \begin{pmatrix} 1 & d/n & 0 \\ 0 & 1 & 0 \\ 0 & 0 & 1 \end{pmatrix}$$

The second is the matrix L(f) representing a thin lens of focal length f $$L(f) = \begin{pmatrix} 1 & 0 & 0 \\ 1/f & 1 & 0 \\ 0 & 0 & 1 \end{pmatrix}$$

The thin lens matrix is identical with that of a spherical mirror of focal length f with its center of curvature on the axis.

Figure 11:
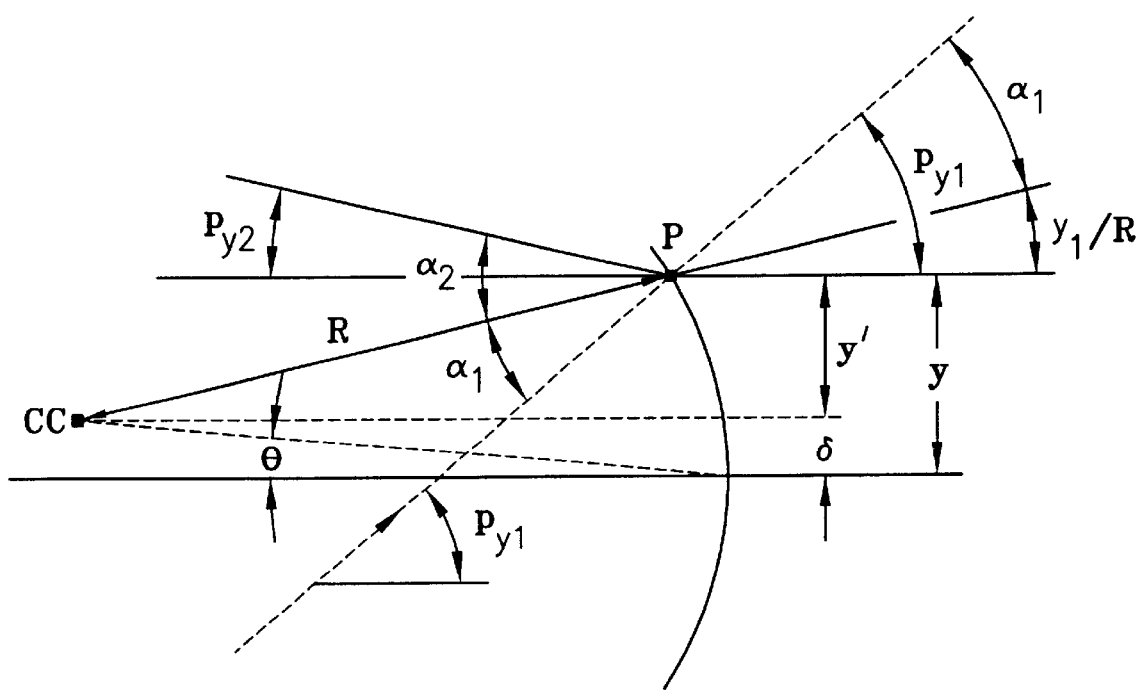
FIG. 11 is a ray diagram for a spherical mirror in accordance with of one embodiment of the present invention.

A last matrix represents a spherical mirror tilted so that a line from the intersection of the mirror and the optical axis to the center of curvature, point CC, makes an angle θ with the optical axis. A ray comes from the lower left with slope $p_{y1}$ reflecting off the mirror at point P and leaving with slope $p_{y2}$. Line CCP is drawn from point P through the center of curvature. There are two lines parallel to the axis, one through the center of curvature and one through point P. Line CCP makes angle $\alpha_1$ with the incoming ray and angle $\alpha_2$ with the reflected ray, as shown in FIG. 11. The center of curvature is a distance δ above the optical axis, and point P is a distance y above the optical axis and a distance y' above point CC.

Then there are five equations. Since the angle of incidence equals the angle reflection, $\alpha_1 = \alpha_2$. For small angles $\alpha_1 = p_{y1} - (y'/R)$ and $\alpha_2 = p_{y2} + (y'/R)$. Also, $y = y' + \delta$ and $\delta = \theta R = 2\theta f$, where f is the focal length of the mirror. Combining these equations to eliminate $\alpha_1$, $\alpha_2$, y', and R, gives $p_{y2} - \theta = p_{y1} + \theta - y/f$, the equation relating $p_{y1}$, the ray slope before reflection off the spherical mirror with $p_{y2}$, the ray slope after reflection. This leads to the ray matrix M(f,θ):

$$M(f, \theta) = \begin{pmatrix} 1 & 0 & 0 \\ -1/f & 1 & 2\theta \\ 0 & 0 & 1 \end{pmatrix}$$

To use these matrices in practice, one identifies the translations and thin lenses and mirrors encountered as a ray traverses an optical system and multiplies the associated matrices together to represent the effect of the optical system on the ray. Call the product matrix S. Then there results a matrix equation representing the ray slope-index products at the input and output $n_1 p_{y1}$ and $n_2 p_{y2}$ and the displacements of the ray from the axis at the input and output, $y_1$ and $y_2$.

$$\begin{pmatrix} y_2 \\ n_2 p_{y2} \\ 1 \end{pmatrix} = S \begin{pmatrix} y_1 \\ n_1 p_{y1} \\ 1 \end{pmatrix} \begin{pmatrix} A & B & G \\ C & D & H \\ I & J & K \end{pmatrix} \begin{pmatrix} y_1 \\ n_1 p_{y1} \\ 1 \end{pmatrix}$$

This represents three simultaneous equations. For example, the first such equation is $y_2 = Ay_1 + Bn_1 p_{y1} + G$. This equation nicely relates the input and output ray positions. The requirement that there be imaging between the input and output planes is that matrix element B=0. That requirement allows solving for the desired distances or focal lengths.

To return to the optical system, there are four requirements for proper operation. The first requirement is that Mirror B be imaged onto Mirror C so that no light will be lost by rays starting from Mirror B and missing Mirror C. To establish this requirement the system matrix S(B, C) is calculated for rays traversing from Mirror B to Mirror C. It is $S_{(B,C)} = T(d, 1)L(f_1)T(2d_1, n_1)L(f_1)T(d, 1)$. Inserting d, $d_1$ and $f_1$ in the appropriate matrices and multiplying the matrices together yields $$S_{(B,C)} = \begin{pmatrix} \{(1-(d/f_1))(1-(2d_1/n_1 f_1)) - (d/f_1)\} & 2\{(1-[d/f_1])(d+(d_1/n_1)(1-[d/f_1]))\} & 0 \\ -(2/f_1)(1-[d_1/n_1 f_1]) & (1/f_1)\{d+(2d_1/n_1)(1-[d/f_1])\} + (1-[d/f_1]) & 0 \\ 0 & 0 & 1 \end{pmatrix}$$

The requirement that Mirrors B and C be conjugates then is that matrix element B be zero:

$$2\{(1-[d/f_1])(d+(d_1/n_1)(1-[d/f_1]))\}=0.$$

This is used to give the desired focal length for lens $f_1$. There are two solutions: $f_1=d$ and $f_1=d/(1+[n_1d/d_1])$. These solutions represent symmetric and anti-symmetric ray patterns about the SLM. In the first solution a point on Mirror B has an image at infinity which gives an image on Mirror C with a magnification of −1. In the second solution a point on Mirror B has an image on the SLM. This also gives an image on Mirror C with a magnification of +1. The first solution works very nicely for this situation. This puts Mirrors B and C in the focal plane of lens f1. The same analysis applies to Mirrors E 25 and F 24 and lens f2 26. Mirrors E and F are in the focal plane of lens f2.

The second requirement is that Mirrors E and F be images of each other.

Considering requirements three and four that a point on the SLM be imaged back onto itself through each cell, take f to be the focal length of mirror B. The system matrix for that case is given by $S=T(d_1,n_1)L(f_1)T(d,1)L(f,\theta)T(d,1)L(f_1)T(d_1,n_1)$. Multiplying the appropriate matrices together and putting $f_1=d$ as required by the first imaging condition results in $$S = \begin{pmatrix} -1 & 2(d-[d_1/n_1])-(d^2/f) & 0 \\ 0 & -1 & 0 \\ 0 & 0 & 1 \end{pmatrix}$$

The imaging condition is then $B=0=2(d-[d_1/n_1])-(d^2/f)$, or $f=d/\{2(1-[d_1/n_1d])\}$. This equation allows predicting the required focal length for the spherical mirrors.

Figure 12:
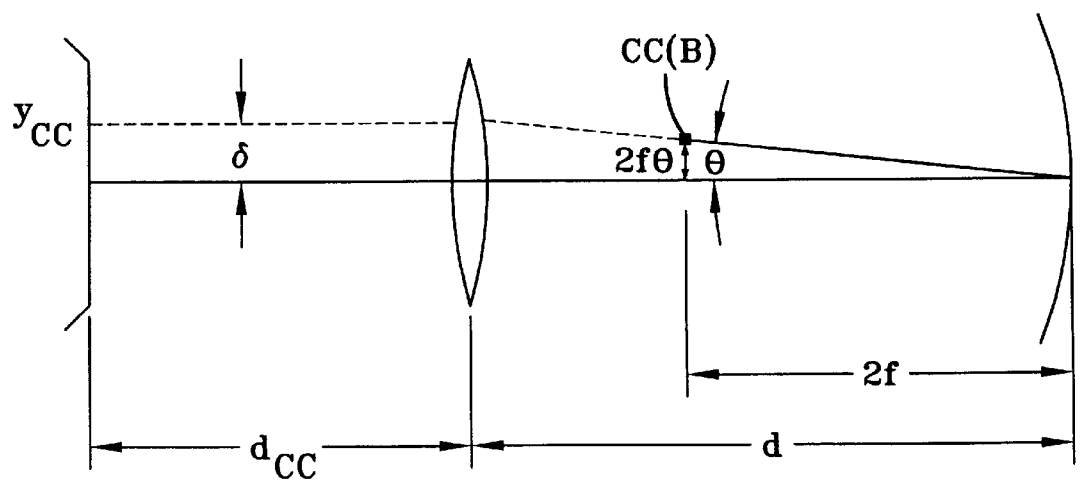
FIG. 12 is another ray diagram of a spherical mirror/lens system in accordance with one embodiment of the present invention.

The equation also has some interesting implications leading to physical meaning, as explained by FIG. 12. For the first one, consider the image of the center of curvature of Mirror B through lens f1. The radius of curvature of Mirror B is 2f and the distance of its center of curvature from lens f1 is d−2f. Then the distance of the image from the center of curvature, call it $d_{cc}$, is given by $1/d_{cc}+1/(d-2f)=1/f_1$. Eliminating f in these equations and simplifying results in $d_{cc}=d_1/n_1$. That is, the image of the center of curvature of Mirror B lies on the SLM surface. The image of the center of curvature of mirror B on the SLM can be called the center of curvature point.

To find out where on the SLM surface the center of curvature point is located, look to the magnification. The y value of the image of the center of curvature point, call it $y_{cci}$ is given by the y value of the center of curvature itself, $y_{cco}$, times the magnification, or $y_{cc}=y_{cco}\times\text{magnification}=2f\theta\times(-\text{image distance}/n_1)/(\text{object distance})=2f\theta\times\{-d_1/(n_1[d-2f])\}$. Using a previous equation for 2f and simplifying gives $y_{cc}=\theta d$, which has a very nice interpretation. If a line is drawn from the intersection of the optical axis with Mirror B through the center of curvature of Mirror B, then the intersection of that line, extended if necessary, with lens f1 is a distance $\theta d$ from the axis. The projection of that intersection onto the SLM gives the center of curvature point.

There is a further interpretation in terms of point sources on the SLM that are imaged back onto the SLM. Writing the first linear equation for the system matrix gives $y_2=-y_1+2\theta d$. Here, $y_1$ is the location of a point source on the SLM and $y_2$ is the location of its image after the light from the source has passed through lens f1, been reflected off Mirror B and passed back through lens f1. Defining $\delta=\theta d$ and rewriting this equation gives $(y_2-\delta)=-(y_1-\delta)$. This is interpreted in terms of a distance $\delta$. The interpretation is that the image formed by Mirror B of a point on the SLM is as far above the center of curvature image as the object is below the center of curvature point.

The behavior in the x direction is identical with the exception that Mirror B is tipped only in the y direction so that $\theta=0$. The x equation equivalent is $x_2=-x_1$. Since the center of curvature point is on the y axis, an image of a point source from the center of curvature is as far from the source point as the object was, but on the opposite side in both the x and y directions. To find the image of a point source on the SLM, one can merely reflect about the center of curvature point.

Increased Delay Time Due to Glass Blocks. Here is presented an analysis of a dual cell with auxiliary mirrors with glass blocks in place of Auxiliary Mirror II. The situation analyzed is shown in FIG. 5*a*. The SLM 12 is shown, along with a polarizing beam splitter 28, lens f2 26, lens f1 27, the White cell mirrors (13, 14, 24, 25) and Auxiliary Mirror I 29 and a group of glass blocks 30. The size of the polarizing beamsplitter is $d_1$ and its refractive index is $n_1$. The focal length of cell lens f2 is $f_2$ and is separated from White cell mirrors E and F by a distance $d_{EF}$. The distance, $d_2$, between lens f2 and the back of a glass block is divided into two regions, one of thickness $d''_2$ filled with air or other material, and the other of thickness $d'_2$ filled with material of refractive index $n_2$.

Figure 13:
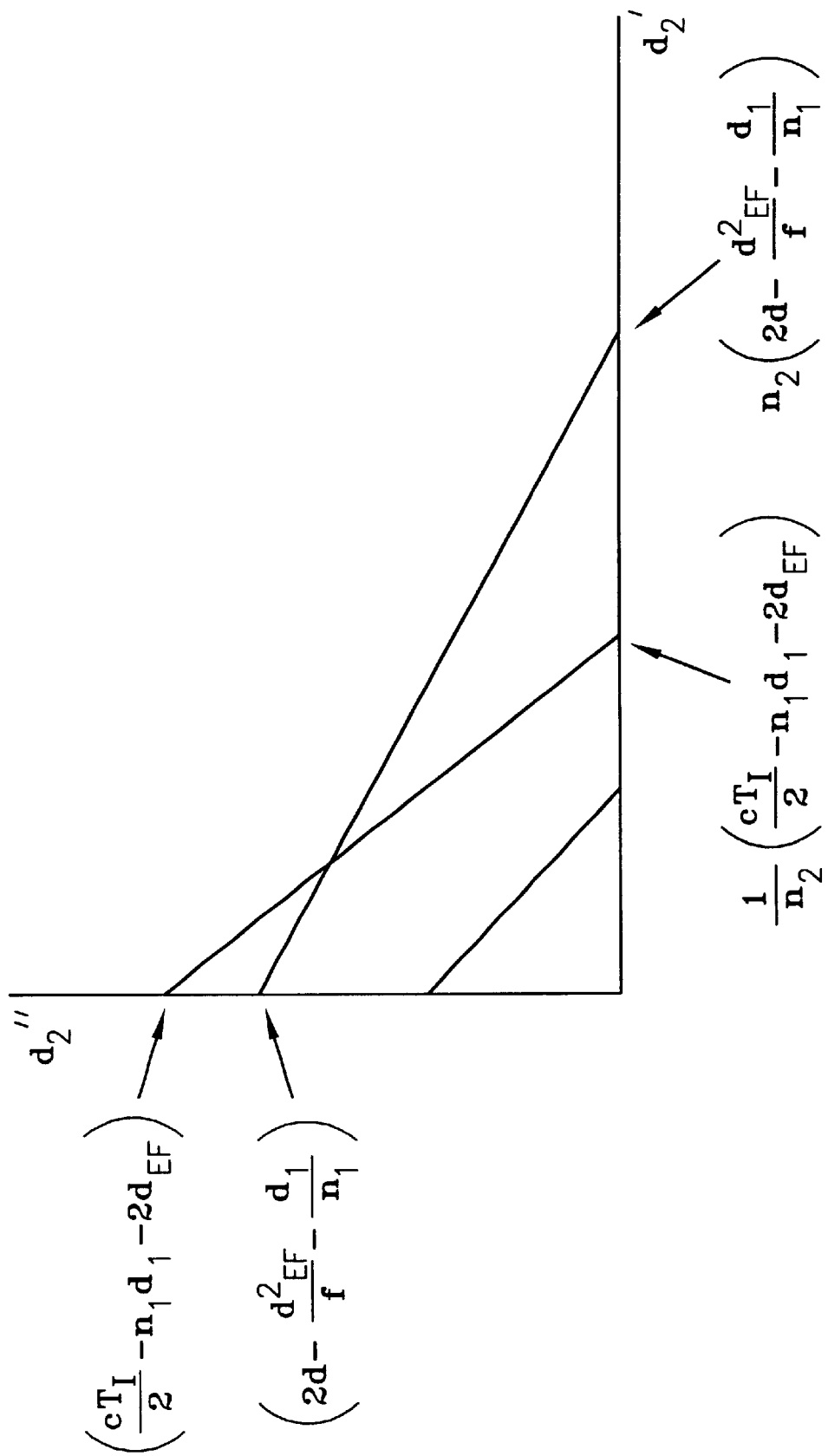
FIG. 13 is a plot of path distances in accordance with one embodiment of the present invention.

It is chosen that $f_2=d_{EF}$. The requirement that the SLM be imaged onto the reflective surface at the back of a glass block can be easily calculated. The result is $d'_2/n_2+d''_2=2d-d^2_{EF}/f-d_1/n_1$. It can be noted that if $d''_2=0$ and $d_2=d'_2=d_1$, $d_{EF}=D$, and $n_2=n_1$ the equation reduces nicely, giving the desired combinations of $d'_2$ and $d''_2$ that will give imaging. The distances $d'_2$ and $d''_2$ must further be reduced to the transit time. The transit time, $T_I$, for one pass from the SLM to Auxiliary Mirror I and back is given by $cT_I/2=n_1d_1+2d+n'_2d'_2+d''_2$. This can be rewritten to give a second equation involving $d'_2$ and $d''_2$, $n_2d'_2+d''_2=(cT_I/2)-n_1d_1-2d_{EF}$. From these equations there is an allowed range for the variables $d'_2$ and $d''_2$ and $T_I$. A plot of $d''_2$ versus $d'_2$ (shown in FIG. 13) can be created showing the region of interest, where $d'_2$ and $d''_2$ are positive. It could then be noted that the slope of the first equation is $-1/n_2$ and the intercepts that depend on $d_2$, f, $d_1$, and $n_1$ are also fixed. The slope of the second equation is $-n_2$ (constant) and the intercepts depend on $T_I$, which is variable. The line shifts to the right as $T_I$ increases. The minimum value of $T_I$ occurs when the two lines intersect on the vertical axis, i.e. $T_{I,min}=(2/c)\{n_1d_1+2d_{EF}+(2d_{EF}-[d^2_{EF}/f]-[d_1/n_1])\}$. There is a minimum value for $d_2$. The line representing the distance $d_2$, $d'_2+d''_2=d_2$, can be plotted, from the lens f1 to the back of the glass block. This line also moves to the right as $d_2$ increases. The smallest value of $d_2$ occurs when the lines intersect on the vertical axis. That gives the minimum distance from the lens f2 to the back of a glass block, which is the distance from the lens f1 to Auxiliary Mirror 1, $d_{2,min}=2d_{EF}-(d^2_{EF}/f)-(d_1/n_1)$.

Combining equations to solve for the thickness of the glass and of the air, these expressions are most easily written if $2d_{EF}-(d^2_{EF}/2f)-(d_1/n_1)$ is replaced in terms of $d_{2,min}$ and if $n_1d_1+2d$ is replaced in terms of $T_{I,min}$:

$$d'_2=\{n_2/(n_2^2-1)\}\{[(cT_I/2)-n_1d_1-2d]-[2d_{EF}-(d^2_{EF}/f)-(d_1/n_1)]\}=\{n_2/(n_2^2-1)\}(c/2)(T_I-T_{I,min})$$

$$d''_2=\{-n_2/(n_2^2-1)\}\{(1/n_2)[(cT_I/2)-n_1d_1-2d]-n_2[2d_{EF}-(d^2_{EF}/f)-(d_1/n_1)]\}=d_{2,min}-\{1/(n_2^2-1)\}(c/2)(T_I-T_{I,min})$$

This gives the incremental thickness of the glass, $d'_2$, that will give an incremental time increase, $T_I-T_{I,min}$. An expression for the full distance $d_2$, from lens f2 to the back of a glass block can be obtained by combining these equations: $d_2=d_{2,min}+\{1/(n_2+1)\}(c/2)(T_I-T_{I,min})$. This starts at $d_{2,min}$ as expected and increases with $(T_I-T_{I,min})$. Distance $d_2$ can also divided into $d'_2$ and $d''_2$. As the time delay increases the position of the reflecting surface moves back, the glass becomes thicker and the air layer thinner. For that refractive index, the air layer is decreasing twice as fast as the auxiliary mirror is moving back. The size of various parameters can also be estimated for a typical situation. One can choose $d=f1=40$ cm, $f=50$ cm, $d_1=3.81$ cm(1.5 in), and $n_1=1.5$. $d_{min}=61.46$ cm, $T_{min}=9.58$ nanoseconds, and $\Delta d'_2/\alpha T_I=1.8 \times 10^{11}$ mm/sec. Thus, a delay of $10^{-12}$ seconds is desired, a block 0.18 mm thick can be used.

Figure 14B:
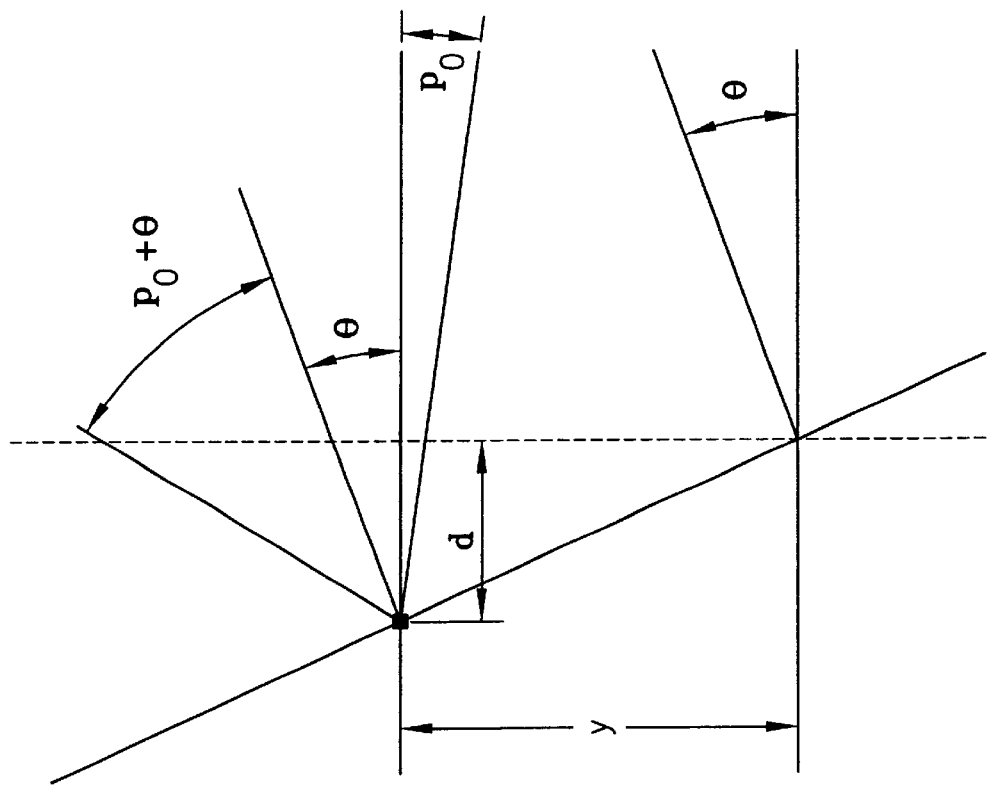
FIG. 14b is another ray diagram in accordance with one embodiment of the present invention.
Figure 14A:
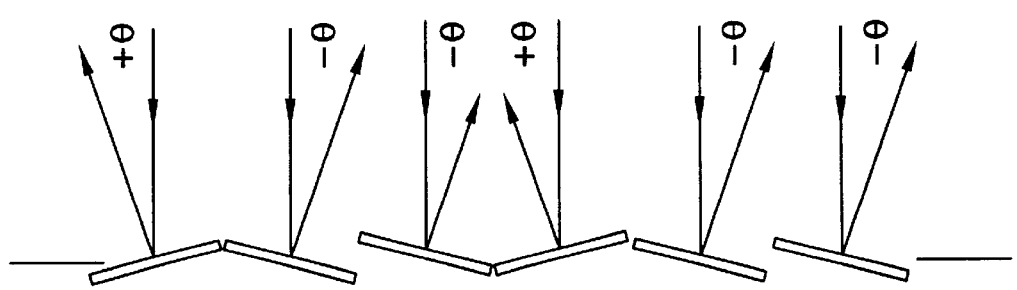
FIG. 14a is a ray diagram of a deformable mirror device in accordance with one embodiment of the present invention.

Deformable Mirror Device SLM. To derive a ray matrix for a particular situation two equations are needed, one showing how the distance of a ray from the axis changes as the ray moves through the object, and the other showing how the ray slope changes. Some pixel-mirrors of the DMD are oriented with their normals at $+\theta$ and some at $-\theta$, as shown in FIG. 14a, where for one device $\theta=10°$. The surface of the DMD may be defined as a vertical line (y direction) intersecting the center of each pixel so that part of the pixel is behind the surface and part is in front of it. A ray can enter from the right with an angle $p_o$, as shown in FIG. 14b, and intersects the pixel at a distance y above the center of the pixel and is reflected off the pixel. At the point the ray intersects the pixel it is a distance $d=y \tan \theta$ behind the surface. In going from the surface to the pixel, the height of the ray has increased a distance $d \tan p_o =y \tan \theta \tan p_o$. After reflection from the pixel the ray again passes through the surface. In doing so the height has further increased a height $d \tan(p_o+2\theta)=y \tan \theta \tan(p_o+2\theta)$. The height has changed by a total distance $\Delta y=y \tan \theta [\tan(p_o)+\tan(p_o+2\theta)]$.

The ray matrices deal with paraxial rays so that $p_o<<\pi$, and $\theta=10°<<180°$, also a small angle. Putting the tangent of the angle equal to the angle, the increase in height $\Delta y=2y\theta(\theta+p_o)$. The net result of all these steps is that the increase in height is proportional to the product of small angles and can be neglected. Thus the first matrix ray equation relates the input y value, $y_o$, with the output y value, $y_1$, as $y_1=y_o$. The second equation is the one for the slopes. Using the law of reflection, the incident slope, $p_o$, and the reflected slope, $p_1$, are related as $p_1-\theta=p_o+\theta$, or $p_1+p_o+\theta$. Combining these equations into a 3×3 ray matrix yields the ray matrix for the DMD:

$$\begin{pmatrix} y_1 \\ p_1 \\ 1 \end{pmatrix} = \begin{pmatrix} 1 & 0 & 0 \\ 0 & 1 & 2\theta \\ 0 & 0 & 1 \end{pmatrix} \begin{pmatrix} y_o \\ p_o \\ 1 \end{pmatrix}$$

There is an addendum that can be mentioned, where the discussion could also apply to reflection off a tipped plane mirror if extending the edge of the pixel-mirror. Thus, the matrix equation also applies to a tipped plane mirror if the tip angle is small. If the tip angle is not a small angle, however, then the approximation does not hold and there will be an increase in distance from the axis.

Figure 15:
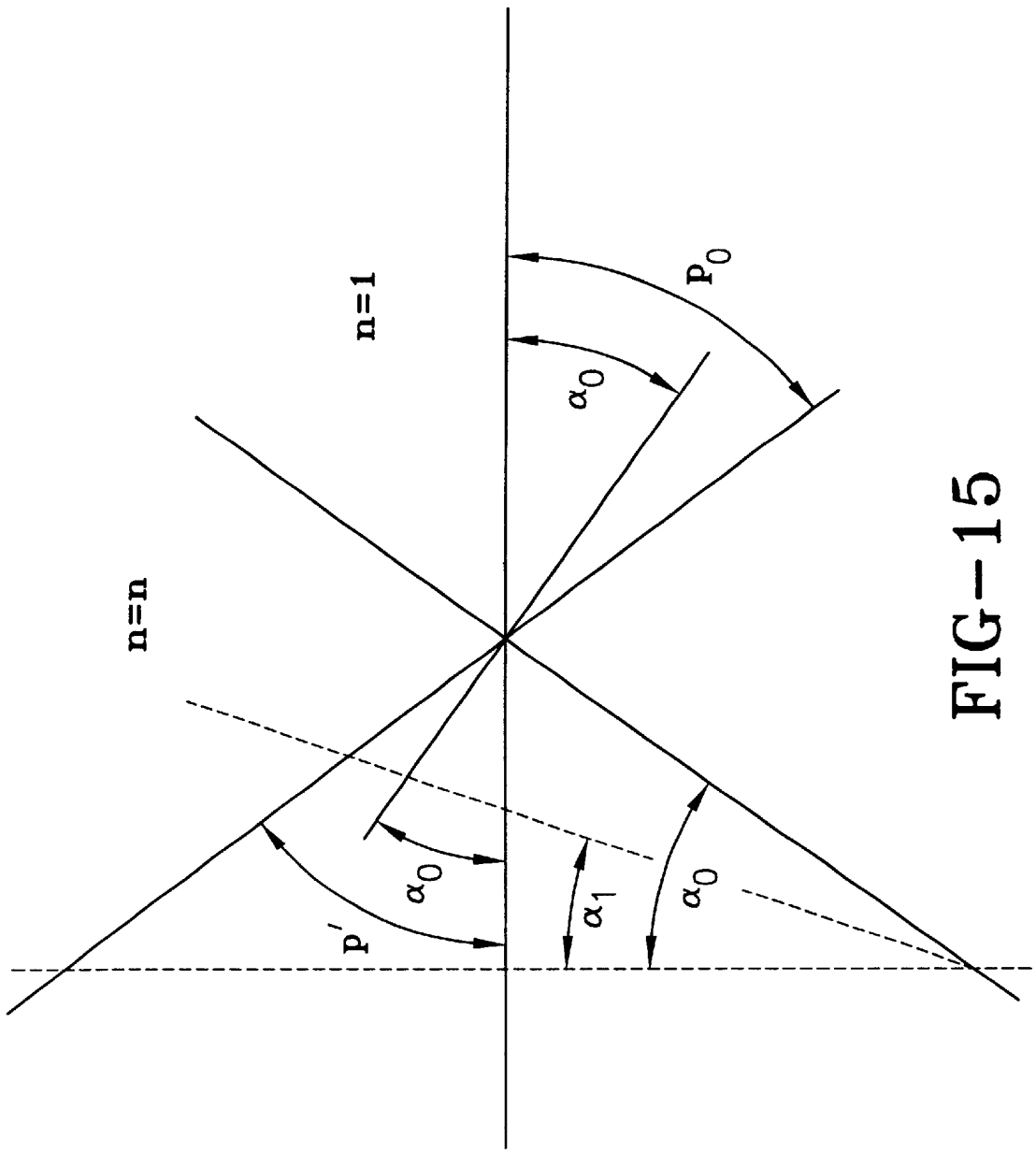
FIG. 15 is a ray diagram for a small angle prism in accordance with one embodiment of the present invention.

Next, a prism with a small angle is considered, as shown in FIG. 15. A prism with its apex pointing down can be considered. The refractive index of the prism material is n. The two large sides make small angles $\alpha_o$ and $\alpha_1$ with the vertical. A ray with slope $p_o$ and height $y_o$ can come in from the right, be refracted at the interfaces, and leave. Since the angles between the surfaces and the vertical are small, arguments like those used previously for the mirror can be used to show that the vertical displacement in crossing the prism can be neglected. The first matrix equation is then $y_1=y_o$. Snell's law can be used to derive the equation for the change of slope. The entering ray has a slope $p_o$. The slope of the ray exiting the surface is p'. The angle between the ray entering the surface and the normal is $p_o-\alpha_o$. Similarly, the angle between the ray exiting the surface and the normal is $p'-\alpha$. Snell's law is then $\sin(p_o-\alpha_o)=n \sin(p'-\alpha_o)$, or using the small angle restriction, $np'=p_o+2(n-1)\alpha_o$. A comparable equation can be written for the ray as it exits the left-hand surface: $p_2=np'+(1-n) \alpha_1$.

Eliminating p' and defining the prism angle, $\alpha=\alpha_o-\alpha_1$, we have the equation for the change of slope by the prism, $p_2=p_1+(n-1)\alpha$. The ray matrix for the small angle prism is then:

$$\begin{pmatrix} y_2 \\ p_2 \\ 1 \end{pmatrix} = \begin{pmatrix} 1 & 0 & 0 \\ 0 & 1 & (n-1)\alpha \\ 0 & 0 & 1 \end{pmatrix} \begin{pmatrix} y_2 \\ p_2 \\ 1 \end{pmatrix}$$

Discussion

A dual White cell is shown in FIG. 3 connected by a polarizing prism beamsplitter. The mirror in the optical spatial light modulator 12 and spherical mirrors B 13 and C 14, combined with lens f1 27, constitute one White cell, hereafter referred to as Cell I. The mirror in the SLM and spherical Mirrors E 24 and F 25, combined with lens f2 26, constitute a second White cell called Cell II. The distances between the SLM and Mirrors B and C are the same, and the distances for light reflected off the polarizing beamsplitter going to Mirrors E and F are the same. The distance from the SLM to Mirrors E and F is greater than the distance from the SLM to Mirrors B and C. In operation, a light beam bounces from the SLM to one of Mirrors B, C, E and F and back again on each traverse of the cell.

The polarizing beamsplitter and the SLM determine which cell the beam goes to on each pass. The polarizing beam splitter transmits light of one polarization, say the plane of the figure, and reflects light of the polarization perpendicular to the plane of the figure. If the light starts out going to Mirror B with polarization in the plane of the figure and the SLM does not change the polarization, it is then reflected back and forth between the SLM and Mirrors B and C. Conversely, if the light starts towards Mirror E with polarization perpendicular to the plane of the figure and the SLM does not change the polarization, it will continue to reflect between the SLM and Mirrors E and F. The path of a beam can be changed from one cell to the other by using the SLM to rotate the plane of polarization as the beam bounces off the SLM.

The present disclosure discusses a set five possible imaging conditions. First, the focal length of lens f1 is chosen to image Mirror B onto Mirror C and vice versa. Second, similar to the first condition, the focal length of lens f2 is chosen to image Mirror E onto Mirror F and vice versa. This requirement may be met by placing Mirrors B and C in the right hand focal plane of lens f1 and by placing Mirrors E and F in the focal plane of lens f2. The third condition is that Mirror B should be imaged onto Mirror F, and Mirror C should be imaged onto Mirror E. The requirement that Mirrors B and C be in the focal plane of lens f1 together with the requirement that Mirrors E and F be in the focal plane of lens f2 also satisfies this condition.

The last two imaging conditions are also comparable. The fourth condition is that the focal lengths of Mirrors B and C are chosen so that, in conjunction with lens f1, Mirrors B and C image a small spot of light on the SLM back onto another small spot on the SLM. The last condition is that the focal lengths of Mirrors E and F are chosen so that, in conjunction with lens f2, a small spot of light on the SLM is again imaged back onto the SLM.

In operation, a point of light starts on a small mirror next to the SLM called a turning mirror. The light is directed towards Mirror B. Suppose the light is polarized in the plane of the figure so that it is not reflected off the polarizing beam splitter. Mirror B images the spot light onto the SLM. In one scenario, the light is reflected off the SLM and imaged by lens f1 onto Mirror C, which images it to a different spot on the SLM. It then goes to mirror B, which again images it onto the SLM. The light bouncing back and forth forms a sequence of spots on the SLM.

If the polarization is changed by the SLM to be perpendicular to the plane of the figure, the light bounces in a similar fashion back and forth between Mirrors E and F and the SLM. The plane of polarization of the light can be changed at any bounce off the SLM so that any combination of paths in cells one and two can be chosen. The quantity of interest, the transit time through the cell, is the number of bounces off Mirrors B and C times the transit time from the SLM to Mirror B and back, plus the number of bounces off Mirrors E and F times the transit time from the SLM to Mirror E.

Considering the exact locations of the spots of light on the SLM, there are various configurations depending on the locations of the centers of curvature of Mirrors B, C, E and F, and also depending on the spot size relative to the size of the SLM. The centers of curvature of Mirrors E and F are superimposed on those of Mirrors B and C so that the spots from cell E–F are also coincident with those from cell B–C. Reference will only be made to the centers of curvature of Mirrors B and C for simplicity.

FIG. 2 is a view of the SLM looking from lens f1, showing the most traditional spot configuration. The SLM is assumed to have a square shape. Also shown are two long thin mirrors, the input and output turning mirrors respectively below and above the SLM. For this case, the turning mirrors are centered at distances of $\pm 2m\delta$ where m is an integer related to the number of times the light is re-imaged onto the SLM and the SLM is taken to have dimension $2(2m-1)\delta$ on a side and $\delta$ is the distance below and above the optical axis, respectively, of the projections of the centers of curvature of Mirrors B and C.

Figure 16C:
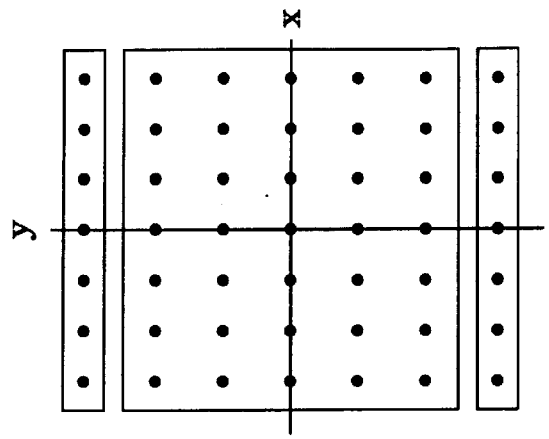
FIG. 16c is another diagram showing spot location on a deformable mirror device in accordance with one embodiment of the present invention.
Figure 16B:
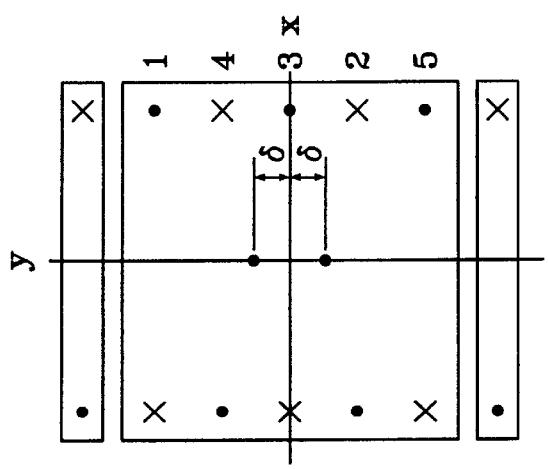
FIG. 16b is another diagram showing spot location on a deformable mirror device in accordance with one embodiment of the present invention.
Figure 16A:
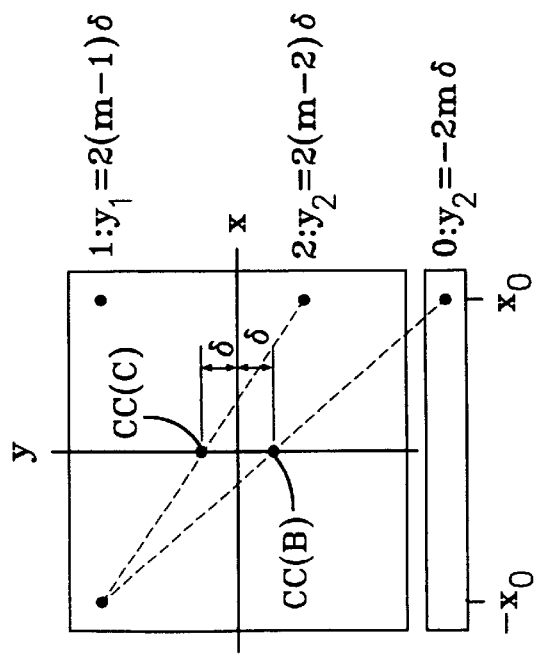
FIG. 16a is a diagram showing spot location on a deformable mirror device in accordance with one embodiment of the present invention.

Imagine a point of light on the right end of the input turning mirror, as shown in FIG. 16a, conditioned, as mentioned previously, to be traveling toward Mirror B. That spot is imaged to a new point on the SLM located opposite the center of curvature of Mirror B and an equal distance from the center of curvature. The position of the input spot on the turning mirror is $(x_o, y_o)$, where $y_o=-2m\delta$. The point image is at a location opposite the center of curvature of Mirror B. To find that location the sign of the coordinates is reversed and $2\delta$ is subtracted because the center of curvature of Mirror B is below the axis. If the light were being imaged by Mirror C, the sign of the coordinates would be reversed and $2\delta$ added. The result is $$(x_1, y_1)=(-x_o, -y_o-2\delta)=(-x_o, +2\delta(m-1)).$$

The light is then reflected back and re-imaged by Mirror C. The point image is opposite the center of curvature of Mirror C and an equal distance from it. The location is then at $(x_2, y_2)=(-x_o, -y_o, +4\delta)=(x_o, -2\delta(m-2))$. As the process continues, the light alternatively bounces off Mirrors B and C and is re-imaged. Locations of successive spots are designated as $(x_n, x_n)$ at the n-th re-imaging. These spot locations are given by $$(x_n, y_n)=((-1)^n x_o, (-1)^n(y_o-2n\delta))=((-1)^n x_o, (-1)^n 2(m-n)\delta).$$

Imagine a set of points for m=3, as shown in FIG. 16b. The point images can be indicated with "x"'s. The images form two vertical lines at $\pm x_o$. The horizontal coordinate of the points alternates to the right and left of center. As the image number n increases, the spots also alternate above and below the axis first moving successively towards the axis for n=1, 2, and 3, and then away from the axis for n=4, 5, and 6. The process ends when n=2m=6 and the imaged spot winds up on the output turning mirror at the top. There are 2m−1=5 point images on the SLM.

There may be gaps between "x" spots in the columns on both sides. These can be filled by placing a second input spot at $(-x_o, y_o)$. More spots can be added on the input turning mirror, as shown in FIG. 16c, at different values of $x_o$. A complete line of spots then results on the input turning mirror, the spots being paired at different values of $\pm x_o$. Columns of spots can fill the area of the SLM.

Instead of a specific situation where the centers of curvature of mirrors B and C are equidistant from the optical axis, a more general situation can be discussed. The center of curvature of Mirror B is at location $y_B$. The center of curvature of Mirror C is a distance $2\delta$ above it. The input spot is at location $x_o, y_o$, The expression for the location of spot n is $(x_n, y_n)=((-1)^n x_o, (y_B+\delta)+(-1)^n(y_o+2\delta n))$, where $y_B+\delta$ is the location of the point midway between the two centers of curvature. The equation still gives two columns of spots parallel to the line between the centers of curvature, the y-axis. The spots alternate from one column to the other as n increases. In general, a distance $4\delta$ separates the spots in a given column. The vertical positions of the spots in one column are, however, not identical with those in the other column. They depend on the y value of the location of the input spot. The equation reduces to the previous equation when $y_B=-\delta$. Two special cases of present themselves. For simplicity, the origin is taken midway between the centers of curvature so that $y_B+\delta=0$. In the first case $y_o$ is an even integer times $\delta$, or $y_o=n_e\delta(n_e$ even). This is the situation for n=6. Then the y values of the spots in one column are midway between the y values of the spots in the other column. The input spot is on the bottom turning mirror and the output spot is on the top turning mirror. There are m−1 reflections off the SLM.

Figure 17:
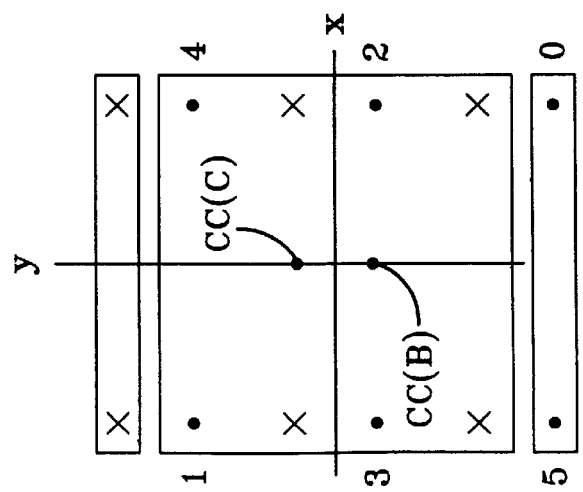
FIG. 17 is another diagram showing spot location on a deformable mirror device in accordance with one embodiment of the present invention.

The second specific case arises when $y_o$ is an odd multiple of $\delta$, $y_o=n_o\delta(n_o$ odd). Then for each spot in one column there is a spot opposite it in the other column. The input spot is on the bottom turning mirror and so is the output spot. There are still n−1 spots on the SLM. This situation can be illustrated for n=5 in FIG. 17. It is possible to fill in the gaps between the spots in the two columns. That can be accomplished by putting an input spot on the top turning mirror at location $(x_o, -y_o)$ with light directed towards Mirror C. For both configurations one can fill the SLM with spots by using many spots on the turning mirrors.

Generally, it is desired to have the spots close together to utilize the SLM area in an optimum fashion. If the SLM is divided into independent areas called pixels then it would be preferred to have one spot per pixel. Let the spot size be $\sigma$. Since the spots are separated by a vertical distance of $2\delta$, it may be preferred that $\sigma=2\delta$, i.e. the distance between the centers of curvature of mirrors B and C should be equal to the spot size. The spots may also be separated by a distance $2\delta$ in the horizontal direction.

The number of bounces on the SLM was taken to be equal to the number of spots from top to bottom on the SLM. This may well not be the case. In many situations the number of spots from top to bottom on the SLM may be of the order of many hundreds but only tens of bounces may be desired. In that case, groups of spots can bounce back and forth independently. Two examples can be considered. There can be sets of spots arranged in columns being reflected, or other array of spots being reflected. In both cases the set of spots can be reflected five times off the SLM. The use of spot arrays allows one to make most effective use of the SLM capabilities.

The time delays possible with the dual cell with unequal arm lengths are also considered. As described, there are a number of beams, each executing m bounces. Each beam can go to either Cell I, which includes Mirrors B or C, or go to Cell II, i.e. Mirrors E or F. To derive the expression for the time delays, $D_{BC}$ is defined to be the optical distance in Cell I, i.e. from the SLM to Mirror B or C and back. $D_{EF}$ is defined to be the optical distance in cell II, i.e., from the SLM to Mirror E or F and back. $d_{BC}$ is the distance from the cell lens to either Mirror B or Mirror C, and the corresponding distance in to Mirrors E and F to be $d_{EF}$.

$$D_{BC}=2n_1d_1+2d_{BC}$$

$$D_{EF}=2n_1d_1+2d_{EF}$$

Here, $n_1$ and $d_1$ are the refractive index and size of the prism respectively. As before, the light leaving the SLM can be controlled by the polarization change at each pixel to go to either cell. If there are k=m−1 total bounces off the SLM and i of these bounces go to Cell II, then k−i bounces go to Cell I. The total time delay, T, is given by $T=(1/c)((k-i)D_{BC}+iD_{EF})=(1/c)(kD_{BC}+i(D_{EF}-D_{BC}))$. There are three items of interest in this equation. The equation has two terms. The first term is proportional to m and is constant. Thus there is always a constant time delay, $T_c=(1/c) mD_{BC}$ in this device. The second term is proportional to i and is variable. This controlled incremental part, $T_I$, proportional to i, is added to the constant part, giving $T_I=+(i/c)(D_{EF}-D_{BC})$. Increasing i by one unit increases the transit time by an increment, $\Delta T$ given by $\Delta T=(1/c)(D_{EF}-D_{BC})$. Thus the time delay increment, $\Delta T$, is given by the path difference between Cell II and Cell I. This can be made to take on a wide range of values.

The time increment, $\Delta T$, can be expressed in terms of design parameters, $d_{BC}$, $d_{EF}$, $f_1$, and $f_2$. $D_{BC}$ and $D_{EF}$ can be replaced using previous equations. $d_1$ can then be eliminated in each cell using a previous imaging condition, written with d replaced by $d_{BC}$ for Cell I and by $d_{EF}$ for cell II. The result is $$\Delta T=\{2(n_1^2+1)(d_{BC}-d_{EF})+2n_1^2([d^2_{BC}/2f_1]-[d^2_{EF}/2f_2])\}$$

This reduces as expected. If $d_{BC} \to d_{EF}$ and $f_1 \to f_2$ then Cell I becomes identical with Cell II and $\Delta T \to 0$. There are k possible values for i, so there are k possible time delays and the maximum incremental delay, $T_{I,max}$ given by $T_{I,max}=k\Delta T$. Thus the maximum incremental delay is proportional to the maximum number of bounces. This is improved in other designs of the present disclosure.

The dual arm cell can again be extended. As before, the distances $d_{BC}$ and $d_{EF}$ to the pairs of White Cell mirrors are made unequal. The optical distance from the SLM to Mirror F is made greater than that from the SLM to Mirror E. These have the advantage of increased flexibility in the choice of possible delays. The number of possible delays will go as $k^2$ where k is the number of bounces off the SLM.

FIG. 4 is identical to the configuration of FIG. 3 with the exception that Mirror F has been replaced with Lenses G1 25c and G2 25b and Mirror G3 25a. Of these, Lens G1 is chosen so that, in conjunction with Lens F2, the SLM is imaged onto Lens G2. Thus, Lens G2 is conjugate with the SLM. Lens G2 is chosen to image the plane of Lens G1 onto Mirror G3 with unit magnification, so that Mirror G3 is conjugate with the plane of Mirror G1, which is also conjugate to Mirror E. Mirror G3 is chosen to have its center of curvature on Lens G2. The image of its center of curvature then also lies on the SLM, and is located so that the spots bounce as mentioned previously. The imaging conditions of the dual arm cell are still satisfied. An alternative configuration with lenses G1 and G2 replaced by mirrors is also included in the present disclosure. Further, G1 and G2 may be combined into a single lens.

One main improvement comes from the different transit time for light in the arm containing Lenses G1 and G2 and Mirror G3. In addition to $D_{BC}$ and $D_{EF}$ there is a new distance, the optical distance $D_{EG}$ from the SLM to Mirror G3 and back where $D_{EG}=2n_1d_1+2d_{EG}$, $n_1$ and $d_1$ being the refractive index and size of the prism as defined previously. Then $d_{EG}$ can be written in terms of $f_{G3}$ the focal length of Mirror G3 as $$d_{EG}=d_{EF}+2f_{G3}.$$

A configuration then exists with the optical distances from the SLM to Mirrors B and C equal but the distances from the SLM to Mirrors E and G unequal. To proceed, it is necessary to know the number of bounces a given spot will make off the SLM. As before, the number of bounces is designated m, and for the sake of discussion it is assumed there are an even number of bounces. The difference in transit times between the SLM and Mirrors B or C and Mirror E is then set equal to the smallest desired time increment, $\Delta T$. The difference in transit times between Mirrors B or C and Mirror G3 is set to $((m/2)+1)\Delta T$, where $\Delta T=(1/c)(D_{EG}-D_{BC})$. These times are accomplished by choice of focal lengths for the various elements. The reason for these choices will be made apparent. Since $\Delta T$ is a difference in lengths, it can be made quite small.

In examining the possible sequences of bounces on the SLM, it can be assumed that the spot starts on the turning mirror next to the SLM and goes first to Mirror B and back to the SLM. From the SLM there are two choices, towards either Mirror C or Mirror G, depending on the polarization of the light leaving the SLM. Upon return the light can either go to Mirror B or Mirror E. After odd-numbered bounces off the SLM, the light can go to either Mirrors C or G. After even-numbered bounces off the SLM, the light can go to either Mirrors B or E. The light bounces half the time off Mirrors B or E and half the time off Mirrors C or G. The shortest transit time occurs when the light always goes to Mirrors B and C and the longest transit time occurs when the light always goes to Mirrors E and G.

The transit time for a given sequence of bounces can then be expressed by letting i be the number of bounces off Mirror E and j be the number of bounces off Mirror G. $0 \leq i, j \leq (m/2)$. Then the number of bounces off Mirrors B and C will be $((n/2)-i)$ and $((m/2)-j)$ respectively. The transit time for the m bounces going i times to Mirror E and j times to Mirror F, T(ij), is given by $$T(ij)=(1/c)\{((m/2)-i)D_{BC}+iD_{EF}+((m/2)-j)D_{BC}+jD_{EG}\}=(1/c)\{mD_{BC}+i(D_{EF}-D_{BC})+j(D_{EG}-D_{BC})\}$$

Or, using previous expressions, $T(ij)=T_o+\Delta T(i+j((m/2)+1))$ where $T_o=(m/c)D_{BC}$. The first term, $T_o$, is a constant and represents a base minimum delay. It occurs when i=j=0. The progression of increasing delays is now shown. After i=0, the next delay occurs when i=1, j=0. i can continue to be incremented until i=(m/2). Then set i=0, j=1 and start incrementing i again. This is identical to a radix system of base (m/2). The longest delay occurs when i=j=(m/2). It is $T\{(m/2), (m/2)\}=\Delta T\{(m/2)^2+2(m/2)\}$. As predicted, the maximum number of delays is proportional to $m^2$.

A configuration that is optically identical to the previous configuration can be imagined, having Lenses G1 and G2 replaced with spherical mirrors F1 and F2. As before, Mirror FI, in conjunction with lens F2, images the SLM onto Mirror F2. Mirror F2 then images Mirror F1 onto Mirror G3. Finally, the center of curvature of Mirror G3 is centered on Mirror F2.

The design of the dual armed TTD unit can additionally be modified to improve the number of potential time delays, where the number of delays can be proportional to $2^m$ rather than to $m^2$. The modification can be done in two parts: first by adding Auxiliary mirrors in the plane of the SLM, and then adding time delay mechanisms in conjunction with the auxiliary mirrors. The dual cell with auxiliary mirror is shown in FIG. 5 as a three-dimensional rendition of the dual cell. Added to it are two mirrors, one over the SLM called Auxiliary Mirror I, and an extra mirror or other reflective material over the edge of the beam-splitting cube, called Auxiliary Mirror II. The optical axis is between the SLM and Auxiliary Mirror I. Lens fI has been made larger to cover the SLM and Auxiliary Mirror I. The turning mirrors are at the left of Auxiliary Mirror I and the SLM.

The operation is comparable to that of the dual cell with the plane of the SLM enlarged. The light starts on the Input Turning Mirror and goes first to Cell I. Mirrors B and C image the Input Turning Mirror spot onto the SLM. If the SLM does not change the polarization the light is imaged. onto Auxiliary Mirror I and again onto the SLM. If the SLM changes the polarization, the light that is reflected off the beam-splitting cube is imaged onto Auxiliary Mirror II. Light leaving Auxiliary Mirror II is similarly re-imaged back onto the SLM. Lens f1 images Mirror B onto Mirror C and lens f2 images Mirror E onto Mirror F, as before. Other configurations satisfying the same requirements but having various advantages are also presented in the present disclosure.

Figure 18:
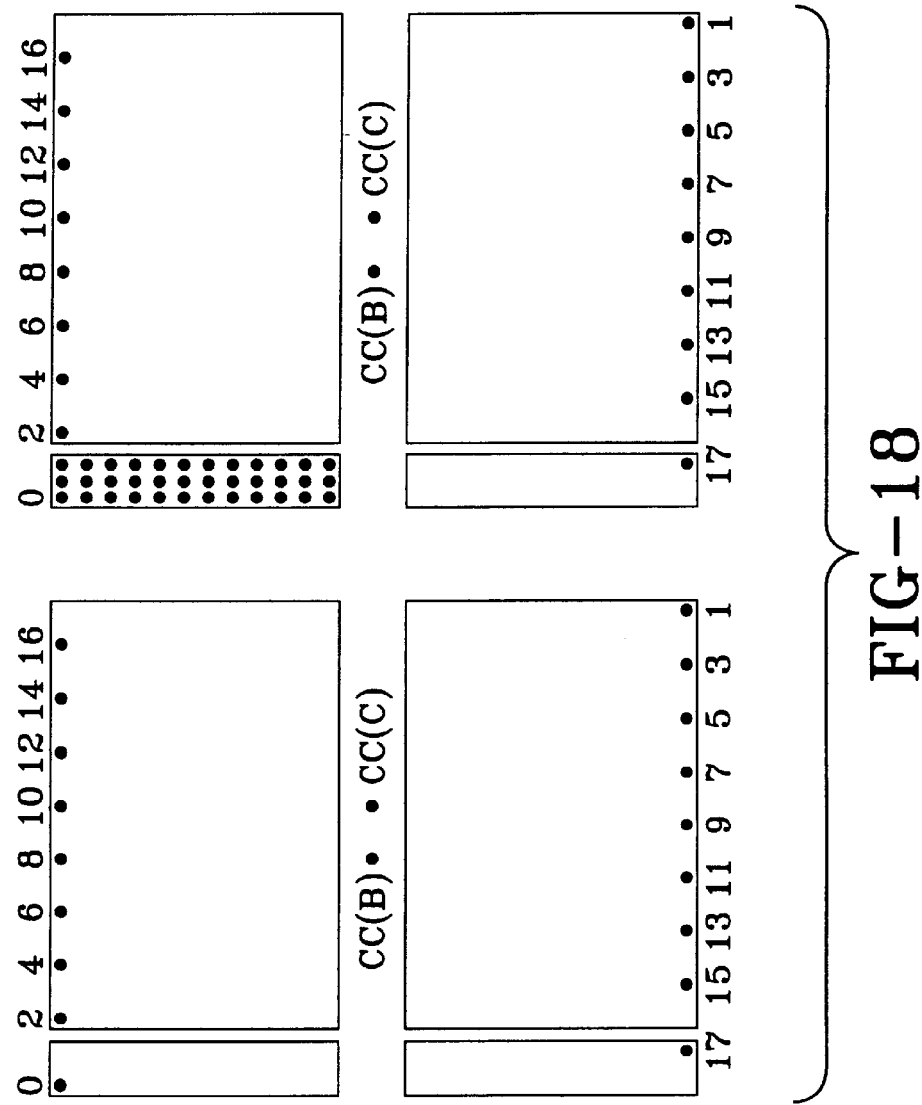
FIG. 18 is another diagram showing spot location in the plane of a deformable mirror device in accordance with one embodiment of the present invention.

The number of bounces on the SLM, m, is chosen to be equal to the number of bits of time delay required. For example if two hundred different time delays are desired, that would require eight bits, m=8, requiring eight bounces on the SLM. The SLM surface is then divided into m areas such that each beam falls once into each area. Thirty-six input spots are shown on the turning mirror in FIG. 18. Only the images associated with the upper left hand turning mirror spot are shown on the SLM and Auxiliary Mirror for simplicity.

The length of the path traveled by the beam can be changed in Cell II on the traverse in which it strikes each of the different areas. To discuss this approach, suppose Mirrors B and C are taken the same distance from the SLM as Mirrors E and F. Extra path length can be placed in front of or in place of each area of Auxiliary Mirror II. The methods of increasing the path length will be presented shortly. The distance associated with the increase in path length is chosen to be a binary function of some minimum distance, $\Delta L$, and $\Delta T$ is the minimum non-zero time delay. The relationship is given by $\Delta T=(2n_1/c)\Delta L$, where $n_1$ is the refractive index of the material in which the light probagates and c is the speed of light in vacuum. Thus the incremental time increase associated with first area on Auxiliary Mirror II is $\Delta T$, that with the second area is $2\Delta T$, that with the third area is $4\Delta T$, etc. The general expression for the time delay with this approach is $T=2mD_{BC}+\Delta T(\delta_1+2\delta_1+4\delta_3+.+2^{(m-1)}\delta m)$ where the $\delta_1$ describe whether the i-th delay is added in. If $\delta_i=0$, light goes to Auxiliary Mirror I, if $\delta_i=1$ then light goes to Auxiliary Mirror II. There is a constant delay, $T_c=2mD_{BC}$. The factor of two in front of $D_{BC}$ occurs because the distance from the SLM to Auxiliary Mirror I and back required for this case is twice the distance from the SLM to Mirror B or Mirror C and back as required for the Dual Arm cell. There is also an incremental delay, $T_I=2\Delta T(\delta_1+2\delta_1+4\delta_3+.+2^{(m-1)}\delta m)$. The maximum incremental delay, $T_{I,max}$ is given by $T_{I,max}=\Delta T(2^m-1)$. This is a considerable improvement. The incremental length, $\Delta L$ can be implemented in many ways. For small time increments, blocks of material such as glass can be added next to the auxiliary mirror. For larger time increments an optical transmission line of the desired length may be added.

The method of adding blocks of glass or other transparent material is shown in FIG. 5a, where blocks of glass of different thickness are shown. The blocks are oriented to replace Auxiliary Mirror II. The thickness of the blocks are chosen so that the additional time required for the beams to go through successive blocks increases as powers of two times the initial thickness. In operation, the light in a given beam goes either to each section of Auxiliary Mirror II and receives the associated delay, or goes to Auxiliary Mirror I and receives no delay. For example,. on a particular pass through the cell suppose the beam's polarization is such that it passes through the beamsplitter. This beam goes to Mirror B or C, from which it goes to Auxiliary Mirror I, encounters no glass blocks, and receives no delay. If on that pass the beam's polarization has been changed, the beam goes to Mirrors E or F and thence to Auxiliary Mirror II where it passes through the associated extra optical distance of the glass block.

As before, $d_1$ and $n_1$ are the thickness and refractive index of the beam-splitting prism. Let f be the focal length of the White cell mirrors, and let d be the distance from lens f2 to the White cell mirrors E and F, as well as to mirrors B and C. The focal length f1 of cell lens f2 is set equal to $d_{EF}$. The distance $d_2$ from lens f1 to the back of a glass block is divided into two parts, $d'_2$ filled with glass of refractive index $n_2$, and $d''_2$, filled with air. This corresponds to a representative block of glass.

The expressions for the thickness of the air, $d''_2$ and thickness of the glass, $d'_2$ are given in terms of two parameters, the minimum distance between the lens and Auxiliary Mirror I $d_{2,min}$ and the minimum transit time, $T_{min}$, from the SLM to Auxiliary Mirror I. They are $d_{2,min}=2d_{EF}-(d^2_{EF}/f)-(d_1/n_1)$, which reduces to the single cell imaging case if the material along distance $d_2$ is changed to glass of index $n_1$ and $d_2 \rightarrow d_1$. For that case there is a minimum transit time from the SLM to Auxiliary Mirror I and back. It is $T_{min}=(2/c)(n_1d_1+2d_{EF}+d_{2,min})=(2/c)(n_1d_1+2d_{EF}+(2d_{EF}-(d^2_{EF}/f)-(d_1/n_1))$. Both the minimum distance and the minimum transit time occur if there is no glass, $d'_2=0$.

Then in terms of these parameters the thickness $d'_2$ of a glass block required for incremental time delay $T_I-T_{I,min}$ is given by $d'_2=\{n_2/(n_2^2-1)\}(c/2)(T_I-T_{I,min})$, and the total distance, $d_2$, from lens fI to Auxiliary Mirror I is given by $d_2=d_{2,min}+\{1/(n_2+1)\}(c/2)(T_I-T_{I,min})$. By setting $(T_I-T_{I,min})=2^{(i-1)}\Delta T$, these equations can then be used to calculate the thickness of the $i^{th}$ block. Alternatively, if all the dimensions are known, then the transit time can be calculated as $\Delta T=\{2(n_2+1)/c\}(d_2-d_{2,min})$. This is comparable to the previous equation for the dual cell. The approach using a glass block is good for very small delays. If the blocks get too long then the beams start to broaden and are vignetted by the edge of the block. In that case other approaches may be used.

One approach would be to use an array of optical fibers in place of the glass blocks.

The lens transmission line provides another method of generating time delays that may be appropriate when the delays are much longer than those allowed by the glass block method. The situation is shown in FIG. 9. There are five lens groups labeled 43a, 43b, 43c, 43d, and 43e, each group comprising three lenses. The plane on the right 44 is the input or object plane and is intended to be coincident with and replace the plane of Auxiliary Mirror II. Light that was reflected off Auxiliary Mirror II now proceeds to the left into the lens system. There are five planes conjugate to the plane of Auxiliary mirror 11, labeled 45a, 45b, 45c, 45d, and 45e, lying at the junctions of the five lens groups. FIG. 10 shows the plane of Auxiliary Mirror II and the five conjugate planes in three dimensions. As all the groups may operate identically, only one group will be considered. Recall that at the input to a group and the output to a group there is a plane conjugate to Auxiliary Mirror II (and therefore to the SLM). There are three imaging tasks performed by a group. The first task is basic to the operation and will be considered immediately. The other two tasks deal with light conservation.

The first possible task of a lens group is to image the input conjugate plane onto the output conjugate plane. The lens in the center performs that operation. The focal length of the lens, f, can be separated from both conjugate planes by a distance 2f. This can produce the desired imaging. The input and output conjugate planes are related by a magnification of −1.

In operation, a portion of the areas of each conjugate plane are replaced by vertical strip mirrors. These areas correspond to the areas of the glass blocks in the previous design. This is seen in FIG. 10 where the shaded areas correspond to the mirrors. Light incident in Area I of the plane of Auxiliary Mirror II passes through it and Group G1, and is reflected at conjugate plane 45a by the vertical strip mirror placed to cover the image of Area I. Light passing through Area II of the plane of Auxiliary Mirror II passes through Lens Groups 43a and 43b, and is reflected by a mirror placed in Conjugate Plane 45b at the image of Area II. Similarly, light in areas III, IV, and V is reflected by mirrors strategically placed in Conjugate Planes 45c, 45d, and 45e.

The length of the lens groups determines the time delays. The length of the first lens group may be chosen so that the light that travels through Lens Group 1, reflects from the strip mirror in Conjugate Plane 45a, and travels back has the shortest desired time, ΔT. The length of the second group is equal to that of the first group so that the transit time through groups 43a and 43b and back is 2ΔT. The length of each successive group is then made equal to the sum of the lengths of the preceding groups. The length of group 43c is made equal to the sum of the lengths groups 43a and 43b. The transit time then up through Group 43c up to Conjugate Plane 45c and back is 4ΔT as desired. The remaining lengths are chosen accordingly so that light passing up through Group m to Conjugate Plane m and back has a time delay $2^{(m-1)}\Delta T$.

Returning to the other. two tasks performed by the lens groups, the second task involves conserving optical throughput. There have been situations where it was be desired to put a plane mirror in the conjugate plane next to the left-hand lens of the group to reflect light back through the system. It will be desirable to have all the light that comes through the center-imaging lens to go back through that lens. To accomplish this, the left-hand lens in each group is chosen so that when the plane mirror is placed next to it, it then images the center lens onto itself. This may be accomplished by letting the focal length of the left-hand lens be equal to the distance of that lens from the center lens. The lens and plane mirror combination will have a focal length of half the center-to-left hand lens distance and there is a magnification of −1 so that the edges of the center lens are indeed imaged onto themselves. Another way of considering the operation of the left-hand lens arises because its focal point is on the center-imaging lens. The left-hand lens collimates light leaving any point on the center-imaging lens. It is still collimated after being reflected by the plane mirror so upon return it is refocused by the left-hand lens back onto the center-imaging lens. The left-hand lens is in actuality a field lens placed next to the output conjugate plane. Since it is next to the conjugate plane it does not affect the imaging of the center lens onto that plane.

The third task performed by a lens group is again devoted to conserving light. It is to assure that all the light entering the center imaging lens of one group left the center imaging lens of the proceeding group. To do this, the center lens of one group can be made the image of the center lens of the proceeding lens. This can be accomplished by properly choosing the right hand lens of the group so that, when combined with the left-hand lens of the preceding group, the desired imaging is produced. This can be accomplished by making the focal length of the right hand lens equal to the distance between the right hand lens and the center lens, so that the focal point of the right hand lens is on the center lens. Light leaving a point on the center lens of one group is then collimated by the left hand lens and refocused by the right hand lens of the next group onto the center imaging lens of the next group. There is one minor exception: the first lens in the first group images Mirrors E or F onto the central imaging lens of the first group. With these three imaging conditions, a given conjugate plane is imaged onto the next conjugate plane and no light is lost through aperturing of the center imaging lenses. The process can be extended if more delays are desired with more groups and more areas on Auxiliary Mirror II and its conjugate planes.

In a system of lens groups, alternatively known as a lens train, the segmented mirrors can optionally be replaced with gratings that reflect one wavelength and pass all others, such as a Bragg grating. Then for a beam bouncing through the White cell, the delay it experiences would depend on its wavelength. One could use a tunable laser to program in the delay by changing the wavelength of the device. Such a cell would not require a spatial light modulator or a dual White cell, just a single White cell with the lens train in place of Mirror A, where the SLM used to be.

There are other approaches that use tunable lasers to map delay to wavelength. In one such approach light is projected down a fiber containing Bragg gratings tuned for different wavelengths. Depending on the wavelength of the beam at any instant, the light travels down the fiber a different distance to the correct wavelength-specific grating, passing through all the other gratings, and gets reflected back. A tunable laser or wavelength-altering element may be required for each antenna element in this approach.

A Deformable Mirror Device spatial light modulator (DMD) is also used in the present invention. The DMD has the potential advantages of higher information density and faster speed. But it also has some associated problems that have to be addressed. The DMD is a pixellated spatial light modulator. That is, the reflecting surface is divided into incremental image areas. Each image element has a mirror surface that can be independently rotated to two positions, for example making angles of ±10° with the surface. The elements can modulate the direction of the reflected light by changing the input direction to one of two output directions. It does this element by individual image element. The direction change can be transformed into an amplitude change by directing the reflected light through an aperture or directing it to something blocking it. Pulsing the mirror between transmitting and blocked states, at a rate faster than eye or detector response, can also change the average observed amplitude.

Imagine a cut through the DMD surface, where the individual mirrored image elements are shown in FIG. 14a. Some are rotated in one direction, the remaining mirror elements in the other possible direction. The angle, θ, of tip is ±10° on presently available devices so that light incident normal to the plane of the DMD is reflected from a given image element at ±20°. The reflective image elements or pixels are currently square, 16 μm on a side with a spacing of 17 μm between centers. There is a hole in the center of each image element roughly 6 μm in diameter. The pixels rotate about a diagonal. The light incident perpendicular to the paper is reflected in the ±x direction.

Figure 19A:
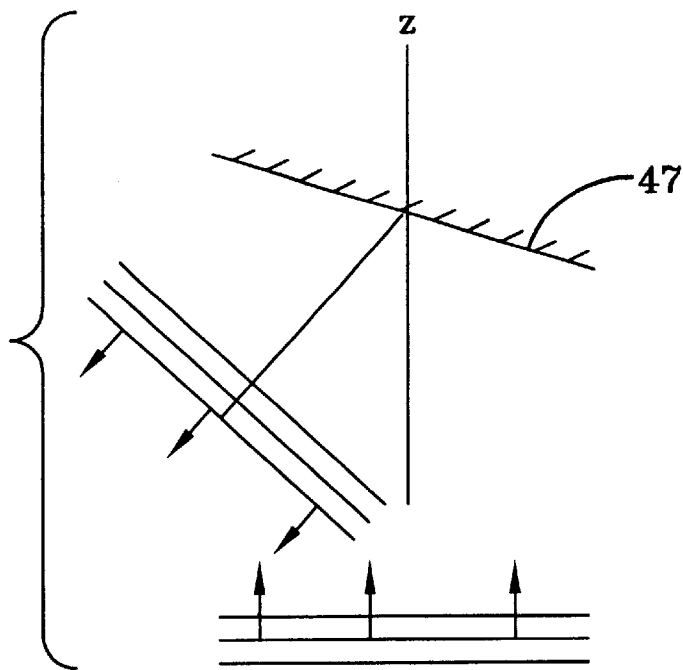
FIG. 19a is a diagram of reflected plane waves in accordance with one embodiment of the present invention.
Figure 19B:
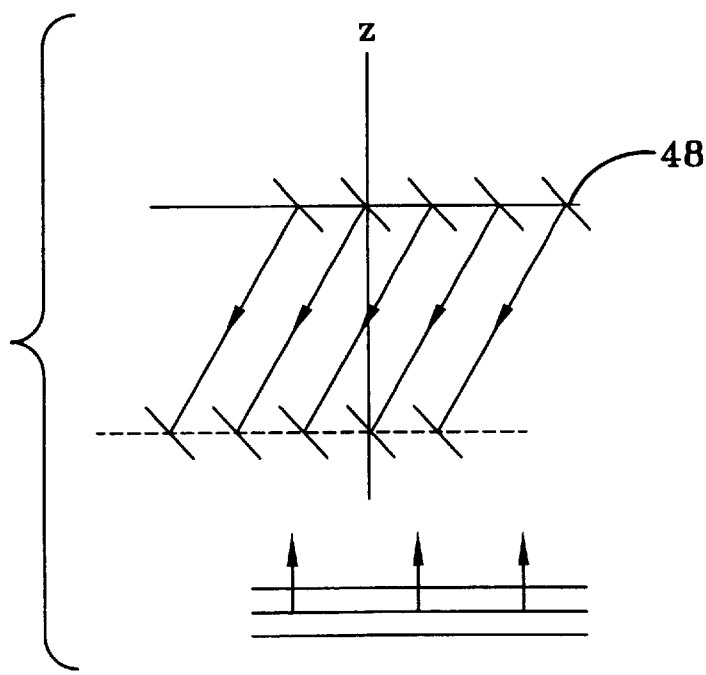
FIG. 19b is another diagram of reflected plane waves in accordance with one embodiment of the present invention.

The DMD presents an interesting pattern on reflection. To see this, compare it to a flat mirror 47 as shown in FIG. 19a. The intersection of the mirror surface with the x-z plane makes an angle α with the x-axis. A plane wave travelling in the z direction enters at the bottom, is reflected off the mirror, and exits to the lower left. This is in the near field of the mirror. A continuous reflected wavefront results as expected. Considering a plane wave reflected off the DMD 48, as shown in FIG. 19b, the image element mirror surfaces are all oriented in the same direction for simplicity. The mirror surfaces do not form a continuous surface as in the case of the extended plane mirror. As a result the field reflected off the DMD is a discontinuous set of wavefronts all travelling in the same direction but with some lagging behind. The discontinuous set forms an "average" plane parallel to the plane of the DMD. However, this average plane is not perpendicular to the direction of propagation of the reflected light.

Figure 20A:
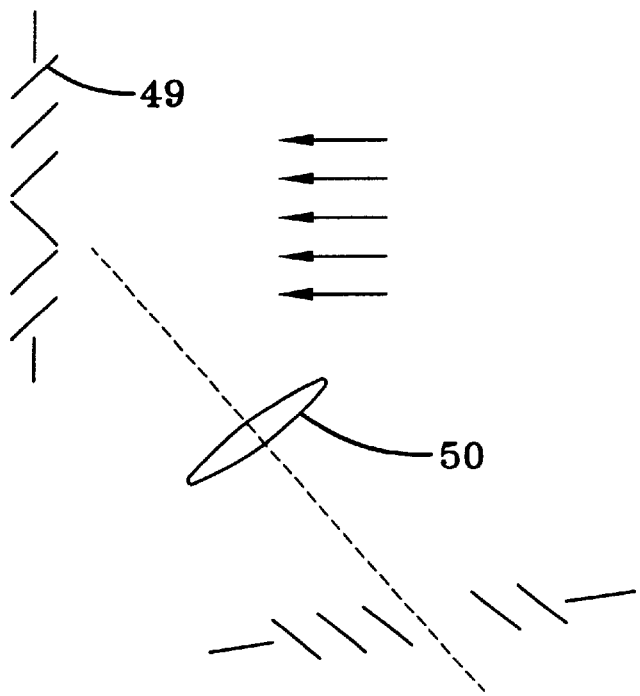
FIG. 20a is a diagram of the object and image planes of a light beam reflected off a DMD element in accordance with one embodiment of the present invention.
Figure 20B:
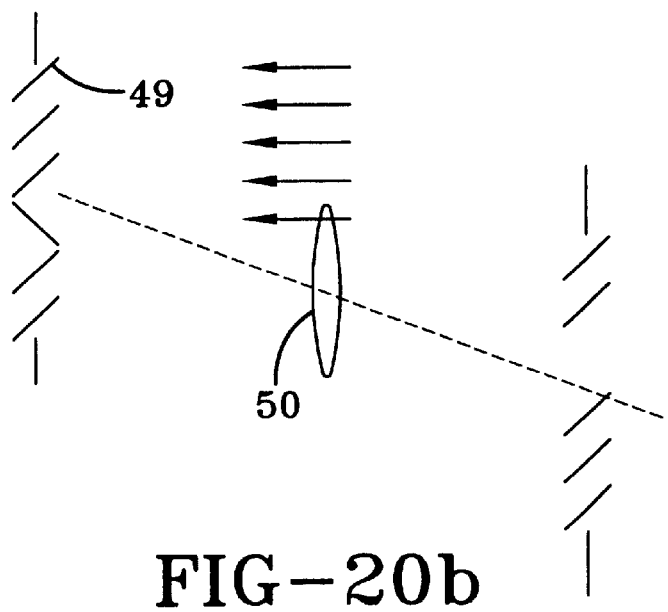
FIG. 20b is another diagram of the object an image planes of a light beam reflected off a DMD element in accordance with one embodiment of the present invention.
Figure 21:
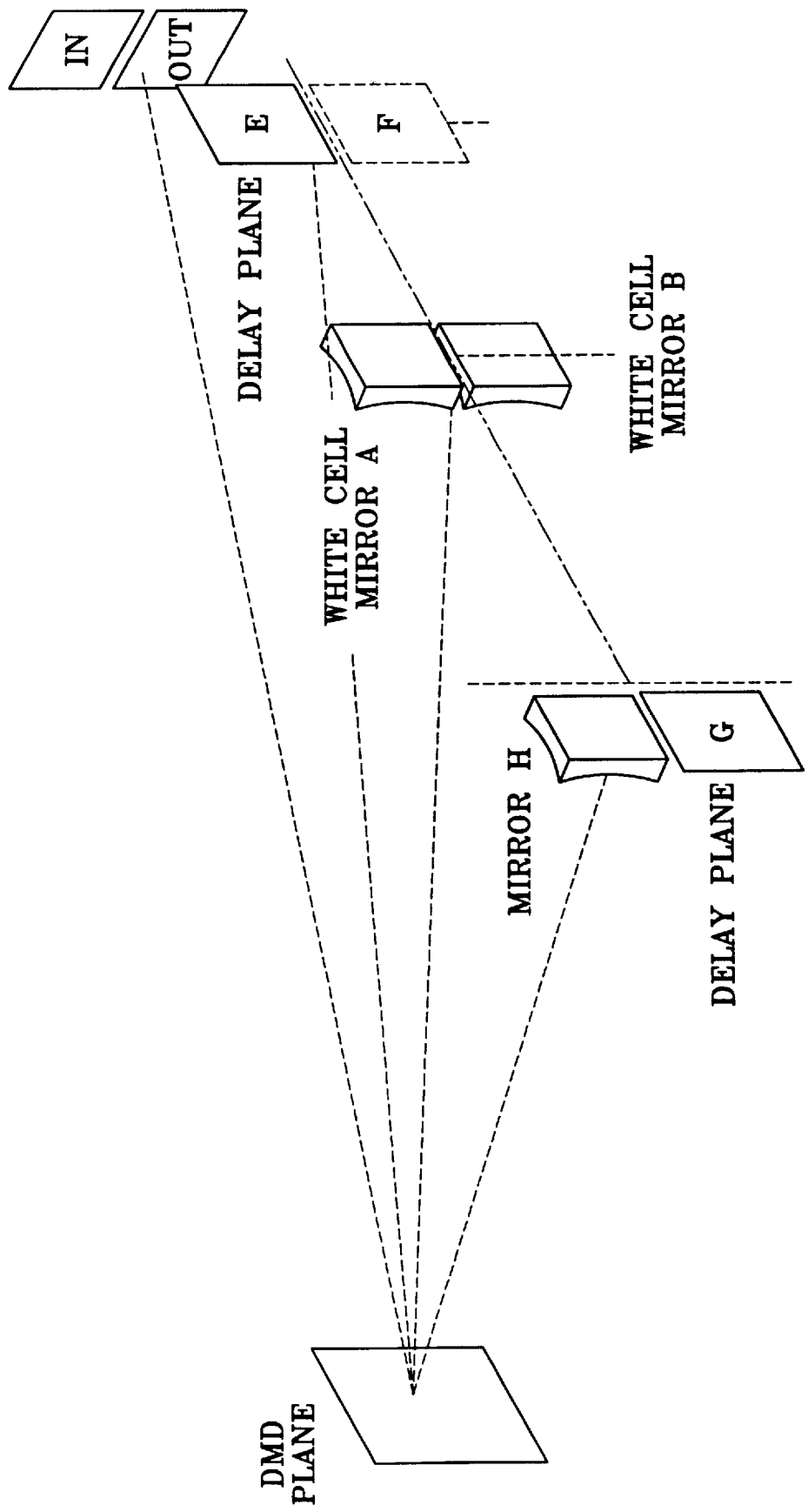
FIG. 21 is a perspective view of a DMD White cell system in accordance with one embodiment of the present invention.

The fact that the elements of the DMD do not lie in one continuous surface makes it more difficult at times to image the DMD in reflected light. The difficulty is shown in FIG. 20a. A DMD 49 at the left is normally illuminated with a beam from the right. The reflected light is imaged with a lens 50. Neither the object plane nor the image plane is perpendicular to the direction of propagation of the light leaving the DMD. Indeed the object plane and image plane are parallel only if the magnification is unity or if the lens is rotated to be parallel to the object plane, as shown in FIG. 20b. The main problem is that the object and image planes are not perpendicular to the direction of propagation.

If the direction of the light were reversed so as to be incident on the DMD 49 at an angle and leaving it perpendicular to the surface, then there would be no problem. That is the way projectors using the DMD operate. For application in a White cell, however, it may be necessary to have light approaching the SLM from both directions.

One way to remedy the problem of the object plane and image plane not being perpendicular to the direction of propagation is to use an associated prism to change the direction, as shown in FIG. 6. The DMD is illuminated with light normal to its surface as before, and a prism is placed in the reflected beam. The directions and the angles of the prism have been adjusted to remove the angular offset of the DMD. The lens is then used in a normal fashion.

The effect of the prism can be demonstrated analytically. To do this, a ray matrix description is utilized. A ray with slope $p_o$ incident on a DMD mirror/pixel leaves the pixel with slope $p_1$. The 3×3 ray matrix for the DMD whose mirror elements are tipped by ±θ is given by $$\begin{pmatrix} y_1 \\ p_1 \\ 1 \end{pmatrix} = \begin{pmatrix} 1 & 0 & 0 \\ 0 & 1 & \pm 2\theta \\ 0 & 0 & 1 \end{pmatrix} \begin{pmatrix} y_o \\ p_o \\ 1 \end{pmatrix}$$

The first of the three linear equations represented by the matrix equation shows that upon reflection the position of the ray remains constant and the second linear equation shows that the slope changes direction by ±2θ. Similarly, it has been shown that for the prism the ray matrix for a prism of small angle α and index $n_1$ is given by $$\begin{pmatrix} y_1 \\ p_1 \\ 1 \end{pmatrix} = \begin{pmatrix} 1 & 0 & 0 \\ 0 & 0 & (n-1)\alpha \\ 0 & 0 & 1 \end{pmatrix} \begin{pmatrix} y_o \\ p_o \\ 1 \end{pmatrix}$$

Return to the situation in FIG. 6 where a DMD is on the left so that the light is reflected upward, translates a distance d and passes through the prism. The effect of the angle on the DMD can be cancelled. To find the conditions, multiply the matrices for the DMD, the translation and the prism and accept that the product be equivalent to that for the translation by itself. Thus:

$$\begin{pmatrix} y_1 \\ p_1 \\ 1 \end{pmatrix} = \begin{pmatrix} 1 & 0 & 0 \\ 0 & 0 & -(n-1)\alpha \\ 0 & 0 & 1 \end{pmatrix} \begin{pmatrix} 1 & d & 0 \\ 0 & 1 & 0 \\ 0 & 0 & 1 \end{pmatrix} \begin{pmatrix} 1 & 0 & 0 \\ 0 & 1 & +2\theta \\ 0 & 0 & 1 \end{pmatrix} \begin{pmatrix} y_o \\ p_o \\ 1 \end{pmatrix} =$$

$$\begin{pmatrix} 1 & d & +2\theta d \\ 0 & 1 & 2\theta - (n-1)\alpha \\ 0 & 0 & 1 \end{pmatrix} \begin{pmatrix} y_o \\ p_o \\ 1 \end{pmatrix}$$

It is seen by taking the product that the angular offset of the DMD is cancelled if α=2θ/(n−1). The horizontal axis is then translated upward in the y direction by a distance $y_d$=+2dθ. The axis is selected by choosing for the position and input slope $y_o$=0 and $p_o$=0. Using these in the previous equations, we find the output position is $y_1$=+2dθ. This is reasonable because the axis has been raised by a distance $y_d$=2dθ in translating a distance d. To compensate for this, set $y_1$=$y_2$−$y_d$=$y_2$−2θd. This affects only the top line in the above equation. The result is the following matrix equation. Note that the equation has the form of a simple translation by a distance d.

$$\begin{pmatrix} y_1 \\ p_1 \\ 1 \end{pmatrix} = \begin{pmatrix} 1 & d & 0 \\ 0 & 1 & 0 \\ 0 & 0 & 1 \end{pmatrix} \begin{pmatrix} y_o \\ p_o \\ 1 \end{pmatrix}$$

Thus, with the redefined axis the prism compensates nicely for the angular deflection of the DMD.

The equivalent of the Dual White Cell with unequal arms using the DMD is shown in FIG. 7. There the DMD 31 is at the left and to the right of the DMD are lens f1 36 and spherical Mirror C 35. There are two paths, depending whether a given pixel reflects light up or down. For light reflected downwards there are prism $P_1$ 37, lens f2 38 and Spherical Mirror B 39. For light reflected upward, there are Prism $P_2$ 32, lens $f_2$ 33 and Mirror M 34. The prisms counteract the angular effects of the DMD as described. Of the two sets of conditions, the SLM-imaging conditions, and the light-conserving conditions, it is simpler to consider the light-conserving conditions first. The light-conserving conditions are that Spherical Mirrors B, C, and M be imaged onto each other and no light is lost going around the outsides of Mirrors B, C or M. This is accomplished by placing Mirrors B, C, and M in the focal planes of Lenses $f_2$, $f_1$, and $f'_2$ respectively. The curvatures of Mirrors B, C, and M are all chosen so that in conjunction with lenses $f_2$, $f_1$, and $f'_2$ the DMD is imaged back onto itself. As has been shown, images of the centers of curvature of Mirrors B, C and M through Lenses $f_1$, $f_2$, and $f'_2$ lie on the DMD. The result is the equivalent of the dual cell in FIG. 3 with equal arms. The light can go from Mirror C to Mirror B and back or from Mirror C to Mirror M and back depending on the state of a given pixel. The DMD decides between the two paths on any particular bounce.

For the DMD imaging conditions, Lens $f_3$ can be chosen to image the DMD onto Lens $f_4$ and the radius of curvature of Spherical Mirror D chosen so that its center of curvature is on Lens $f_4$. As a result, light coming from the DMD is imaged by Lens $f_3$ onto Lens $f_4$, then re-imaged by Spherical Mirror D back onto Lens $f_4$ and imaged by Lens $f_3$ back onto itself as required. Equivalently, since the center of curvature of Spherical Mirror lies on Lens $f_4$, it is imaged by Lens $f_3$ onto the DMD as required.

In operation, light comes in from an input source below the unit. Light from the outside source is imaged onto a pixel in the "down" position which acts as a turning mirror. That pixel directs the light to Spherical Mirror 34 which then images it onto a pixel in the "up" position. The pixel then directs the light to Spherical Mirror 35 which images it back to the DMD. The light is now considered to be "in the unit". The choices of tip of the DMD to direct to light to the short path of Spherical Mirror 34 and back to Spherical Mirror 35 or to the long path of Spherical Mirror 39 and back to Mirror 35, as can be appreciated from the array shown in FIG. 7. After the last bounce off Spherical Mirror 35, the light goes to Spherical Mirror 39 and to a pixel on the DMD which is in the "up" position and directs the light out of the cell.

The distance from the DMD to the lenses $f_1$, $f_2$, and $f'_2$ is designated $d_o$, and the focal lengths of Lenses $f_1$, $f_2$, and $f'_2$ can be taken to be equal. Starting from the turning mirror pixel, light travels a distance $4(d_o+f_1)$ to Spherical Mirror B and back and then to Spherical Mirror C and back to get "into the system". The light can go either to Mirror B and back and to Mirror C and back, a distance of $4(d_o+f_1)$ or it can go to Mirror D and back and then to Mirror C and back, a distance of $4(d_o+f_1)+8f_4$. To exit the system, the light goes to Mirror D and to the turning pixel, a distance of $2(d_o+f_1)+8f_4$. Then if there are m bounces, $m_2$ of which are switched to Mirror D, the expression for the transit time through the cell is $$T=(1/c)\{4(d_o+f_1)+((m-m_2)4(d_o+f1)+m_2 4(d_o+f_1+2f_4))+2(d_o+f_1+2f_4)\}=T_o+m_2\Delta T$$

where the constant part, $T_o$, and the adjustable part, $\Delta T$ are given by $$T_o=(1/c)(6(d_o+f_1)+8f_4+m4(d_o+f_1))$$

$$\Delta T=(1/c)8m_2 f_4$$

The time increment is $(1/c)8m_2 f_4$ and there are $m_2$ choices, as before.

The binary cell of FIG. 5 is considered next, but with a DMD as the spatial light modulator. The equivalent of FIG. 5(a) with the auxiliary mirror and glass blocks is shown in FIG. 8. The difference is that the two pairs of spherical mirrors are no longer perpendicular to one another. Rather one pair 13, 14 is positioned such that one mirror is above an axis normal to the pixel normals (+10° to the DMD plane in this example) while the other mirror is below the axis. The other pair 24, 25 is similarly positioned above and below the axis (−30° to the DMD plane in this example). Thus, when light travels to mirrors 13, 14 the spots are reimaged onto auxiliary mirror 29. When light is sent to mirrors 24, 25 the spots are re-imaged at auxiliary mirror II (shown here already replaced by glass blocks 28). Lenses 26 and 27 from FIG. 5 have each been split into two field lenses, 26 being split into 26 and 41, and 27 being split into 27 and 40. All that remains is to add either the glass blocks or the optical waveguide. The area of Auxiliary Mirror II can then be divided into strips. Auxiliary Mirror II can now be removed and replaced with the glass blocks or the lens waveguide. In FIG. 10, Auxiliary Mirror II has been removed and replaced with the entrance to the lens waveguide. The operation is the same as described in the dual arm binary device.

ALTERNATIVE APPROACHES TO SPOT PATTERN GENERATION

Other embodiments build on the strengths of the basic device described previously, as any device or optical system that focuses a light beam to a series of predictable spots may be used to generate time delays. Several preferred embodiments are included.

Figure 22:
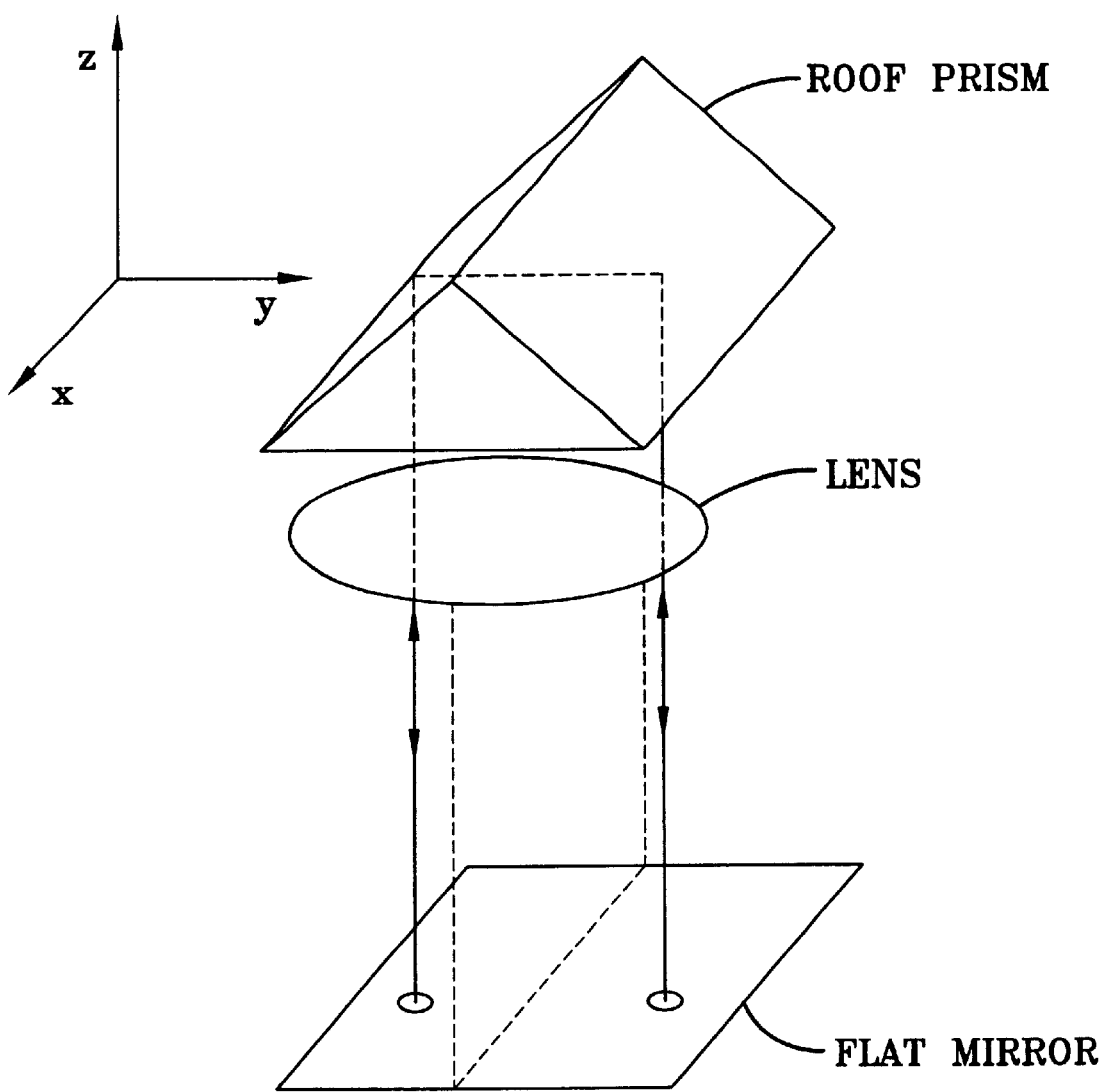
FIG. 22 is a perspective view of a right-angled roof prism system in accordance with one embodiment of the present invention.

First, an optical system is considered that consists of a flat mirror, a roof prism, and a lens, as shown in FIG. 22. The roof prism has a right angle apex, and the ridge of the roof is parallel to the x-axis. The hypotenuse face is parallel to the x-y plane. Light incident normally on the diagonal face will be totally internally reflected (TIR) from the two roof surfaces. It is a well-known property of the roof prism that the light beam exiting the roof will be parallel to the input beam. Thus, a ray leaving the spot on the right in the figure will arrive at a new spot on the left. The lens is chosen to refocus the light beam to a spot each time it reaches the flat mirror. For the case shown in FIG. 41, the ray is travelling parallel to the z-axis. It will bounce back and forth between the two spots shown. The roof prism may also comprise two discrete mirrors, oriented with some angle between them. The angle need not necessarily be 90°.

Figure 23A:
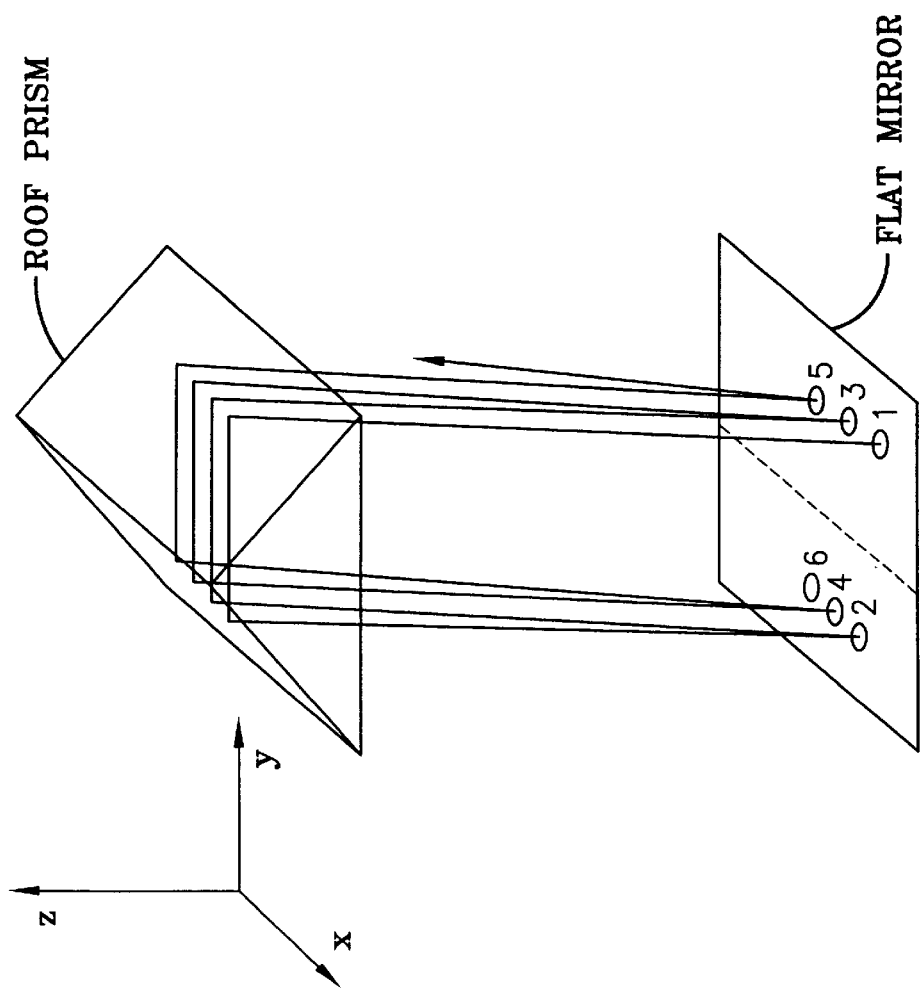
FIG. 23a is another perspective view of a right-angled roof prism system in accordance with one embodiment of the present invention.
Figure 23B:
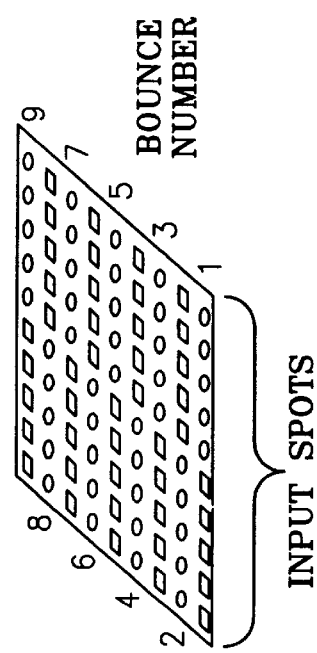
FIG. 23b is a perspective view of a roof prism system spot pattern in accordance with one embodiment of the present invention.

To generate a proper spot pattern, various things may be done. First, the ray may be angled slightly in the x-z plane, as shown in FIG. 23(a). The lens has been omitted in the figure (and subsequent figures) to avoid clutter. As the beam bounces back and forth between the two sides, it also progresses in the x direction. Multiple beams may be introduced, as shown in FIG. 23(b). They would each strike a unique set of spots on the flat mirror. In the figure, some spots are shown as squares and some as circles to emphasize that each beam alternates from left to right as it progresses along the plane.

Figure 24:
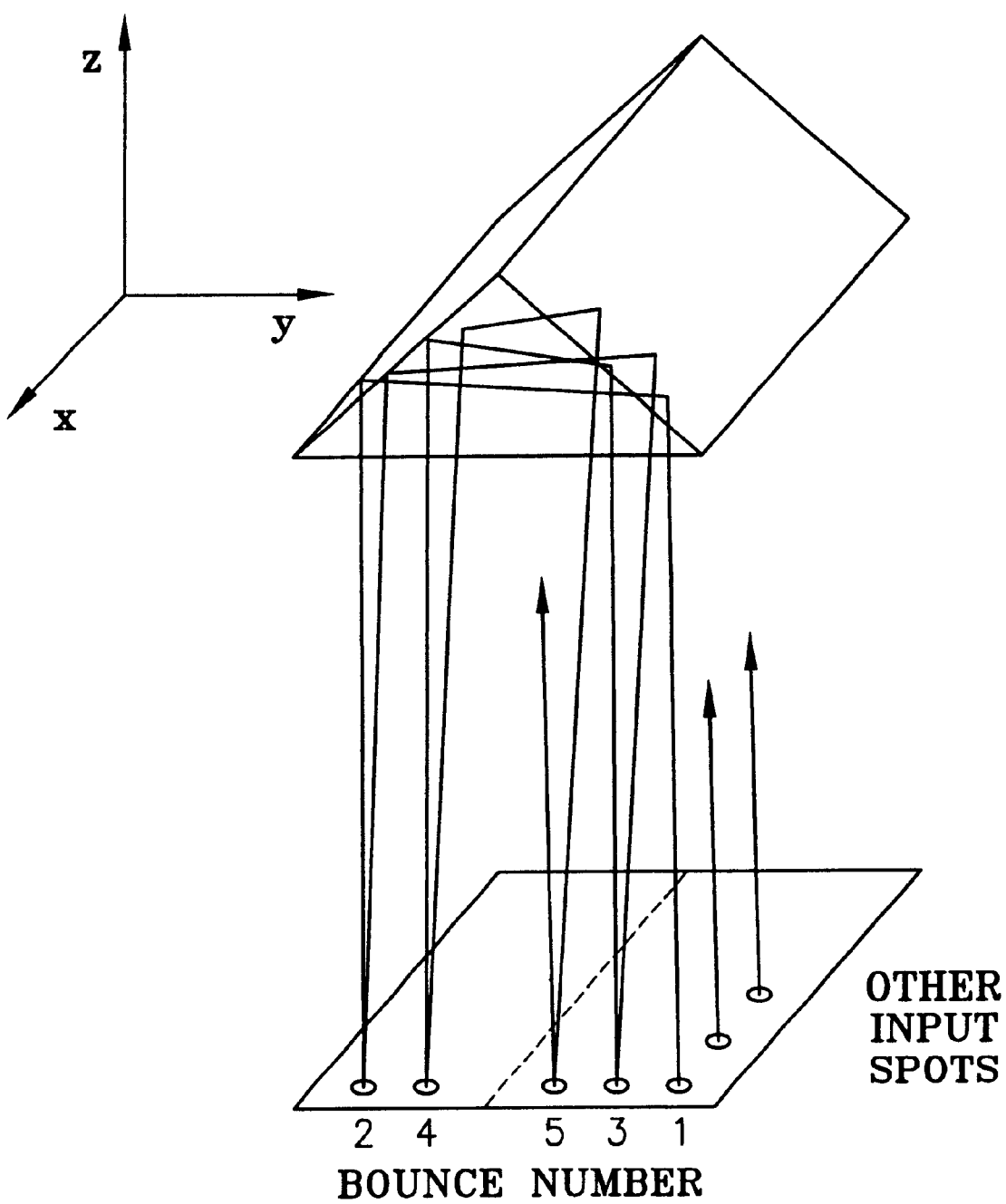
FIG. 24 is a perspective view of a right-angled roof prism system in accordance with one embodiment of the present invention.

Alternatively, one could tilt the rays slightly in the y-z plane as shown in FIG. 24. In this case the beams progress outward, along the x-axis. Multiple input beams may be used, but in this case they are lined up along the x-axis.

Figure 25:
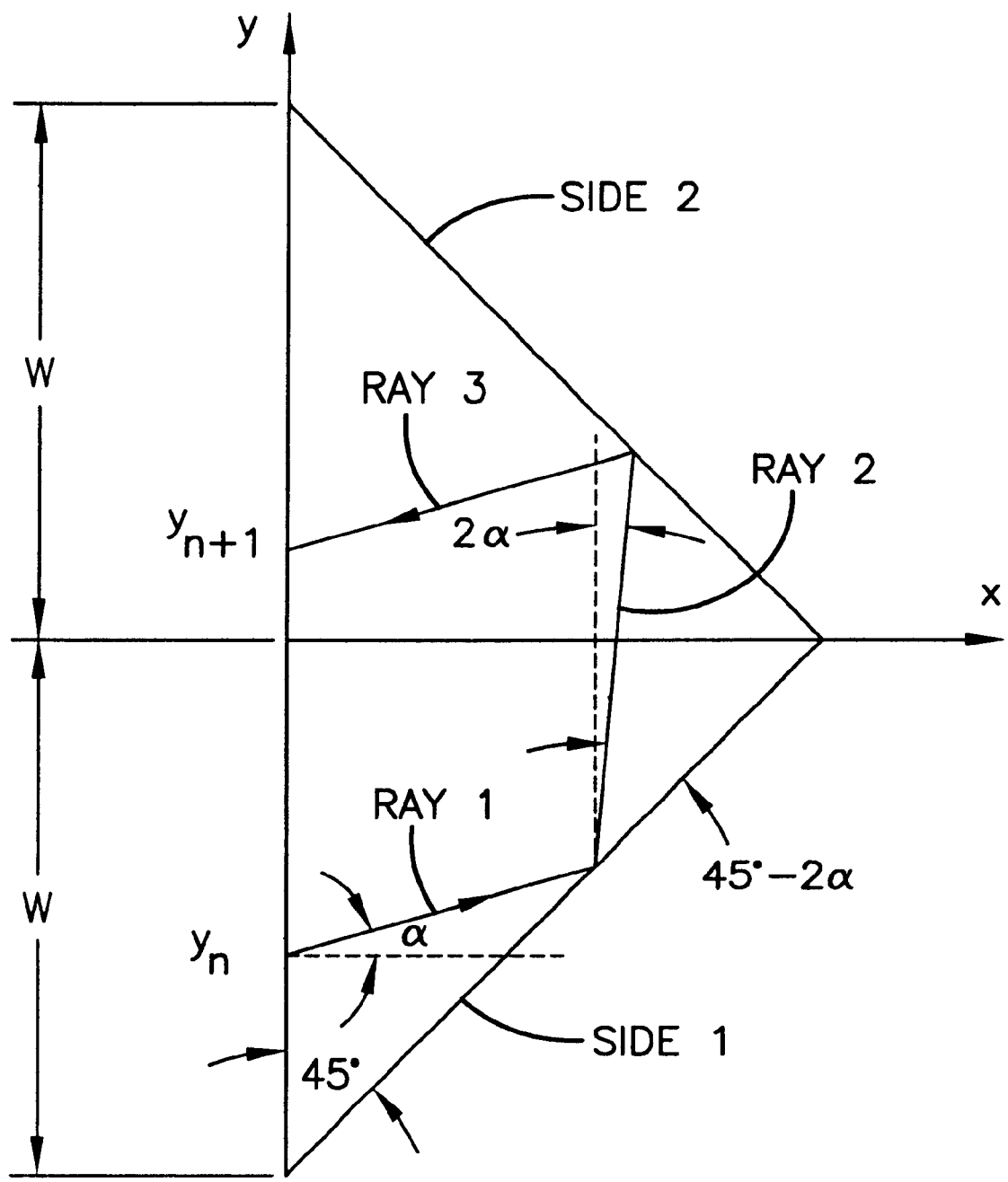
FIG. 25 is a ray diagram for a roof prism in accordance with one embodiment of the present invention.

Positions of successive spots in the case of FIG. 24 may be found in the following manner. Consider a 90° roof prism whose base has a half-width of W and that has a height of W. The y-axis is then placed along the base and the z-axis through the apex as shown in FIG. 25. Next, consider a ray inside the prism travelling at an angle α with respect to the z-axis. Since Ray 1 has a slope of α, the equation for Ray 1 may be written as:

$$y = \alpha z + y_n$$

where $y_n$ is the y-intercept of the ray, the point at which it intersects the base of the prism. Next, the equation for Side 1 of the prism may be written, Side 1 having a slope of 1 and a y-intercept of −W:

$$y = x - W$$

Solving for the intersection obtains the point A=$(z_A, y_A)$ where $$z_A = \frac{y_n + W}{1 - \alpha}$$

$$y_A = \alpha \left( \frac{y_n + W}{1 - \alpha} \right)$$

in which we must find the y-intercept b. We have a known point on this line, Point (A) given by the equation for $z_A$ above, so substituting that point in obtains:

$$\alpha \left( \frac{y_n + W}{1 - \alpha} \right) + y_n = \frac{1}{\alpha} \left( \frac{y_n + W}{1 - \alpha} \right) + b \quad \text{or}$$

$$b = \frac{\alpha(y_n + W)}{1 - \alpha} - \frac{1}{\alpha} \left( \frac{W + y_n}{1 - \alpha} \right) + y_n = \left( \alpha - \frac{1}{\alpha} \right) \left( \frac{y_n + W}{1 - \alpha} \right) + y_n$$

The equation for Ray 2 is thus $$y = \frac{z}{\alpha} + \left( \alpha - \frac{1}{\alpha} \right) \left( \frac{y_n + W}{1 - \alpha} \right) + y_n$$

Ray 2 also intersects the upper side of the roof prism, the equation for which is $$y = -z + W$$

The intersection of above equations for Ray 2 is point B. Solving for the coordinates finds:

$$z_B = \frac{W - \left( \alpha - \frac{1}{\alpha} \right) \left( \frac{y_n + W}{1 - \alpha} \right) - y_n}{1 + \frac{1}{\alpha}}$$

$$y_B = W - \frac{W - \left( \alpha - \frac{1}{\alpha} \right) \left( \frac{y_n + W}{1 + \alpha} \right) - y_n}{1 + \frac{1}{\alpha}}$$

Point B also lies on Ray 3, the equation for which is $$y = \alpha z + b = \alpha z + y_{n+1}$$

where it has been noted that the y-intercept of ray 3 is the position $y_{n+1}$ to be found. Plugging in coordinates $(z_B, y_B)$ results in $$y_{n+1} = W - \left\{ \frac{1 + \alpha}{1 + \frac{1}{\alpha}} \left[ W - \left( \alpha - \frac{1}{\alpha} \right) \left( \frac{y_n + W}{1 - \alpha} \right) - y_n \right] \right\}$$

To find the positions at which these rays intersect the flat mirror, Rays 1 and 3 have only been extended to the flat mirror plane. If that plane is a distance L away from the apex of the roof prism, and the roof prism has a height of h=W, then at the flat mirror plane the coordinates are $$y_n' = y_n - \alpha(L - W)$$

$$y_{n+1}' = y_{n+1} - \alpha(L - W)$$

These equations only apply when the input ray (Ray 1) strikes the lower half of the roof prism. If it strikes the upper half first, the above procedure is followed in reverse, intersecting Ray 1 with the upper mirror first. The result is:

$$y_{n+1} = -W + \left\{ \frac{1 - \alpha}{1 - \frac{1}{\alpha}} \left[ W + \left( \alpha - \frac{1}{\alpha} \right) \left( \frac{W - y_n}{1 + \alpha} \right) + y_n \right] \right\}$$

Figure 26:
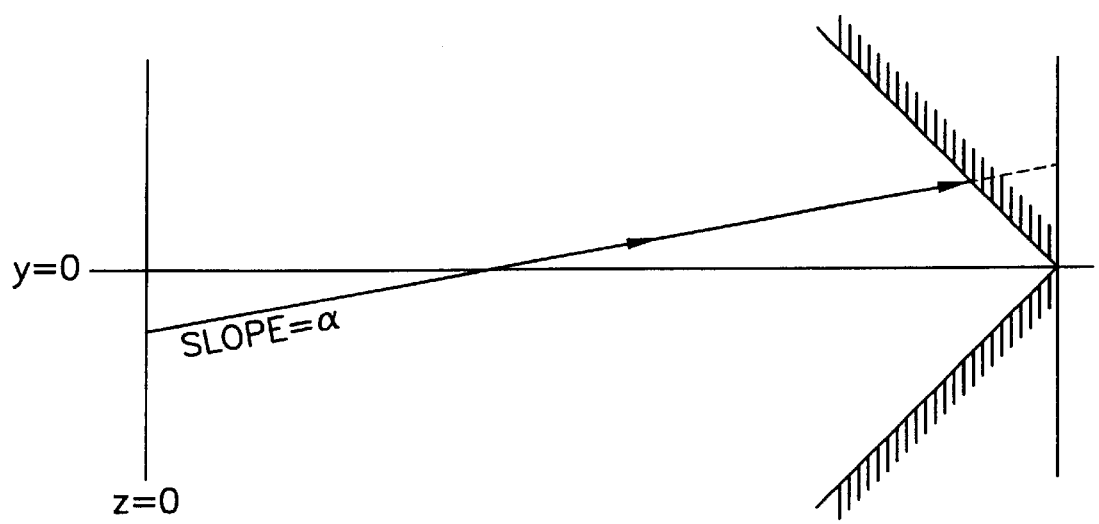
FIG. 26 is a diagram of a ray test in accordance with one embodiment of the present invention.

Deciding which equation to use may be done in the following way. If the ray is allowed to continue to the plane z=L, and it crosses that plane above the y-axis, then it will strike the upper side of the roof prism first, as shown in FIG. 26. Thus if y(z=L)>0, the first equation for $y_{n+1}$ should be used; if y(z=L)<0, the second equation for $y_{n+1}$ should be used. The spots may progress inward or outward, or first inward and then outward. The last case is the most useful because the beams may be introduced into the cell at the outside edge of the flat mirror, bound inward, then outward, and be extracted at the opposite, or same, outside edge.

Figure 27:
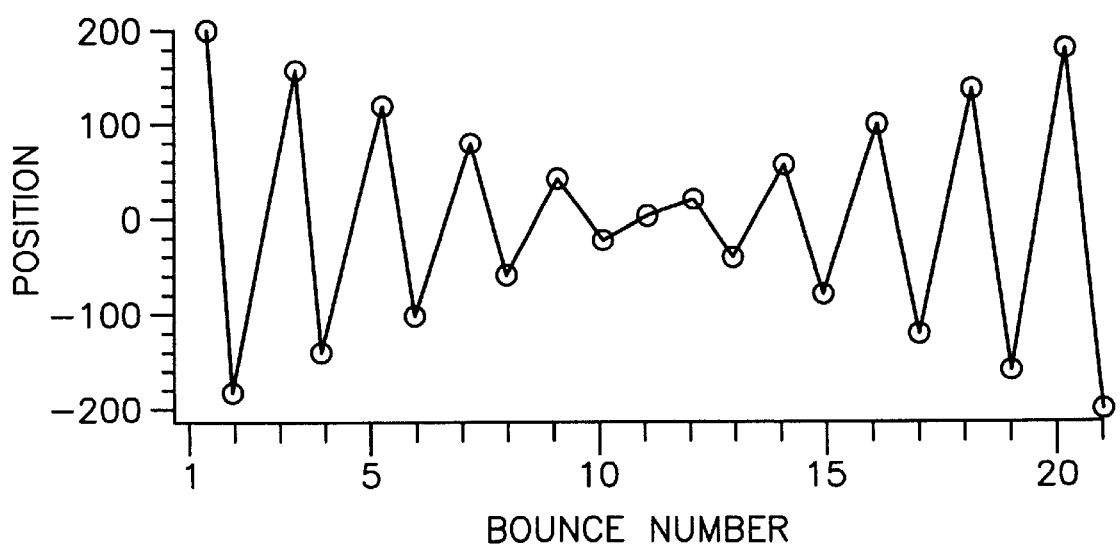
FIG. 27 is a diagram of spot position for a light beam in accordance with one embodiment of the present invention.

FIG. 27 shows the spots that would result if an input spot were introduced at the position x=201, whose ray has a slope of −0.1, and was directed at a prism whose apex was 100 units from the input plane. Note that these spots would actually land in a line of constant y; the plot shown in FIG. 27 stretches them out to show the order of progression. The spots in this case progress inward and then outward. The spacing between successive spots is constant.

Figure 28:
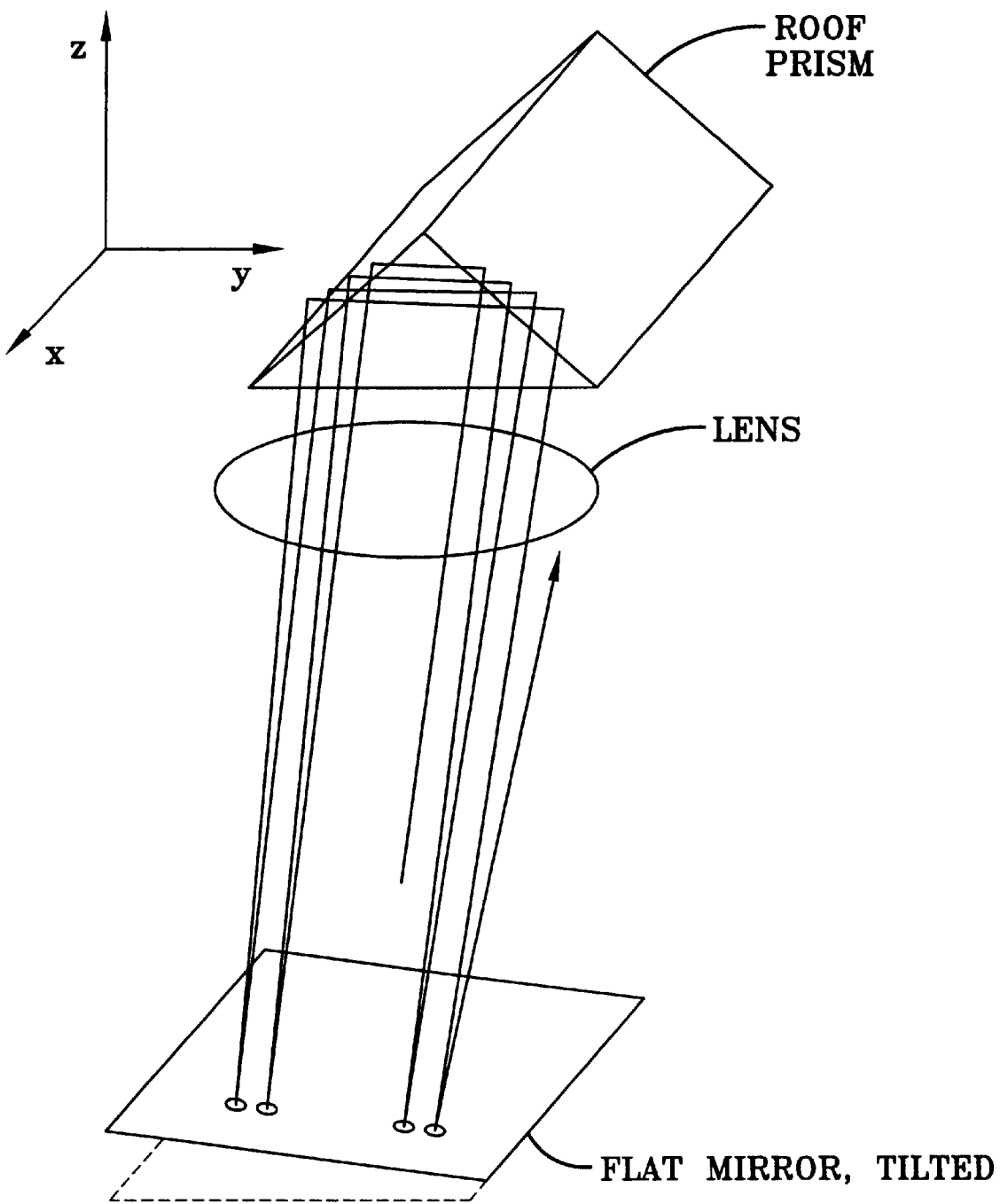
FIG. 28 is a diagram of a right-angled roof prism system in accordance with one embodiment of the present invention wherein the flat mirror is tilted with respect to the lens and roof prism.

FIG. 28 shows a situation in which the flat mirror is not parallel to the hypotenuse face of the roof prism. This also generates a progression of spots. In this case, however, the image plane (the flat mirror) is not perpendicular to the optical axis, and spots will tend to be magnified or demagnified going from one side of the flat mirror to the other. If the flat mirror is tilted around the x-axis as in FIG. 28, the spots will grow or shrink as they progress away from center. If the flat mirror is tilted in the y-z plane, then each beam will have two spot sizes as it progresses down the mirror, one on the −x side and the other on the +x side.

Figure 29:
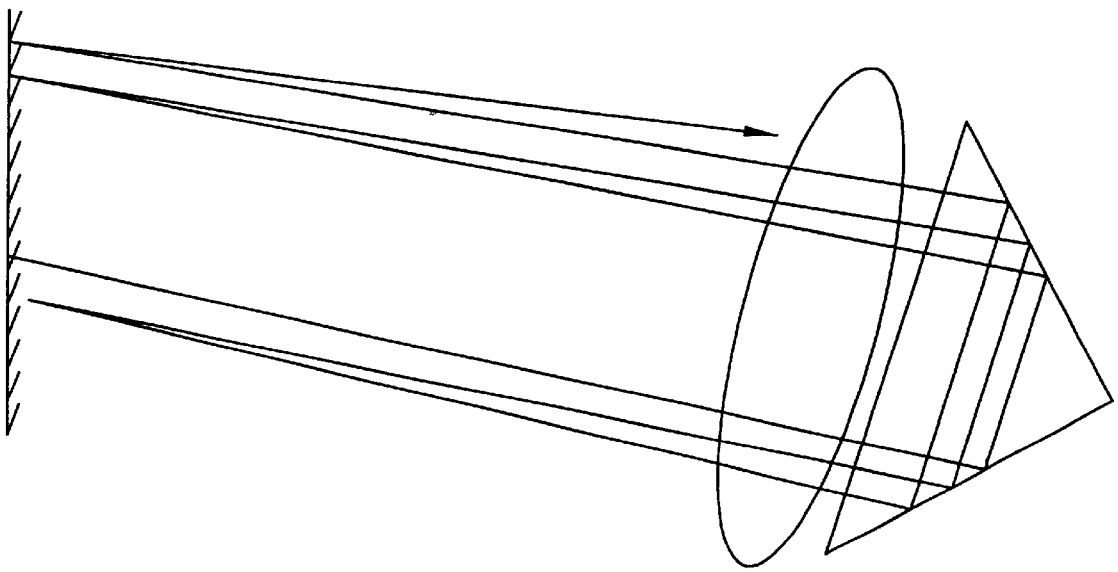
FIG. 29 is a ray diagram for a right-angled roof prism system of one embodiment of the present invention.

The point is made again that any of these spot patterns may be generated with combinations of mirrors and lenses. A roof prism is shown only because it is expected to have less energy loss. Now these ideas are extended to generate a spot pattern on a DMD, where the flat mirror in the previous Figures is replaced with a DMD. The DMD is here treated as a segmented plane mirror. Each pixel is assumed to have the ability to tilt out of the plane of the DMD in one or more directions. For example, FIG. 29 shows the case for a DMD in which all pixels are turned to the same orientation. The DMD mirror plane is tipped with respect to the roof prism hypotenuse face, but each of the individual pixels is parallel to that face. This arrangement will reproduce the spot pattern of FIG. 23. Similarly, using a DMD the other spot patterns shown earlier can also be implemented.

Figure 30:
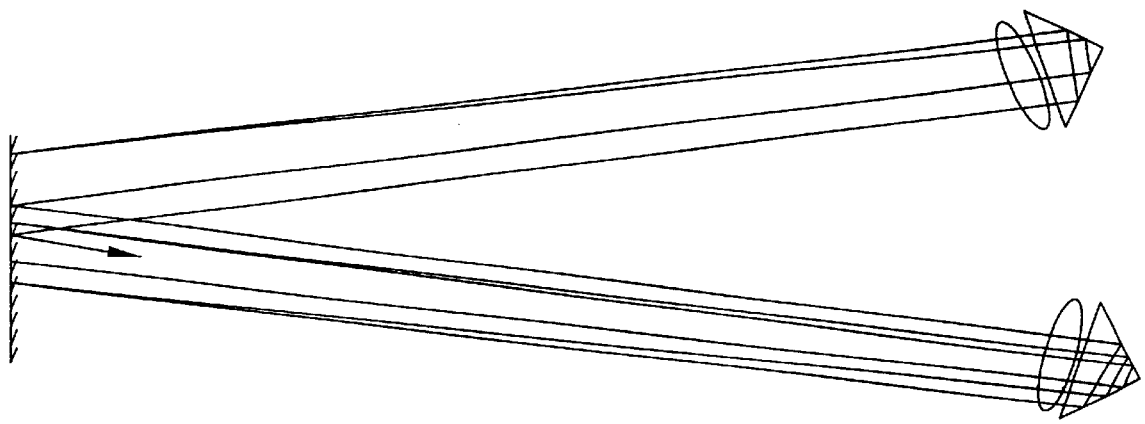
FIG. 30 is a ray diagram for a dual roof prism system of one embodiment of the present invention.

The entity in FIG. 29 will be referred to as a Prism cell. The prism cell can be configured in many different ways. Next, the mirrors are allowed to switch between two stable orientations, for example ±θ. Then, a beam bouncing around in one cell can be switched out on any particular bounce. A second cell can be added, as shown in FIG. 30.

Figure 31:
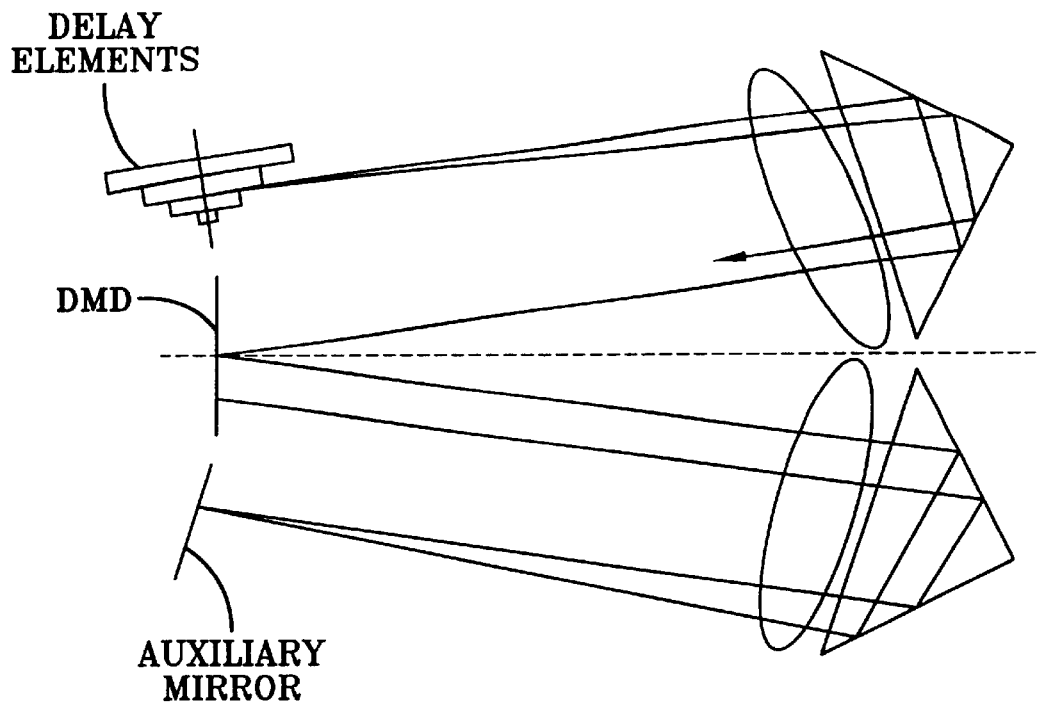
FIG. 31 is a ray diagram for a dual roof prism system utilizing a set of delay elements in accordance with one embodiment of the present invention.

Principles discussed previously may then be used to introduce delays. For example, to produce a binary cell, a DMD has been used to switch between two White cells. One White cell images the spots onto an auxiliary mirror (null path) and the other images the spots onto the entrance plane to some sort of delay generator, such as glass blocks, fibers, or a lens train. Similar things may be done for this embodiment. The DMD plane may be divided into three sections. The bottom section will become an auxiliary mirror, as shown in FIG. 31. Light bouncing in the lower cell will bounce back and forth between the DMD plane and this auxiliary mirror. If a DMD pixel is switched on a given bounce, the light goes to the upper cell, and the spot is imaged onto the Delay Plane, which is the entrance plane to some delay element. Glass blocks are shown for convenience of illustration.

GENERATING MORE DELAYS IN EXPONENTIAL AND POLYNOMIAL CELLS

This embodiment builds on devices previously described, including devices in which the number of delays achievable is related to the number of bounces m a light beam makes in a cell in a variety of ways such as linear (number of delays proportional to m), quadratic (number of delays proportion to $m^2$), and binary (proportional to $2^m$). Preferred embodiments described utilize several configurations, which will generate even larger numbers of delays. The embodiments may be broadly categorized into two groups: polynomial cells, in which the number of delays is proportional to the number of bounces m raised to some power, e.g. $m^2$, $m^3$, etc., and exponential cells, in which the number of delays is proportional to some number raised to the power of m, e.g. $2^m$, $3^m$, etc. Furthermore, previous embodiments considered both liquid crystal spatial light modulators and digital micromirror device spatial light modulators (SLM's), assuming that any SLM was such that a pixel could be switched between two states. More than three states are allowed for in these preferred embodiments.

General conditions are derived for exponential cells, in which the number of delays is proportional to some number raised to the power of the number of bounces. It will be assumed that the spatial light modulator is a DMD, although any multiple state SLM could be employed. The exponential cells have in common the characteristic that they image the SLM to a delay plane or to an auxiliary mirror. In the delay plane, each column of spots passes through an optical system of a different delay. These delay paths may utilize any material or device adapted to generate a delay in a beam passing through that material or device, such as glass blocks, a lens train, or waveguides.

Figure 32:
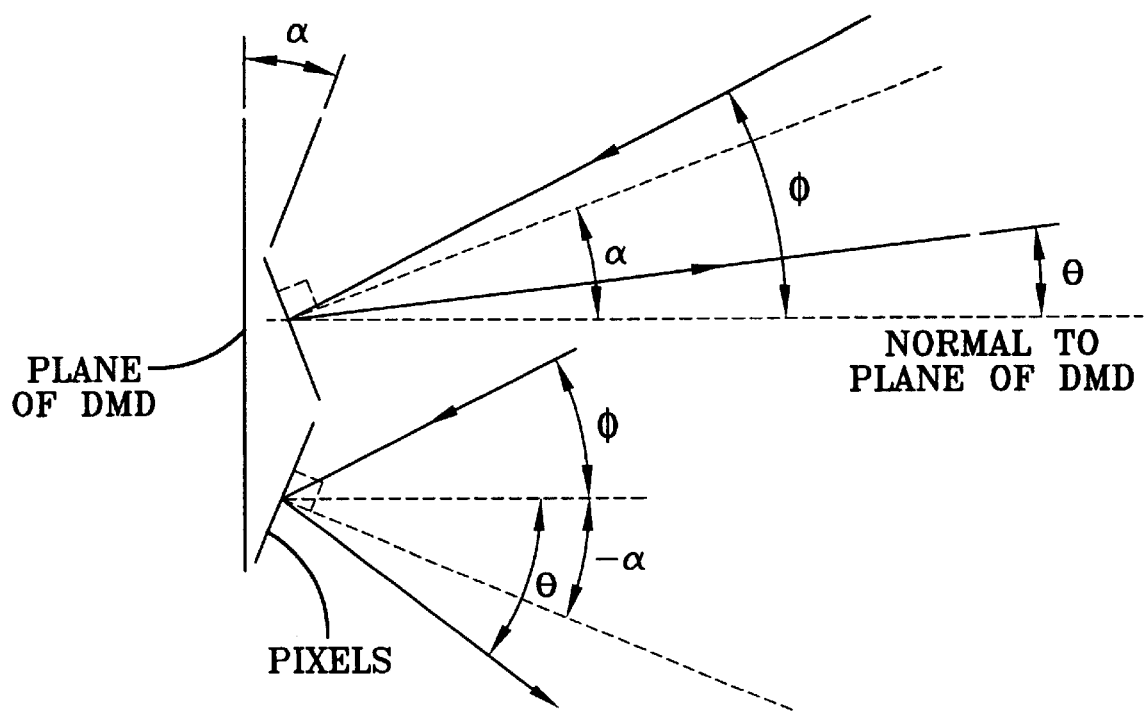
FIG. 32 is a ray diagram for a DMD of one embodiment of the present invention.

A DMD is first considered whose mirrors can be rotated to two different angles. An example of such a device would be the Texas Instrument DMD, whose mirrors can be switched between ±10°. The angles of tilt are taken to be ±α for the general case. A light beam incident at some angle φ with respect to the normal to the DMD plane, as shown in FIG. 32, would be reflected into two possible angles:

θ=2α-φ or

θ=-2α-φ

Figure 33:
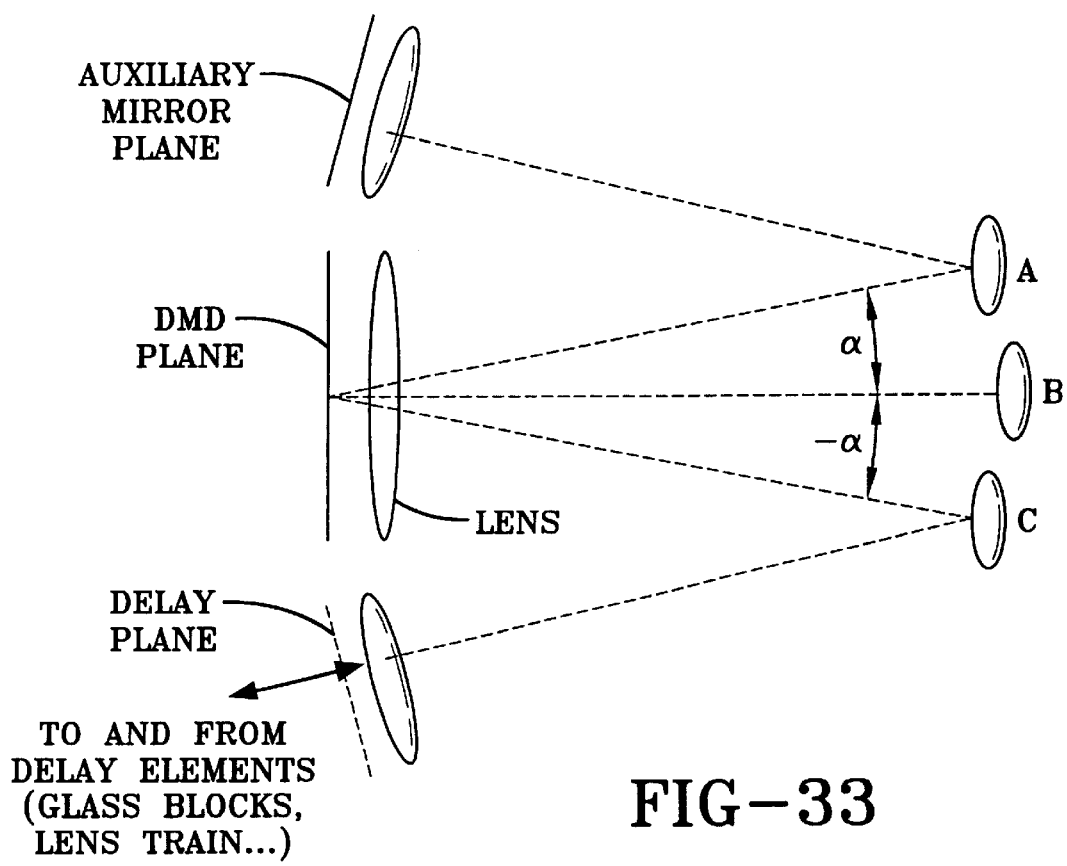
FIG. 33 is a ray diagram for a DMD system of one embodiment of the present invention.

These angles may be used to set up a series of White cells. For example, a previous embodiment had two White cells that shared a common mirror, as in FIG. 33. One White cell is formed by Mirrors A and B and the DMD, and the other is formed by Mirrors B and C and the DMD. Mirrors A and C were configured to image the DMD onto an auxiliary mirror or a delay plane, respectively. The DMD selected whether a beam would, on a given bounce, go to the auxiliary mirror and accrue no differential delay, or go to the delay plane. That embodiment requires two bounces on the DMD for each decision; so the maximum number of delays N went as $$N = 2^{\frac{m}{2}} = \left(\sqrt{2}\right)^m$$

Figure 34:
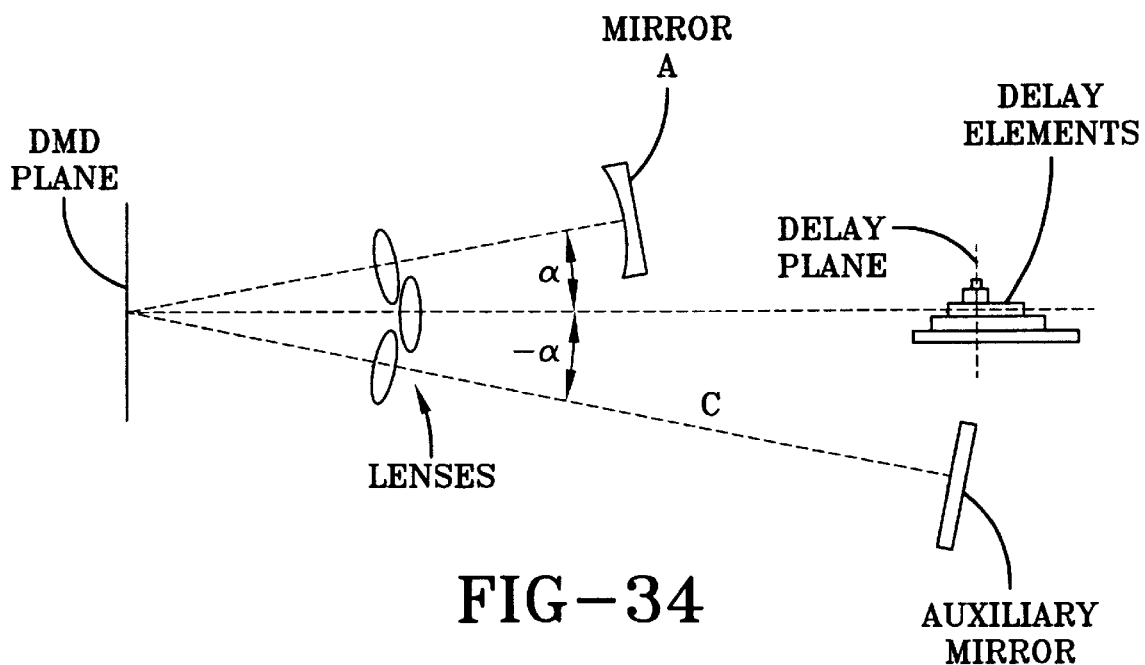
FIG. 34 is another ray diagram for a DMD system of one embodiment of the present invention.

In that device, there were White cell arms at angles of +20°, 0, and −20° with respect to the normal to the DMD plane. A better configuration is shown in FIG. 34, which avoids problems associated with imaging the segmented plane of the DMD. The number of delays obtainable is still $2^{m/2}$.

Figure 35:
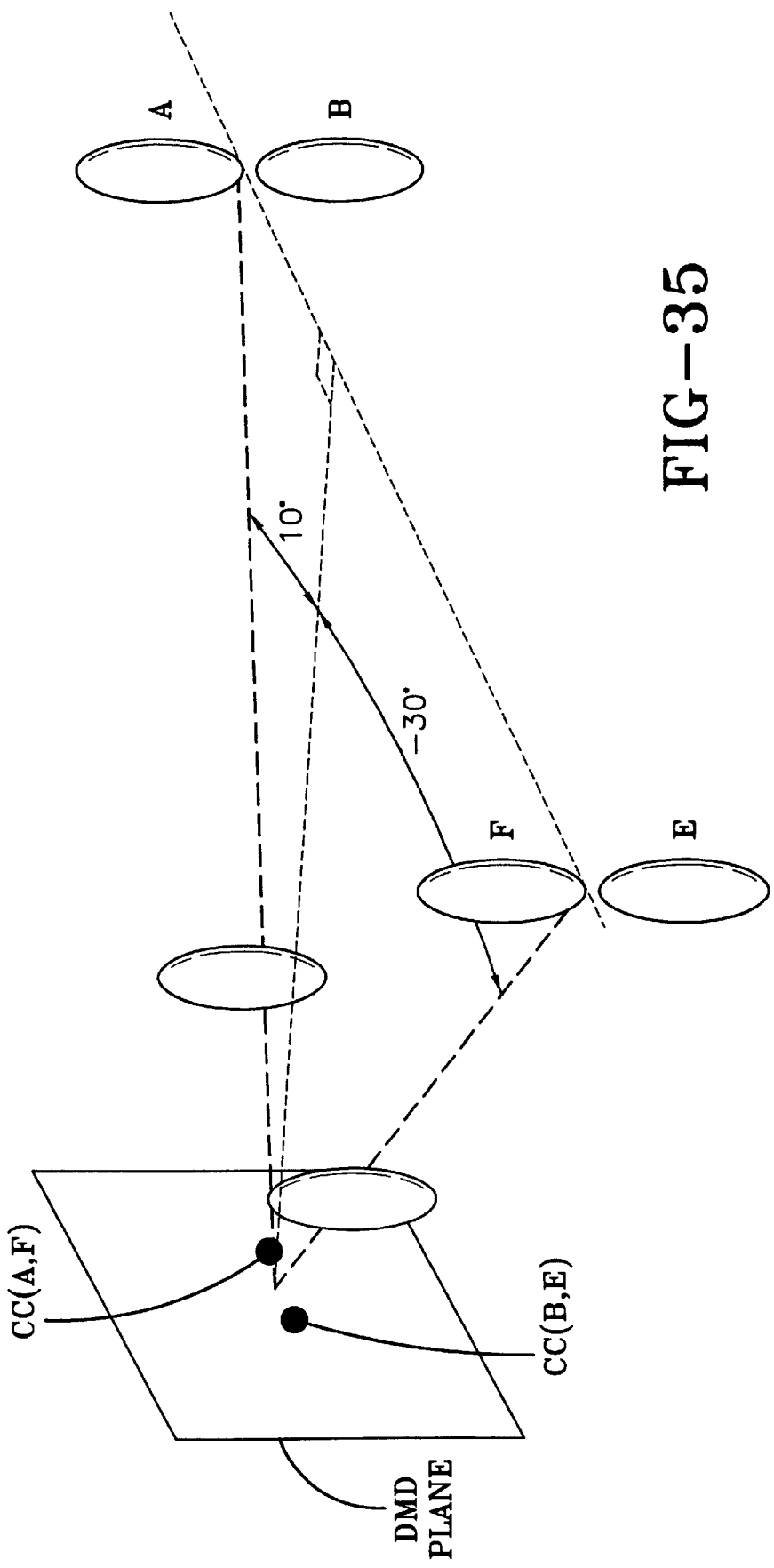
FIG. 35 is a perspective view of a dual White cell DMD system in accordance with one embodiment of the present invention.

The following improvement is made in the current preferred embodiment. Note that light coming from Mirror A can be directed back toward Mirror A if the appropriate pixel in the DMD is tilted in at +10°. Thus, if every pixel is tilted at +10°, a new White cell could be established, with both White cell mirrors (A and B) along the +10° path. This is shown in FIG. 35. Here, the White cell mirrors are located such that one is above the plane formed by the DMD normal and the +10° axis, and the other is below that plane. The mirrors could in principle be located side by side, but it would be difficult to physically fit the desired mirrors into the device. The desired mirrors shall be described next.

Similarly, a second White cell is created along the −30° axis. The two new White cell mirrors will be referred to as E and F. Their centers of curvature, along with those of Mirrors A and B, may be placed anywhere on the DMD. Thus, these two White cells can create spot patterns in either rows or columns as desired.

Figure 36:
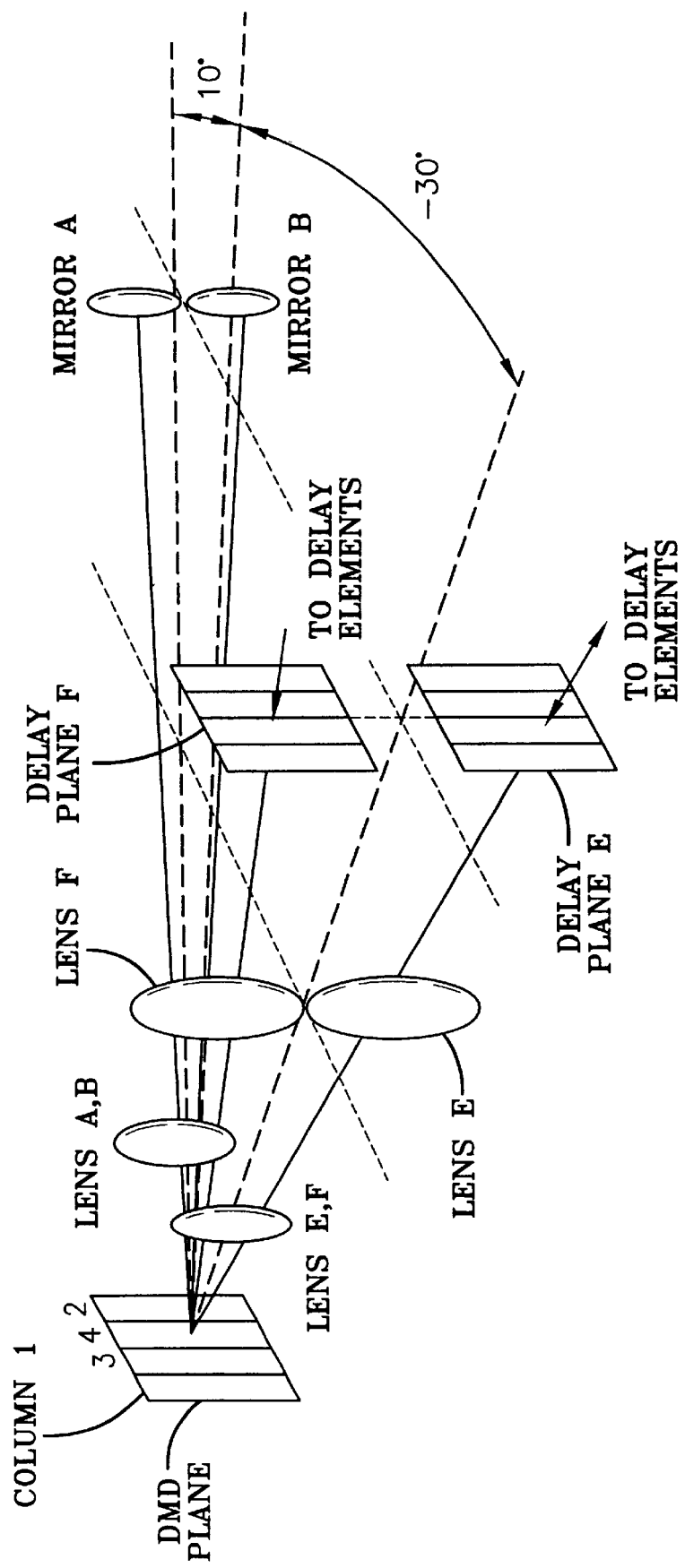
FIG. 36 is perspective view of another dual White cell DMD system of one embodiment of the present invention.

Mirror E may then be replaced with a lens that images the DMD plane onto a delay plane, and Mirror F replaced with a lens that images the DMD onto a different delay plane, as shown in FIG. 36. These new lenses E and F could also be spherical mirrors or other appropriate devices. The delay planes are then preferably replaced with some type of delay engine, such as a set of glass blocks, lens trains, or fibers. The optical path length from the DMD to Mirror A or B is the same as the optical path length from the DMD to delay plane E or F.

In operation, then, a beam would circulate in the White cell formed by Mirrors A and B and the DMD, as long as each pixel was tilted in the +10° direction. If a given pixel is tilted to −10°, then the beam goes to Mirror E if it just came from Mirror A, and goes to Mirror F if it just came from Mirror B. Lenses E and F must actually be tilted such that the beam returns to the DMD plane at a new pixel, continuing the bounce sequence. This corresponds to tilting spherical mirrors such that their centers of curvature overlap with the centers of curvature of the mirrors from the first White cell.

The beam must first be input into the cell. The first DMD pixel may be used to turn the input beam into the White cell containing Mirrors A and B. Assume for discussion purposes that it goes to Mirror B. Each beam then makes this bounce and goes to mirror B. From that point on, the beam alternates between upper and lower mirrors. Now m is redefined to be the number of bounces on the SLM, excluding the input and output bounces. Those bounces do not contribute to delay, although they will contribute to loss. Light can bounce back and forth between Mirrors A and B, but if the light is sent to Delay Element E in the other cell, it cannot pass directly to F. The light must first return to White Cell AB. Thus, four bounces are required for a beam to visit both delay elements.

In the binary cell, it was noted that every input beam would strike the same column on the DMD on a given bounce, and therefore also on the delay planes which are images of the DMD. Each column could be associated with a different delay. In the binary cell, the delay of each column increased by a factor of two. Thus if the first delay column produced a delay of $\Delta$, then the next column produced a delay of $2\Delta$, the next $4\Delta$, etc.

The same principle is used here. Each column of delay engine E is associated with the following delays: $\Delta$, $3\Delta$, $9\Delta$ ... $3^{(m/4)}\Delta$. Here, however, a "column" is two pixels (or two spots) wide. If the beam goes to E on even bounces, it should get the same delay whether it goes there on Bounce 2 or Bounce 4. For delay engine F, each column is assigned to a delay in the series $2\Delta$, $6\Delta$, $18\Delta$, ... $2*3^{(m/4)}\Delta$.

The engine operates as follows. If no net delay is desired, each DMD micromirror that the beam will strike is set to +10°. The beam constantly bounces back and forth between Mirrors A and B and the DMD. This delay is common to all beams and is subtracted out later. If one delay increment is desired, then one should use the first column of Delay Element E, which can only be reached on an even-numbered bounce. Thus on the second bounce, the appropriate pixel on the DMD is switched to −10°. The light then exits at −30°. The beam is sent into the path to Delay Plane E, column 1, and is delayed by $\Delta$ by some delay device such as glass blocks or lens trains. The beam then returns to White Cell AB. For a delay of two increments, the beam should be sent to the first column of Delay Element F which can only be reached on odd bounces. Thus, on the first (or third) bounce the beam is directed to Delay Element F. This scheme requires four bounces to choose between delays of 0, $\Delta$, and $2\Delta$.

On the next four bounces, one can get delays of $3\Delta$ and $6\Delta$. Table 1 shows the mirror choices for the first few integers of delays. It is assumed that every beam starts a pair of bounces on an upper mirror and finishes a pair of bounces on a lower mirror. With four bounces (m=4) one can count up to 2, with m=8 one can count up to 8. The general formula for the maximum number of delays using m bounces is:

$$N=3^{m/4}-1$$

This shall be referred to as a ternary cell.

TABLE 1

Table of beam paths for the first few delays, counting bounces in groups of four. The letters indicate the mirrors visited on each bounce group. Each significant digit requires four bounces on the DMD.

| Delay Increment desired | Significance of digit | | |
|---|---|---|---|
| | Least | Next | Most |
| 0 | ABAB | | |
| 1 | AEAB | | |
| 2 | FBAB | | |
| 3 | ABAB | AEAB | |
| 4 (3 + 1) | AEAB | AEAB | |
| 5 (3 + 2) | ABFB | AEAB | |
| 6 | ABAB | FBAB | |

TABLE 1-continued

Table of beam paths for the first few delays, counting bounces in groups of four. The letters indicate the mirrors visited on each bounce group. Each significant digit requires four bounces on the DMD.

| Delay Increment desired | Significance of digit | | |
|---|---|---|---|
| | Least | Next | Most |
| 7 (6 + 1) | AEAB | FBAB | |
| 8 (6 + 2) | FBAB | FBAB | |
| 9 | ABAB | ABAB | AEAB |
| 10 (9 + 1) | ABAE | ABAB | AEAB |

It would seem intuitive that if in any group of bounces, one plans to visit either E or F (or neither) that it would require only two bounces, such as FB or AE, and that the number of delays ought to go as $3^{m/2}$. The flaw here is that if one chooses AE on a given pair of bounces, one cannot visit mirror F (path FB) on the next pair, because one cannot go from E directly to F. The reason for choosing four bounces, then, was to guarantee one could end up at mirror B.

There is, however, a better way to achieve this. That is to count bounces in groups of three rather than four. If one assumes that one always ends a group of bounces at Mirror B, one can go to Mirror A or Delay Element F on the first bounce, or Mirror B or delay element E on the second bounce and end up at Mirror A on the third bounce regardless of the previous choices. Going to E assumes not having gone to F on the previous bounce.

The next group of three bounces then goes to the bottom mirrors first. On the first bounce, one can go to either B or E, and on the second bounce one can go to A or F. Going to F assumes not having gone to E on the previous bounce. In any case, one can then end up at B on the third bounce.

For this approach, the columns of the delay elements may be assigned as follows. Each column of delay engine E may be associated with the following delays: $\Delta$, $3\Delta$, $9\Delta$ ... $3^{(m/3)}\Delta$. For delay engine F, each column may be assigned a delay in the series $2\Delta$, $6\Delta$, $18\Delta$, ... $2*3^{(m/3)}\Delta$. Then the maximum number of delays obtainable in m bounces off the DMD is:

$$N=3^{m/3}-1$$

Table 2 shows how to implement the first few delays using this approach.

TABLE 2

Beam paths for the first few delays counting bounces in groups of three.

| Delay Increment desired | Significance of digit | | |
|---|---|---|---|
| | Least | Next | Most |
| 0 | ABA | BAB | |
| 1 | AEA | BAB | |
| 2 | FBA | BAB | |
| 3 | ABA | EAB | |
| 4 (3 + 1) | AEA | EAB | |
| 5 (3 + 2) | FBA | EAB | |
| 6 | ABA | BFB | |
| 7 (6 + 1) | AEA | BFB | |
| 8 (6 + 2) | FBA | BFB | |
| 9 | ABA | BAB | AEA |
| 10 (9 + 1) | AEA | BAB | AEA |

It may be noted here that if the ternary cell is implemented using a liquid crystal SLM, then there is no requirement that one cannot go to E or F just after a visit to either one of those mirrors. In this case, one can count bounces in pairs and the number of delays obtainable is:

$$N=3^{m/2}-1$$

The next embodiment utilizes an SLM having more than two states per pixel. For a DMD whose mirrors can tilt to three different angles, for example +α, 0, and −α. A ray incident on such a DMD could be reflected at any of three angles:

$\theta=2\alpha-\phi$(mirror at+α) or $\theta=-\phi$(mirror at 0) or $\theta=-2\alpha-\phi$(mirror at −α)

Figure 37:
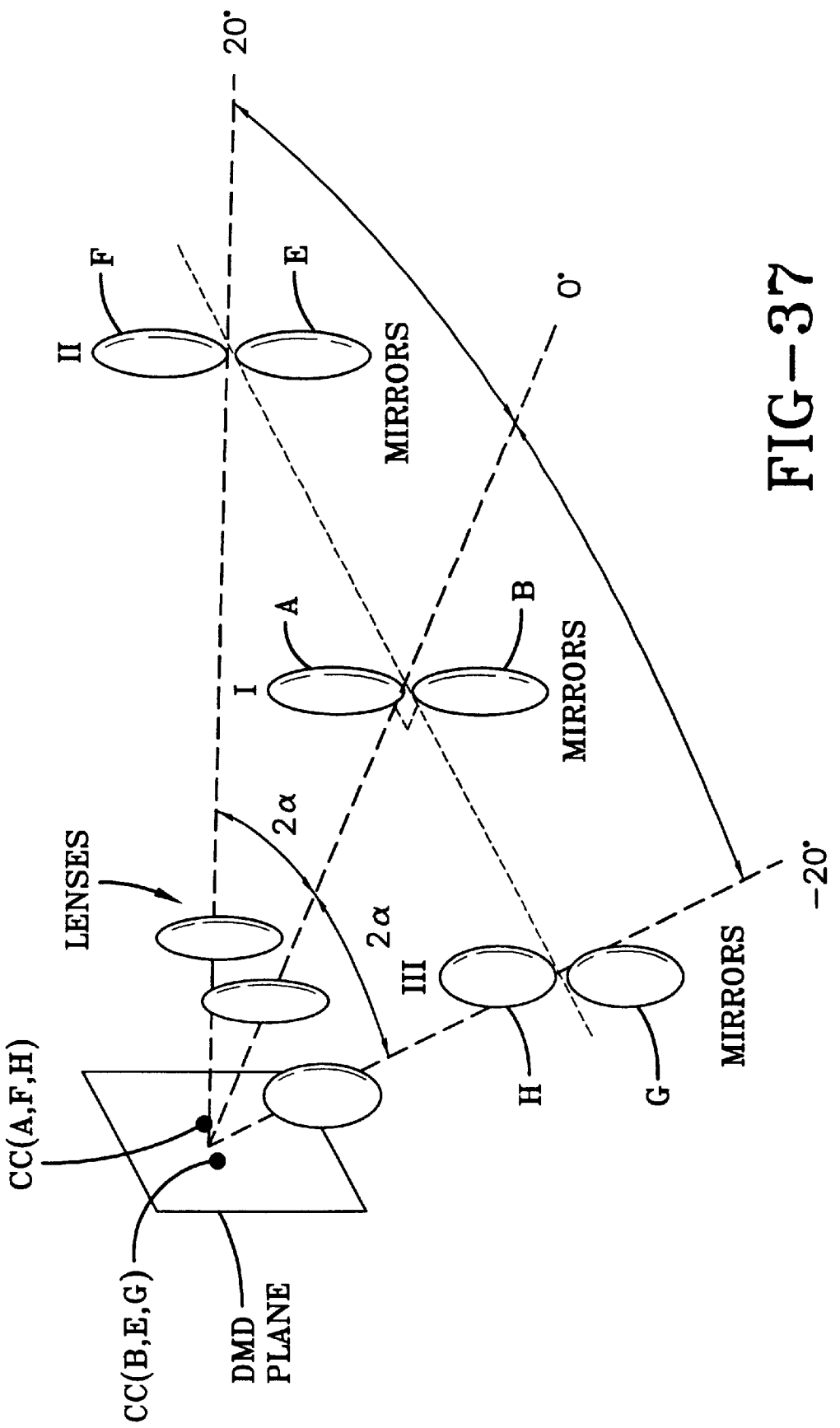
FIG. 37 is a perspective view of a three White cell DMD system in accordance with one embodiment of the present invention.

Table 3 shows some possible input angles and the resulting output angles. We pick a case in which α=±10°. Suppose, for example, three White cells are constructed, call them I, II, and III, whose axes are at =10°, −10°, and −30° to the normal to the DMD plane, as shown in FIG. 37. For a beam coming out of one of these White cells, then, to which other White cells can it be directed? Table 4 indicates the possibilities.

TABLE 3

The output angles for rays incident at various angles for the three-position DMD.

| Input angle | Output if pixel at +10° | Output if pixel at 0° | Output if pixel at −10° |
|---|---|---|---|
| 5° | 15° | −5° | −25° |
| 10° | 10° | −10° | −30° |
| 15° | 5° | −15° | −35° |
| 20° | 0° | −20° | −40° |

TABLE 4

| From | To (pixel at +10°) | To (pixel at 0°) | To (pixel at −10°) |
|---|---|---|---|
| I | II | I | III |
| II | I | III | (−40°) |
| III | (+40°) | II | I |

There are other possibilities for choices of White cell arm angles as well, such as +10°, −10°, and −30°, but these are not as flexible since one cannot reach as many different arms from a given arm as one can for the choices in Table 4.

It can be seen from Table 4 that beams can be directed in many directions. Only three are used for the next embodiment. Light from Arm I can be directed into either of the other two arms on any bounce. Arm II can go to Arm I or Arm III but not back into Arm II. Similarly, light coming from Arm III can go to II or I, but not back into III.

TERNARY AND QUATERNARY CELLS USING A THREE-STATE SLM

This preferred embodiment of the present invention implements two optical true time delay devices. In one, the number of delays attainable is given by $3^{m'/2}-1$, where m' is the number of bounces a beam makes in the device, excluding input and output bounces. In the other, the number of bounces goes as $4^{m'/2}-1$.

This embodiment utilizes a three-state spatial light modulator, such as a three-position DMD. Previous designs of a ternary cell required only a two position DMD, but could not generate as many delays as the present device. Previous designs for exponential cells using a 3-position DMD device required four delay planes, and consequently four different delay engines such as glass blocks or lens trains. In the preferred design of the present invention, only two delay engines may be required. This design provides comparable power to current designs but requires considerably fewer components.

Figure 38:
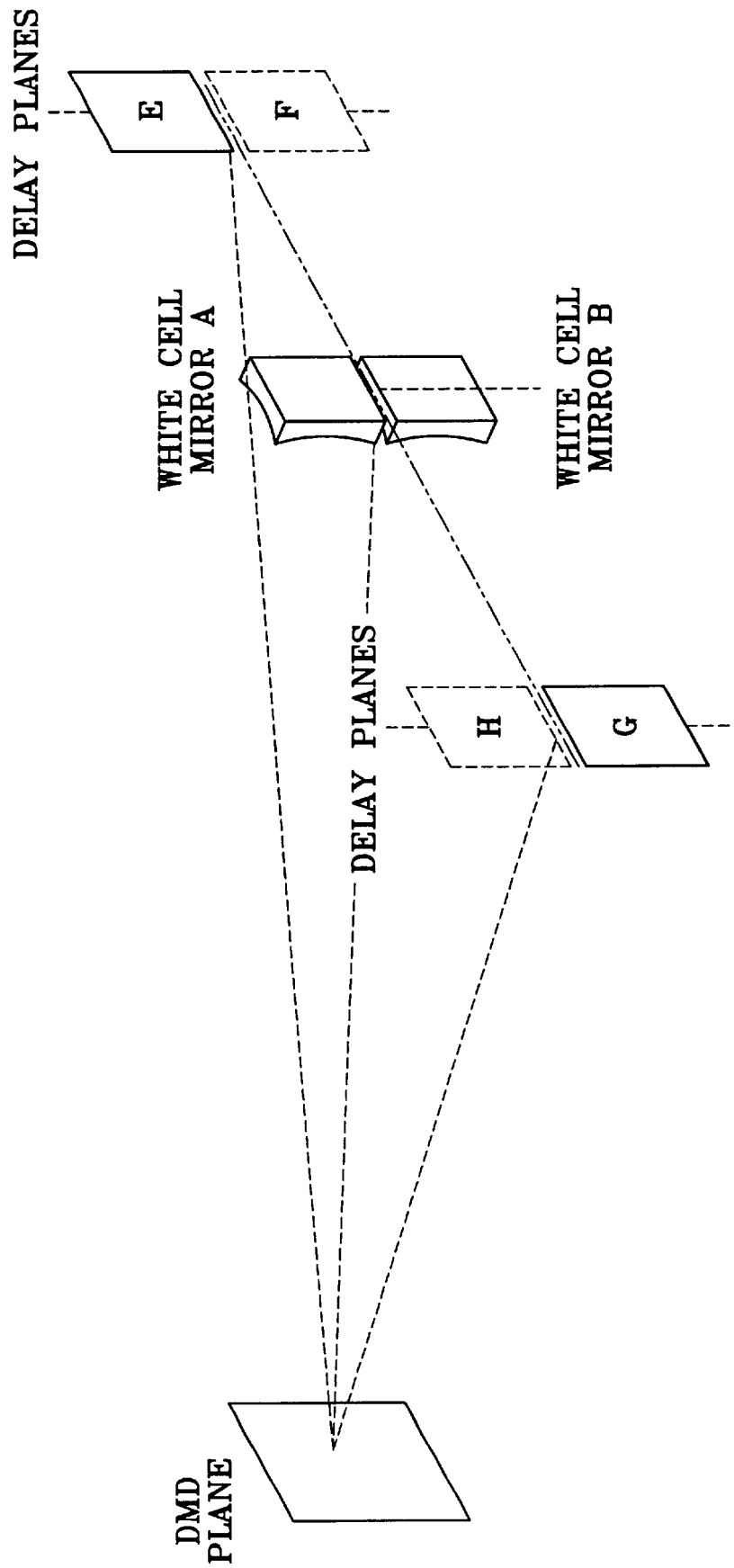
FIG. 38 is a perspective view of a DMD White cell system in accordance with one embodiment of the present invention.

FIG. 38 shows a three-state DMD device, with three White cells that share the DMD as a common mirror. Mirrors A and B form one White cell. Delay planes E and F form a second White cell, but in this design F is not used. Similarly, H will not be used in the White cell comprising delay planes G and H.

The possible transitions for this case are given in Table 5. In the binary cell previously described, which used a two-position DMD, it was possible to visit the delay plane only if the light was coming out of the null cell (the one containing mirrors A and B). In this embodiment it is possible for the light to go directly from one delay plane to the other. The significance is that in any two bounces, it is possible to visit both delay planes, one of the planes, or neither. Thus, one can accrue delays in fewer bounces than with previous designs.

Delays are assigned according to Table 6. Each delay plane is divided into columns, and each column represents a different amount of delay. The delay increment Δ may be any desired time unit.

TABLE 5

Figure 39:
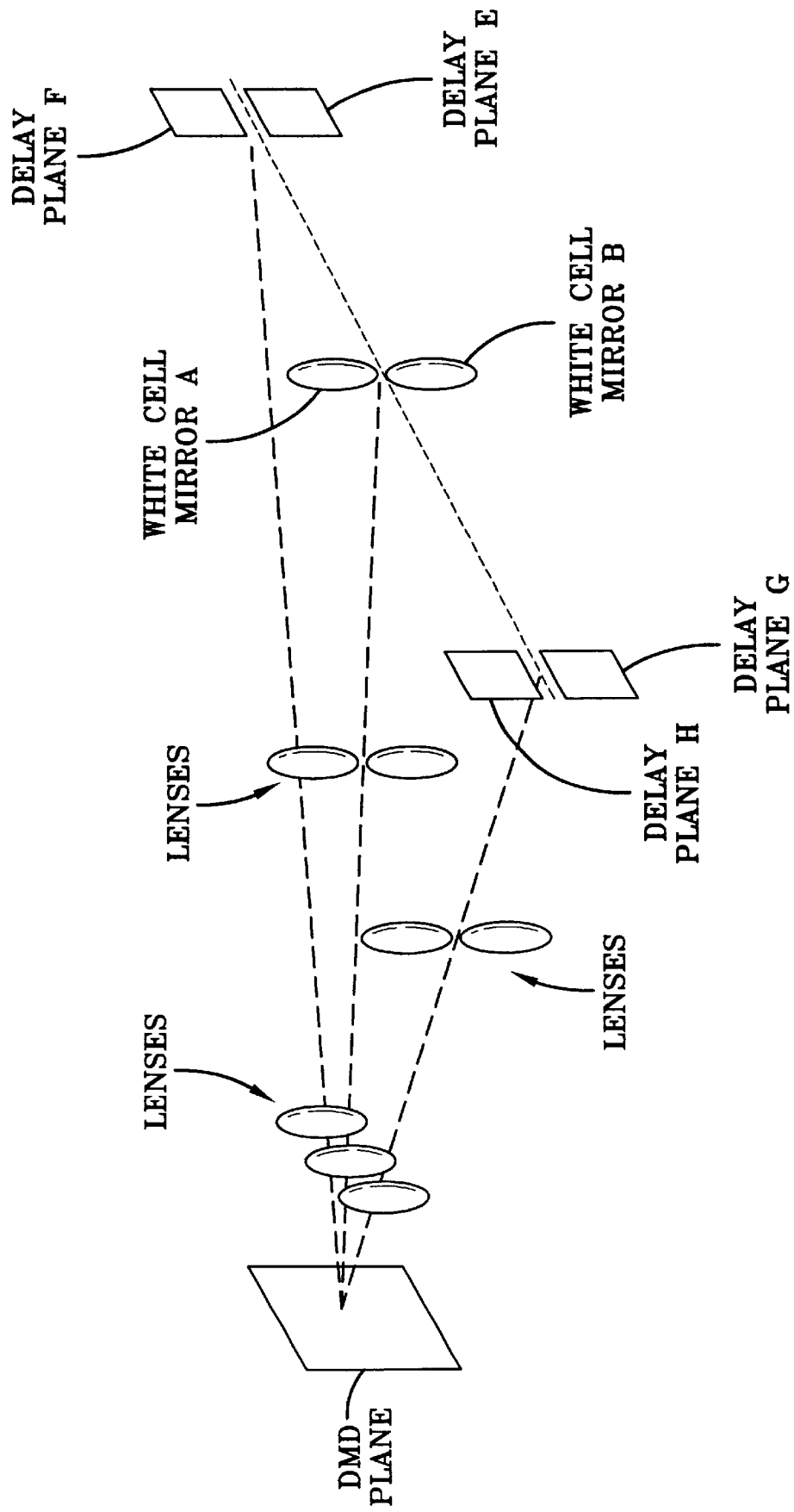
FIG. 39 is another perspective view of a three White cell DMD system in accordance with one embodiment of the present invention.

Possible light paths in the delay device of FIG. 39.

| Micromirror at 1st orientation | Micromirror at 2nd orientation | Micromirror at 3rd orientation |
|---|---|---|
| E↔B | E↔G | A↔G |
|  | A↔B |  |

TABLE 6

Assignments of delays.

| Column # (Bounce #'s) | Delay Plane E | Delay Plane G |
|---|---|---|
| 1 (1 and 2) | Δ | 2Δ |
| 2 (3 and 4) | 3Δ | 6Δ |
| 3 (5 and 6) | 9Δ | 18Δ |
| 2m' (m'-1 and m') | $3^{(m/2-1)}\Delta$ | $2*3^{(m/2-1)}\Delta$ |

Finally, Table 7 shows the bounce patterns used for the first few delays.

TABLE 7

Bounce patterns for the ternary cell based on a three-position DMD.

| | Significance of digit | | |
|---|---|---|---|
| Delay increment desired | Least | Next | Most |
| 0 | AB | | |
| 1 | AE | | |
| 2 | GB | | |
| 3 | GE | | |
| 4 (3 + 1) | GE | | |
| 5 (3 + 2) | GB | AE | |
| 6 | AB | GB | |
| 7 (6 + 1) | AE | GB | |
| 8 (6 + 2) | GB | GB | |
| 9 | AB | AB | AE |
| 10 (9 + 1) | AE | AB | AE |

In Table 7, however, being able to go directly from E to G in a single bounce pair has not been exploited. By visiting both E and G on the first bounce pair, one can count as high as 3Δ. Thus one can make the next column of Delay Plane E equal to four. The assignments then are shown in Table 8.

TABLE 8

Assignments of delays.

| Column # | Delay Plane E | Delay Plane G |
|---|---|---|
| 1 | Δ | 2Δ |
| 2 | 4Δ | 8Δ |
| 3 | 16Δ | 32Δ |
| 2m' | $4^{(m'/2 - 1)}\Delta$ | $2*4^{(m'/2 - 1)}\Delta$ |

Table 9 shows how to count up to 15Δ in four bounces using the delay assignments of Table 8.

TABLE 9

Bounce patterns for the ternary cell based on a three-position DMD.

| | Significance of digit | | |
|---|---|---|---|
| Delay increment desired | Least | Next | Most |
| 0 | AB | | |
| 1 | AE | | |
| 2 | GB | | |
| 3 | GE | | |
| 4 | AB | AE | |
| 5 (1 + 4) | AE | AE | |
| 6 (2 + 4) | GB | AE | |
| 7 (3 + 4) | GE | AE | |
| 8 | AB | GB | |
| 9 (1 + 8) | AE | GB | |
| 10 (2 + 8) | GB | GB | |
| 11 | GE | GB | |
| 12 (3 + 8) | AB | GE | |
| 13 (1 + 12) | AE | GE | |
| 14 (2 + 12) | GB | GE | |
| 15 (3 + 12) | GE | GE | |
| 16 | AB | AB | AE |

In this case the maximum number of bounce attainable in m' bounces is $$N = 4^{\frac{m'}{2}} - 1$$

This will be referred to as the quaternary cell.

In the cells in this embodiment, one input bounce is required. A beam enters a cell from the input arm, bounces off the DMD where the appropriate pixel is set to direct the beam to the appropriate delay plane, such as delay plane G. In this case, the column on G associated with the input bounces could be a zero delay element, such as a simple mirror. From there it can go to either B or E, so this next bounce begins the controllable delay bounces.

Supposing the pixel positions are at 0° and ±10°, the three arms of the device would then be at −20°, 0°, and 20°. A beam can then be input via an arm located at +40°, as shown in FIG. 38. The beams come in via this arm, and the pixels for the input bounces are set to +10°. The beams are then directed to Plane G. Note that to reach G, the input beams should be configured such they come from the optical equivalent of an upper White cell mirror.

For the output, a single bounce may be used in the following way. After the delay bounces are finished, the beam can be switched to E, and then out via an output arm at −40°. This plan has the disadvantage that the output beams would be leaving the cell at the same angles as any Fresnel reflection from the input beams off the DMD cover glass if there is one.

Alternatively, one could place a simple spherical mirror at the location of H. After the delay bounces are completed, the beam could be sent to H. This requires one bounce. Now the output pixel is set to return the beam to the input/output arm at +40°, but the output beam is directed toward the optical equivalent of a lower White cell mirror. Thus the input and output beams are separated. The total number of bounces m is then the number of delay bounces, m', plus 2:

$$m=m'+2.$$

A better photonic device can be made by using four delay planes, as shown in FIG. 39. Again Mirrors A and B are chosen such that the time it takes for light to go from either mirror to the DMD is the same as it takes the light to reach any of the four delay planes from the DMD. Bounces are again counted in groups of four to ensure that a group of bounces is finished at Mirror B, from which a beam may go to any upper mirror to begin the next set of bounces. The delays in each arm are then, column by column, given in Table 10.

TABLE 10

| Arm | Delay in Column 1 | Delay in Column 2 | Delay in Column 3 | Delay in Column L |
|---|---|---|---|---|
| E | Δ | 5Δ | 25Δ | $5^{(\frac{m}{4}-1)}$ |
| F | 2Δ | 10Δ | 50Δ | $2\times 5^{(\frac{m}{4}-1)}$ |
| G | 3Δ | 15Δ | 75Δ | $3\times 5^{(\frac{m}{4}-1)}$ |
| H | 4Δ | 20Δ | 100Δ | $4\times 5^{(\frac{m}{4}-1)}$ |

Also note that a beam going from one of the upper White cell arms (A, F, and H) may only go to a lower one (B, E, and G). The reverse is also true. Table 11 illustrates the paths required for various delays using the scheme of FIG. 39.

TABLE 11

| | Significance of digit | | |
|---|---|---|---|
| Delay increment desired | Least | Next | Most |
| 0 | ABAB | | |
| 1 | AEAB | | |
| 2 | FBAB | | |
| 3 | AGAB | | |
| 4 | HBAB | | |
| 5 | ABAB | AEAB | |
| 6 (5 + 1) | AEAB | AEAB | |
| 7 (5 + 2) | FBAB | AEAB | |
| 10 | ABAB | FBAB | |
| 24 (20 + 4) | HBAB | HBAB | |
| 25 | ABAB | ABAB | AEAB |
| 124 (100 + 20 + 4) | HBAB | HBAB | HBAB |

The maximum number of delays achievable with this embodiment, using the method of Table 14, would then seem to be $$N_{apparent}=5^{m/2}-1$$

This number would be obtained by visiting only the two mirrors H and B. One would be adding 4Δ+20Δ+100Δ+ . . . . For six bounces, one could count up to 124. In practice however, one can go slightly higher. One can visit Mirrors H and E in two successive bounces, since one is an upper and one is a lower mirror and they are not in the same White cell. Thus one can obtain, in six bounces, 125Δ by using HBAB HBAB HEAB (100+20+(4+1)). One cannot count to 126 without additional bounces. Thus the actual maximum number of delays is, in fact:

$$N=5^{m/2}$$

A waste of bounces may be seen in Table 11, however. Every group of four bounces ends in the combination AB, which happens because one needs to end at Mirror B in order to assure that one can go to any upper mirror at the beginning of the next group. One must end up at B, but not necessarily by using A on the third bounce to get to B on the fourth bounce.

If Column 1 is assigned to a delay of α in delay plane E, and assign Column 1 to a delay of 2Δ in delay plane H (in a different White cell than mirror E), then in a single group of four bounces, one may obtain delays of 0 (ABAB), Δ (AEAB), 2Δ (HBAB), 3Δ (HEAB), 4Δ (HBHB), and 5Δ (HEHB), and still end up at B as required. Then Column 1 of one of the remaining mirrors may be assigned to 6Δ and the last mirror to 7Δ. In one group of bounces one may now count up to 7Δ. Thus lengths are assigned as shown in Table 12.

TABLE 12

An alternate way of assigning the lengths of the arms in FIG. 37.

| Arm | Least Significant Bounce | Next Significant Bounce | Most Significant Bounce | General Case |
|---|---|---|---|---|
| A | 0 | 0 | 0 | 0 |
| B | 0 | 0 | 0 | 0 |
| E | Δ | 8Δ | 64Δ | $8^{(\frac{m}{4}-1)}$ |
| F | 7Δ | 56Δ | 488Δ | $7 \times [8^{(\frac{m}{4}-1)}\Delta]$ |
| G | 6Δ | 48Δ | 384Δ | $6 \times [8^{(\frac{m}{4}-1)}\Delta]$ |
| H | 2Δ | 16Δ | 128Δ | $2 \times [8^{(\frac{m}{4}-1)}\Delta]$ |

Table 13 shows how to count up to 35 delays in 4 bounces. The maximum number of delays obtainable in this case is $$N=8^{(m/4)}-1$$

One may apply the principle of counting in groups of odd numbers of bounces to improve on this result. In one such embodiment, bounces are counted in groups of five. The delays in each column of the various delay planes may be assigned as shown in Table 14. Table 15 shows how to obtain the first few delays.

TABLE 13

The bounce patterns to obtain delays using the lengths in Table 12.

| Delay | First group of four bounces | Second group of four bounces | Third group of four bounces |
|---|---|---|---|
| 0 | ABAB | | |
| 1 | AEAB | | |
| 2 | HBAB | | |
| 3 | HEAB | | |

TABLE 13-continued

The bounce patterns to obtain delays using the lengths in Table 12.

| Delay | First group of four bounces | Second group of four bounces | Third group of four bounces |
|---|---|---|---|
| 4 | HBHB | | |
| 5 | HEHB | | |
| 6 | AGAB | | |
| 7 | FBAB | | |
| 8 | ABAB | AEAB | |
| 13 (8 + 5) | HEHB | AEAB | |
| 40 | ABAB | HEHB | |
| 63 (56 + 7) | HEHB | HEHB | |
| 64 | ABAB | ABAB | AEAB |

TABLE 14

| Arm | Delay in Column 1 | Delay in Column 2 | Delay in Column 3 | Delay in Column L |
|---|---|---|---|---|
| E | Δ | 16Δ | 16Δ | $16^{(\frac{m}{5}-1)}$ |
| F | 9Δ | 144Δ | 144Δ | $9 \times 16^{(\frac{m}{5}-1)}$ |
| G | 11Δ | 176Δ | 176Δ | $11 \times 16^{(\frac{m}{5}-1)}$ |
| H | 3Δ | 48Δ | 48Δ | $3 \times 16^{(\frac{m}{5}-1)}$ |

TABLE 15

The bounce patterns to obtain delays using the lengths in Table 17.

| Delay | First group of five bounces | Second group of five bounces |
|---|---|---|
| 0 | ABABA | |
| 1 | AEABA | |
| 2 | AEAEA | |
| 3 | HBABA | |
| 4 | HBAEA | |
| 5 | HEAEA | |
| 6 | HBHBA | |
| 7 | HEHBA | |
| 8 | HEHEA | |
| 9 | FBABA | |
| 10 | FBAEA | |
| 11 | AGABA | |
| 12 | AGAEA | |
| 13 | FBHEA | |
| 14 | AGFBA | |
| 15 | AGHEA | |
| 16 | ABABA | EBABA |
| 17 | AEABA | EBABA |

In this case the number of delays obtainable in m bounce is $$N=16^{m/5}-1$$

This can be compared to the performance of the device of Table 13. For a given m, then, which equation for N is larger? This asks the question, which is larger, $8^{m/4}$ or $16^{m/5}$? Taking the log of both sides gives:

(m/4)log(8) less than or greater than (m/5)log(16)?
(m/4)(0.903) less than or greater than (m/5)(1.2)?
0.225<0.240

Therefore the 5-bounce system produces more delays.

These principles may also be extended to DMDs having more than three positions.

Additional embodiments comprise a class of delay engines for which the number of delays goes as the number of bounces raised to some power. This class of cells shall be referred to as polynomial cells. Polynomial cells do not require a delay plane and the associated delay devices, as these cells use arms of varying lengths to introduce the time delays.

Previously, a dual White cell true time delay generator was disclosed that contained four White mirrors, called a quadratic cell. It was described using a liquid crystal device as the SLM. The present embodiment implements this with a 2-position DMD.

Figure 40:
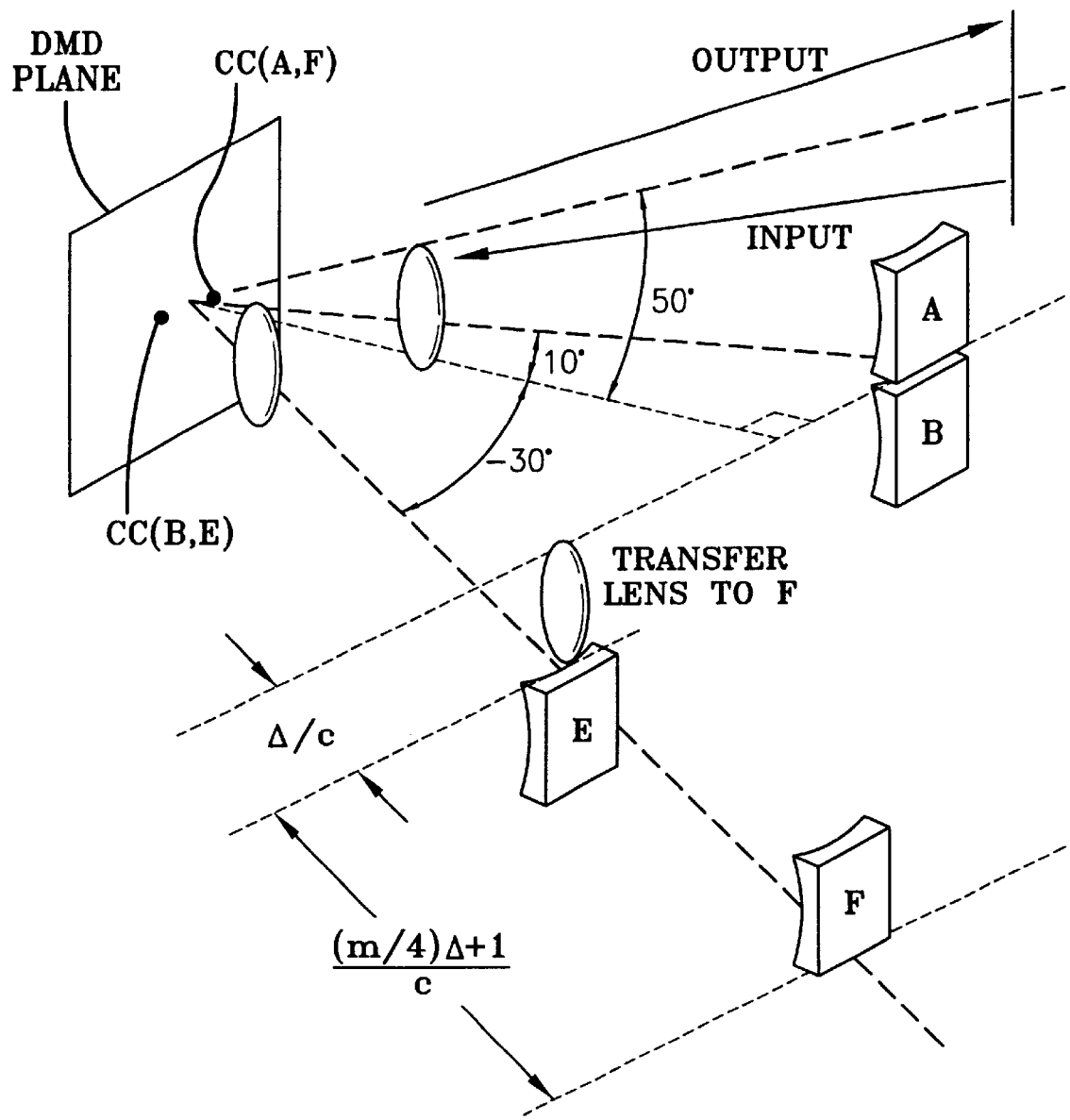
FIG. 40 is a perspective view of a quadratic cell DMD system in accordance with one embodiment of the present invention.

Initially, two axes are established, each with a White cell. Supposing the two-position DMD has stable pixel orientations at +10° and −10°, the axes are chosen to lie one at +10°, and the other at −30° with respect to the normal to the DMD plane. On each of these axes is placed two White cell mirrors, one above the plane containing the arms and one below as shown in FIG. 40. The White cell whose axis is at 10° contains mirrors A and B. The White cell whose axis is at −30° contains White cell mirrors E and F. The second White cell also has a transfer lens that ensures proper imaging to Mirror F.

If the pixels are all oriented at +10°, then light bounces back and forth between Mirrors A and B and the DMD. If the pixel corresponding to a particular bounce is switched to −10°, then the light is switched into the other White cell. The next pixel is also set to −10° to return the light to the first cell. Light cannot go from Mirror E directly to Mirror F in this configuration. The light must return to the first White cell. Table 16 summarizes the possible transitions. The first White cell, containing mirrors A and B, is called the null cell, and the second White cell, with differing arm lengths, is called the delay cell.

TABLE 16

Possible transitions for the dual White cell of FIG. 58.

| Micropixel at +10° | Micropixel at −10° |
|---|---|
| A↔B | A↔E |
|  | B↔F |

Let m be the number of bounces on the DMD. Assume that the light is brought into the cell via the input arm, which is along an axis at +50° to the normal to the DMD plane. The DMD pixels themselves will be used as input and output in this scenario. The pixel corresponding to the input spot is set to +10°, and the light will go first to the White cell containing Mirrors E and F. Suppose it is chosen to go to F. On the next bounce, the pixel is set to −10°, and the beam goes to Mirror B. Now the beam can go into either cell, and decisions may be made about paths and delays. Thus, two bounces are required just to input the light into the cell.

Similarly, two bounces may be used for output. Suppose the final delay-related bounce is on a lower mirror, either B or E. The output arm will necessarily be along the +50° axis as well, and to get to this arm the beam must be coming from the EF cell. The light should leave via Mirror E, so it can be separated from the input beam that is going toward Mirror F. After the delays are done, the beam can be sent to Mirror A regardless of which mirror the delays end on. From Mirror A, the beam can be switched to Mirror E, from which it goes to the output turning pixel and leaves the cell. This requires two additional bounces, making a total of four bounces needed for input and output.

Next, the remaining m−4 bounces are considered in groups of four. The effective number of bounces shall be referred to as m', where m'=m−4. The minimum delay the beam can experience is obtained when the light remains in the AB cell for every bounce, and all beams circulating in the cell will have at least this much delay. Thus, this delay is subtracted out at the end and an ABAB path constitutes no net delay.

The time of flight from the DMD to Mirror E is made longer than the time of flight from the DMD to Mirrors A and B by some amount Δ. Mirror E can be visited on every other bounce, following a sequence AEAEAEAEAE . . . . Similarly, F can be visited on alternate bounces FBFBFB . . . . Arm F may then be made longer than E, but a determination needs to be made as to how much longer it should be made. The light cannot go directly from E to F or vice versa. Therefore trips to E are to be combined with trips to F in a manner that achieves the most possible delays; Mirror F should be visited m'/4 times and Mirror E m'/4 times.

It would seem logical, then, to assign a length of [(m'/4)+1]Δ to Mirror F. For example, Table 17 shows how to count up to 18 in a 16-bounce system. The number of bounces that can be used for delays is m'=m−4=12. Here the differential time delay of arm E is Δ and the delay of arm F is (m'/4)+1]Δ=4Δ. Note that the beam is input via Mirror B, and that no sequence requires the beam to go directly between E and F.

TABLE 17

The mirror progressions for counting with the cell of FIG. 40.
E = Δ and F = 4Δ for M' = 12.

| Delay | Mirror progression<br>Input \| delay bounces \| output | Delay | Mirror progression<br>Input \| delay bounces \| output |
|---|---|---|---|
| 0 | FB \| AB AB AB AB AB AB \| AE | 10 | FB \| FB FB AB AB AE AE \| AE |
| 1 | FB \| AB AB AB AB AB AE \| AE | 11 | FB \| FB FB AB AE AE AE \| AE |
| 2 | FB \| AB AB AB AB AE AE \| AE | 12 | FB \| FB FB FB AB AB AB \| AE |
| 3 | FB \| AB AB AB AE AE AE \| AE | 13 | FB \| FB FB FB AB AB AE \| AE |
| 4 | FB \| FB AB AB AB AB \| AE | 14 | FB \| FB FB FB AB AE AE \| AE |
| 5 | FB \| FB AB AB AB AB AE \| AE | 15 | FB \| FB FB FB AE AE AE \| AE |
| 6 | FB \| FB AB AB AB AE AE \| AE | 16 | FB \| FB FB FB FB AB AB \| AE |
| 7 | FB \| FB AB AB AE AE AE \| AE | 17 | FB \| FB FB FB FB AB AE \| AE |
| 8 | FB \| FB FB AB AB AB AB \| AE | 18 | FB \| FB FB FB FB AE AE \| AE |
| 9 | FB \| FB FB AB AB AB AE \| AE | 19 | No solution |

For a system using m' bounces for delay, the maximum number of delays may be found. Mirror F may be visited at least m'/4 times, and its delay is [(m'/4)+1]Δ. Thus one may obtain $$\left(\frac{m'}{4}\right)\left(\frac{m'}{4}+1\right)\Delta = \left[\left(\frac{m'}{4}\right)^2 + \frac{m'}{4}\right]\Delta$$

delays from Mirror F. Mirror E may be visited m'/4 times for an additional delay of $\Delta$ each, leading to:

$$\left[\left(\frac{m'}{4}\right)^2 + \frac{m'}{4} + \frac{m'}{4}\right]\Delta$$

It can be seen from Table 17, however, that one can go a little higher. If one visits Mirror F an extra time, one can have $(m'/4+1)\times(m'/4+1)\Delta$. This is exactly one more than the quantity in the above equation, so the sequence does not have any gaps.

$$\left(\frac{m'}{4}+1\right)^2 \Delta = \left[\left(\frac{m'}{4}\right)^2 + 2\left(\frac{m'}{4}\right) + 1\right]\Delta$$

Finally, for every pair of bounces, E or F may be visited but not both. If F is visited (m'/4+1) times then E can be visited (m'/4−1) times for an additional time delay increment of $\Delta$ each time. Therefore the final result is given by:

$$T_{\max} = \left[\left(\frac{m'}{4}\right)^2 + 2\left(\frac{m'}{4}\right) + 1 + \left\{\frac{m'}{4}-1\right\}\right]\Delta = \left[\left(\frac{m'}{4}\right)^2 + 3\left(\frac{m'}{4}\right)\right]\Delta$$

Since the number of delays is quadratic in m', this is referred to as the quadratic cell.

Returning for a moment to the input and output of the cell, four bounces have been used for input and output. This has two disadvantages. One disadvantage is that there will be some energy loss from the extra bounces. The other disadvantage is that a beam incident on a mirror at such a large angle as needed for the input/output arm in this configuration will necessarily have a large footprint on the pixel. An alternative is to use separate input and output turning mirrors. The disadvantage is the need for more components and thus a more difficult alignment procedure.

Now considered are delays that can be obtained with an SLM whose pixels have more than two states. Suppose a DMD is used whose mirrors have three stable states. Another preferred embodiment may then be constructed, such as that shown in FIG. 41. Three White cells are again used. The three axes are chosen to be along the normal to the DMD plane, and along ±20° to the DMD normal. The possible transitions are shown in Table 18.

TABLE 18

Figure 41:
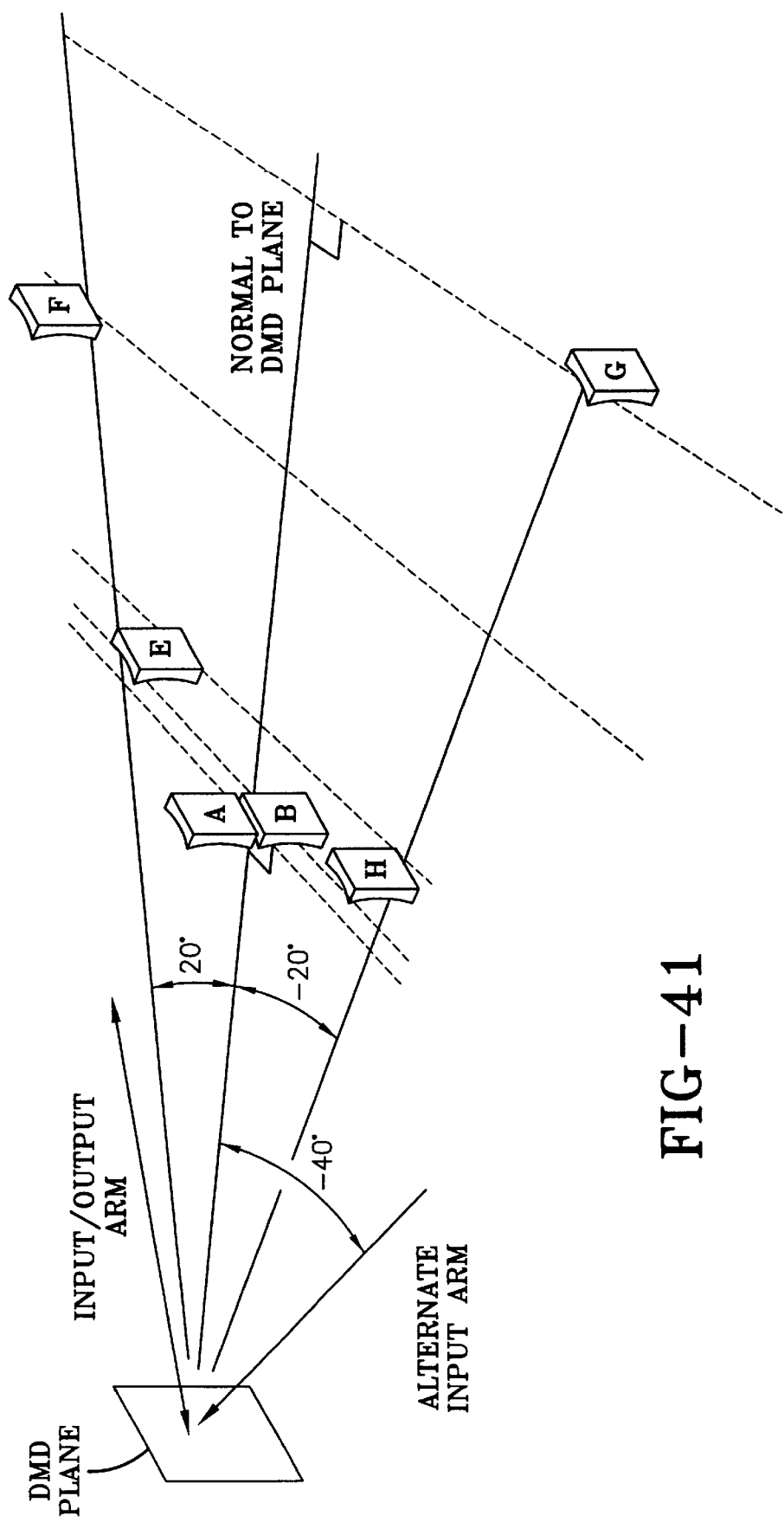
FIG. 41 is a perspective view of a three White cell system and three position DMD system in accordance with one embodiment of the present invention.

Transitions possible in three-arm cell of FIG. 41.

| Micromirror at +10° | Micromirror at 0° | Micromirror at −10° |
|---|---|---|
| A↔E | A↔B | A↔G |
| B↔F | H↔E | B↔H |
|  | G↔F |  |

Note that the input and output arms may be along the same axis, as in the 2-position DMD case, or along separate axes due to the added flexibility of the three-position DMD.

For this cell, Arms A and B may be the same length. Arm E is made longer than arm A by a time difference $\Delta$. Using the same arguments as in the two-position DMD case, one can therefore count as high as m'/4 by using Mirror E. Thus F is made (m'/4+1) $\Delta$ longer than arm A.

Arm H is then made longer by one more than this, $$\left[\left(\frac{m'}{4}\right)^2 + \frac{2m'}{4} + 1\right]\Delta.$$

This arm can be visited m'/4 times. Using, so far, just mirrors E, F, and H, one can count as high as $$\begin{aligned}
\text{count}(H) &= \left\{\left(\frac{m'}{4}\right)\left[\left(\frac{m'}{4}\right) + 2\left(\frac{m'}{4}\right) + 1\right] + \right.\\
&\quad \left.\left(\frac{m'}{4}\right)\left[\left(\frac{m'}{4}\right) + 1\right] + \left(\frac{m'}{4}\right)\right\}\Delta \\
&= \left\{\left(\frac{m'}{4}\right)^3 + 2\left(\frac{m'}{4}\right)^2 + \left(\frac{m'}{4}\right) + \left(\frac{m'}{4}\right)^2 + \left(\frac{m'}{4}\right) + \left(\frac{m'}{4}\right)\right\}\Delta \\
&= \left\{\left(\frac{m'}{4}\right)^3 + 3\left(\frac{m'}{4}\right)^2 + 3\left(\frac{m'}{4}\right)\right\}\Delta
\end{aligned}$$

Finally, the length of arm G is made one longer than this:

$$\begin{aligned}
\text{count}(G) &= \left\{\frac{m'}{4}\left[\left(\frac{m'}{4}\right)^2 + 2\left(\frac{m'}{4}\right) + 1\right]\Delta + \frac{m'}{4}\left(\frac{m'}{4}+1\right) + \frac{m'}{4} + 1\right\}\Delta \\
&= \left\{\left(\frac{m'}{4}\right)^3 + 2\left(\frac{m'}{4}\right)^2 + \left(\frac{m'}{4}\right) + \left(\frac{m'}{4}\right)^2 + \right. \\
&\quad \left.\left(\frac{m'}{4}\right) + \left(\frac{m'}{4}\right) + 1\right\}\Delta \\
&= \left\{\left(\frac{m'}{4}\right)^3 + 3\left(\frac{m'}{4}\right)^2 + 3\frac{m'}{4} + 1\right\}\Delta
\end{aligned}$$

If a given beam is allowed to visit each mirror at most m/4 times, the maximum number of delays attainable looks like $$\begin{aligned}
N_{app.} &= \left\{\frac{m'}{4}\left[\left(\frac{m'}{4}\right)^3 + 3\left(\frac{m'}{4}\right)^2 + 3\left(\frac{m'}{4}\right) + 1\right] + \right.\\
&\quad \frac{m'}{4}\left[\left(\frac{m'}{4}\right)^2 + 2\left(\frac{m'}{4}\right) + 1\right] + \frac{m'}{4}\left[\left(\frac{m'}{4}\right) + 1\right] + \frac{m'}{4}\right\}\Delta \\
&= \left\{\left(\frac{m'}{4}\right)^4 + 3\left(\frac{m'}{4}\right)^3 + 3\left(\frac{m'}{4}\right)^2 + \frac{m'}{4} + \left(\frac{m'}{4}\right)^3 + \right.\\
&\quad 2\left(\frac{m'}{4}\right)^2 + \frac{m'}{4} + \left(\frac{m'}{4}\right)^2 + \frac{m'}{4} + \frac{m'}{4}\right\} \\
&= \left\{\left(\frac{m'}{4}\right)^4 + 4\left(\frac{m'}{4}\right)^3 + 6\left(\frac{m'}{4}\right)^2 + 4\left(\frac{m'}{4}\right)\right\}\Delta
\end{aligned}$$

The number of attainable delays is actually one less than this, and Table 19 shows why for a system of m'=8. The input and output bounces have been neglected as before. It is expected to achieve a maximum delay of 80. To get that, a delay mirror is needed on every bounce, but doing that requires that going directly between E and F or directly between G and H. Neither of these transitions is allowed. For every number from 0 to 79 inclusive, however, some order can be found in which to visit the mirrors to produce the necessary delay without violating the transition rules.

TABLE 19

How to count using the cell of FIG. 41.
Here m' = 8, E = Δ, F = 3Δ, H = 9Δ, and
G = 27Δ. As before, for the short delays, there are multiple ways
to get many of them.

| Delay | Mirror Pattern | Delay | Mirror Pattern |
|---|---|---|---|
| 0 | AB AB AB AB | 42 (9 + 3 + 3 + 27) | FB HB HB AG |
| 1 | AB AB AB AE | 43 (9 + 3 + 3 + 1 + 27) | FB HB HE AG |
| 2 (1 + 1) | AB AB AE AE | 44 (9 + 3 + 1 + 3 + 1 + 27) | FB HE BE AG |
| 3 | HB AB AB AB | 45 (9 + 9 + 27) | FB FB AB AG |
| 8 (3 + 3 + 1 + 1) | BB HB AE AE | 46(9 + 27 + 9 + 1) | FG FB AB AE |
| 9 | FB AB AB AB | 47 (9 + 27 + 9 + 1 + 1) | FG FB AE AE |
| 12 (9 + 3) | FB HB AB AB | 48 (9 + 27 + 9 + 3) | FG FB BB AB |
| 15 (9 + 3 + 3) | FB HB BBAB | 53 (9 + 27 + 9 + 3 + 1 + 3 + 1) | FG FB HE HE |
| 18 | FB FB AB AB | 54 (27 + 27) | AG AG AB AB |
| 24 | FB FB HB HB | 57 (3 + 27 + 27) | HB AB AG AG |
| 27 | AG AB AB AB | 62 (3 + 1 + 3 + 1 + 27 + 27) | HE BE AG AG |
| 30 | AG AB HB AB | 63 (27 + 9 + 27) | AB AB AG FG |
| 33 (27 + 3 + 3) | AG AB HB HB | 71 (3 + 1 + 3 + 1 + 27 + 9 + 27) | HE HE AG FG |
| 36 (3 + 3 + 3 + 27) | BB BB HB AG | 72 (9 + 27 + 9 + 27) | AB AB FG FG |
| 39 (3 + 1 + 3 + 1 + 3 + 1 + 27) | HE BE HE AG | 79 3 + 1 + 3 + 9 + 27 + 9 + 27 | HE BB FG FG |
| 40 (9 + 3 + 1 + 27) | FB HE AB AG | 80 (no solution) | HE HE FG FG |
| | | underscored transitions | Nor |
| | | not allowed | FG FG HE HE |

Thus the actual number of delays attainable is:

$$N_{actual} = \left\{ \left(\frac{m'}{4}\right)^4 + 4\left(\frac{m'}{4}\right)^3 + 6\left(\frac{m'}{4}\right)^2 + 4\left(\frac{m'}{4}\right) - 1 \right\}$$

This cell is quartic in (m/4).

These ideas may also be extended to spatial light modulators having more than three states.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. An apparatus for optically generating time delays in signals comprising:
    an input light source, said input light source adapted top generate at least one individual light beam from at least one direction;
    an input mirror adapted to reflect said at least one individual light beam;
    a plurality of optical elements configured so as to define a plurality of possible light paths for each said light beam reflected by said input mirror, said plurality of optical elements comprising two delay engines, wherein said plurality of optical elements is configured so as to direct a said individual light beam to make at least two passes through said plurality of optical elements;
    at least one refocusing optical element adapted to restrict the divergence of a light beam diverted by said optical elements through at least one of said light paths;
    a spatial light modulator having at least three states, said spatial light modulator adapted to select a path from among said light paths for each pass of a said light beam through said optical elements;
    an output mirror adapted to reflect each said light beam emerging from said optical elements; and
    at least one receiving device adapted to receive a said light beam reflected by said output mirror and determine the delay in the light beam.

2. An apparatus according to claim 1 wherein said optical device is adapted to generate an array of light beams.

3. An apparatus according to claim 1 wherein said input mirror is adjustable.

4. An apparatus according to claim 1 wherein said plurality of optical elements is selected from the group consisting of mirrors, lenses, gratings, and prisms.

5. An apparatus according to claim 1 wherein said spatial light modulator consists of a polarizing spatial light modulator adapted to change the polarization of a said light beam directed to said spatial light modulator.

6. An apparatus according to claim 1 wherein said output mirror is adjustable.

7. An apparatus according to claim 1 additionally comprising at least one system of waveguides, said waveguides adapted such that the lengths of a plurality of said light paths may be varied in a fixed space comprising a subset of said optical elements.

8. An apparatus according to claim 1 wherein said spatial light modulator is adapted to reflect a said light beam to at least one of said plurality of light paths.

9. An apparatus for optically generating time delays in signals comprising:
    (a) an input light source, said input light source adapted to generate at least one individual light beam from at least one direction;
    (b) an input mirror adapted to reflect said at least one individual light beam;
    (c) a flat mirror, said flat mirror adapted to reflect said at least one individual light beam reflected by said input mirror;

(d) a roof prism, the hypotenuse face of said roof prism separated a distance from and tilted with respect to said flat mirror such that a said light beam reflected from said flat mirror will be reflected back to a different point on said flat mirror;

(e) at least one refocusing optical element positioned in the light path of a said beam between said flat mirror and said roof prism, said refocusing optical element adapted to restrict the divergence of a said light beam;

(f) an output mirror adapted to reflect each said light beam emerging from said flat mirror not reflected back to said roof prism; and (g) at least one receiving device adapted to receive a said light beam reflected by said output mirror and determine the delay in the light beam.

10. An apparatus according to claim 9 wherein said optical device is adapted to generate an array of light beams.

11. An apparatus according to claim 9 wherein said input mirror is adjustable.

12. An apparatus according to claim 9 wherein said output mirror is adjustable.

13. An apparatus for optically generating time delays in signals comprising:

(a) an input light source, said input light source adapted to generate at least one individual light beam from at least one direction;

(b) an input mirror adapted to reflect said at least one individual light beam;

(c) spatial light modulator adapted to reflect said at least one individual light beam reflected by said input mirror;

(d) a roof prism, the hypotenuse face of said roof prism separated a distance from and tilted with respect to said spatial light modulator such that a said light beam reflected from said spatial light modulator will be reflected back to a different point on said spatial light modulator;

(e) at least one refocusing optical element positioned in the light path of a said beam between said spatial light modulator and said roof prism, said refocusing optical element adapted to restrict the divergence of a said light beam;

(f) an output mirror adapted to reflect each said light beam emerging from said spatial light modulator not reflected back to said roof prism; and (g) at least one receiving device adapted to receive a said light beam reflected by said output mirror and determine the delay in the light beam.

14. An apparatus according to claim 13 wherein said input light source is adapted to generate an array of light beams.

15. An apparatus according to claim 13 wherein said input mirror is adjustable.

16. An apparatus according to claim 13 wherein said output mirror is adjustable.

17. An apparatus according to claim 13 additionally comprising at least one set of delay elements, said delay elements adapted to reflect a said light beam passing from a said roof prism back to the roof prism.

18. An apparatus according to claim 13 additionally comprising at least one optical element, said optical element adapted to reflect a said light beam passing from a said roof prism back to the roof prism.

19. An apparatus according to claim 18 wherein said at least one optical element is selected from the group consisting of mirrors, lenses, gratings, quarter wave plates, and prisms.

20. An apparatus according to claim 5 additionally comprising a beam splitting device adapted to direct a said light beam along a said light path depending on the polarization of the light beam.

21. An apparatus for optically generating time delays in signals comprising:

an input light source, said input light source adapted to generate at least one individual light beam from at least one direction;

an input mirror adapted to reflect said at least one individual light beam;

a plurality of optical elements configured so as to define a plurality of possible light paths for each said light beam reflected by said input mirror, said optical elements comprising two delay engines;

at least one system of waveguides, said waveguides adapted such that the lengths of a plurality of said light paths may be varied in a fixed space comprising a subset of said optical elements; at least one refocusing optical element adapted to restrict the divergence of a light beam diverted by said optical elements through at least one of said light paths;

a spatial light modulator having at least three states, said spatial light modulator adapted to select a path from among said light paths for each pass of a said light beam through said optical elements;

an output mirror adapted to reflect each said light beam emerging from said optical elements; and at least one receiving device adapted to receive a said light beam reflected by said output mirror and determine the delay in the light beam.

22. An apparatus according to claim 21 wherein said optical device is adapted to generate an array of light beams.

23. An apparatus according to claim 21 wherein said input mirror is adjustable.

24. An apparatus according to claim 21 wherein said plurality of optical elements is selected from the group consisting of mirrors, lenses, gratings and prisms.

25. An apparatus according to claim 21 wherein said output mirror is adjustable.

26. An apparatus according to claim 21 wherein said spatial light modulator is adapted to reflect a said light beam to at least one of said plurality of light paths.

27. An apparatus according to claim 21 wherein said spatial light modulator consists of a polarizing spatial light modulator adapted to change the polarization of a said light beam directed to said spatial light modulator.

28. An apparatus according to claim 27 additionally comprising a beam splitting device adapted to direct a said light beam along a said light path depending on the polarization of the light beam.

* * * * *